US006286005B1

(12) United States Patent
Cannon

(10) Patent No.: US 6,286,005 B1
(45) Date of Patent: Sep. 4, 2001

(54) METHOD AND APPARATUS FOR ANALYZING DATA AND ADVERTISING OPTIMIZATION

(75) Inventor: Mark E. Cannon, Provo, UT (US)

(73) Assignee: Cannon Holdings, L.L.C., Provo, UT (US)

(*) Notice: Subject to any disclaimer, the term of this patent is extended or adjusted under 35 U.S.C. 154(b) by 0 days.

(21) Appl. No.: 09/038,380

(22) Filed: Mar. 11, 1998

(51) Int. Cl.[7] .................................................. G06F 17/30
(52) U.S. Cl. .................... 707/100; 705/7; 725/9; 455/2.01
(58) Field of Search ............... 707/1, 9, 10, 100–104, 707/7; 705/7–10; 455/2.01; 725/9

(56) References Cited

U.S. PATENT DOCUMENTS

| | | | |
|---|---|---|---|
| 4,012,132 | 3/1977 | Lazarus | 353/25 |
| 4,930,011 | 5/1990 | Kiewit | 348/2 |
| 5,223,924 | 6/1993 | Strubbe | 348/7 |
| 5,260,778 | 11/1993 | Kauffman et al. | 348/6 |
| 5,446,919 | 8/1995 | Wilkins | 455/6.2 |
| 5,515,098 | 5/1996 | Carles | 348/8 |
| 5,636,346 | 6/1997 | Saxe | 705/1 |
| 5,664,174 * | 9/1997 | Agrawal et al. | 707/6 |
| 5,675,788 * | 10/1997 | Husick et al. | 707/104 |
| 5,742,816 * | 4/1998 | Barr et al. | 707/104 |
| 5,812,642 | 9/1998 | Leroy | 379/92.01 |
| 5,842,200 * | 11/1998 | Agrawal et al. | 707/1 |
| 5,848,396 | 12/1998 | Gerace | 705/10 |
| 5,855,008 | 12/1998 | Goldhaber et al. | 705/14 |
| 5,867,386 | 2/1999 | Hoffberg et al. | 700/83 |
| 6,029,176 * | 2/2000 | Cannon | 707/104 |

OTHER PUBLICATIONS

Cipolla, Emil T., "Data Mining: Techniques to Gain Insight Into Your Data," Enterprise Systems Journal, Dec. 1995, vol. 10, No. 13, pp. 18 (5).

* cited by examiner

Primary Examiner—Hosain T. Alam
Assistant Examiner—Jean Bolte Fleurantin
(74) Attorney, Agent, or Firm—Schmeiser, Olsen & Watts

(57) ABSTRACT

The most preferred embodiment of the present invention is a computer-based decision support system that includes three main components: a database mining engine (DME); an advertising optimization mechanism; and a customized user interface that provides access to the various features of the invention. The user interface, in conjunction with the DME, provides a unique and innovative way to store, retrieve and manipulate data from existing databases containing media-related audience access data, which describe the access habits and preferences of the media audience. By using a database with a simplified storage and retrieval protocol, the data contained therein can be effectively manipulated in real time. This means that previously complex and lengthy information retrieval and analysis activities can be accomplished in very short periods of time (typically seconds instead of minutes or even hours). Further, by utilizing the advertising optimization mechanism of the present invention, businesses, networks, and advertising agencies can interactively create, score, rank and compare various proposed or actual advertising strategies in a simple and efficient manner. This allows the decision-makers to more effectively tailor their marketing efforts and successfully reach the desired target market while conserving scarce advertising capital. Finally, the user interface for the system provides access to both the DME and the optimization mechanism in a simple and straightforward manner, significantly reducing training time.

32 Claims, 31 Drawing Sheets

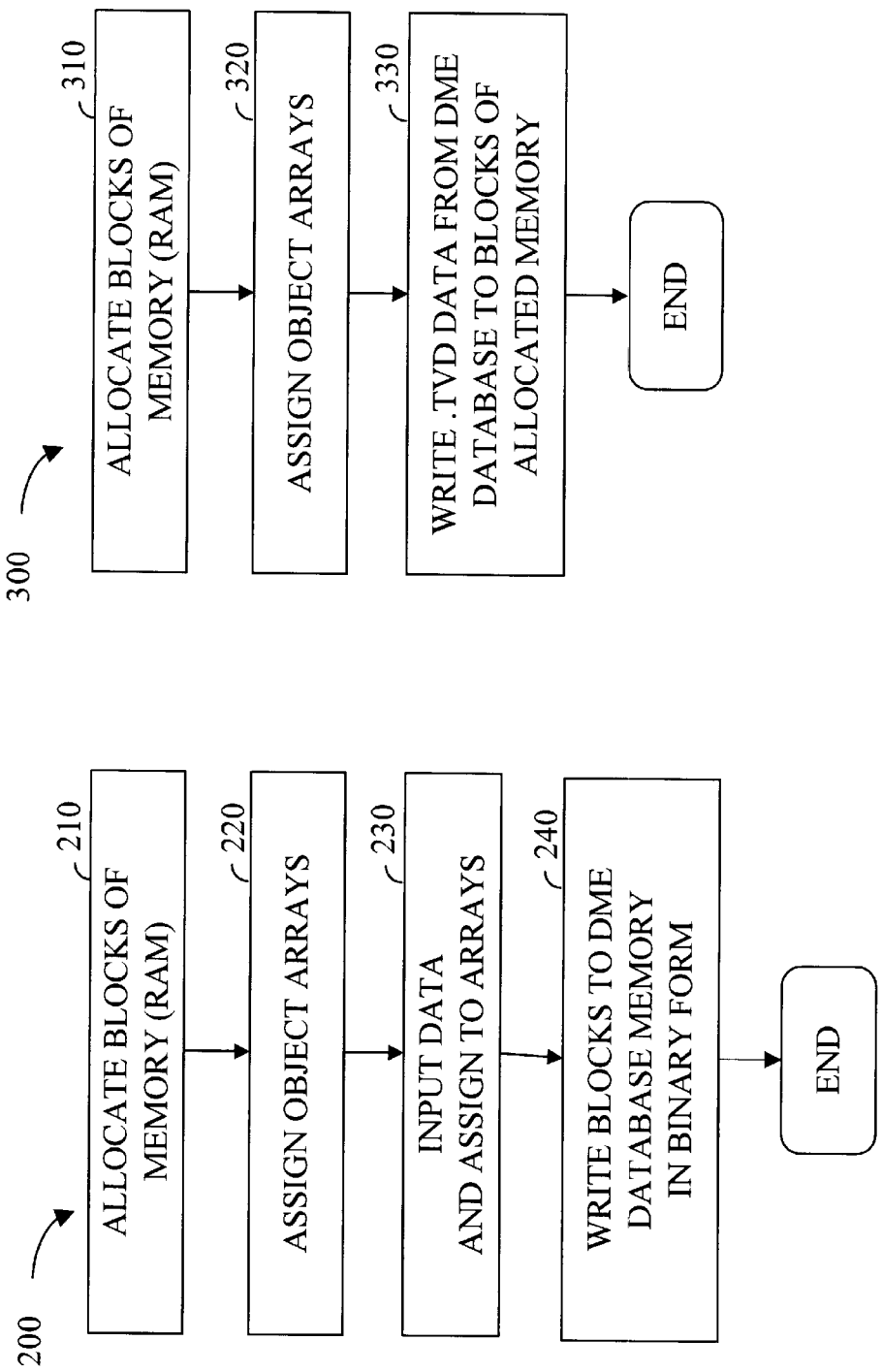

| AGE RANGE (YEARS) | REPRESENTATION (HEX) | REPRESENTATION (BINARY) |
|---|---|---|
| 2-5 | 1H | 1 |
| 6-8 | 2H | 10 |
| 9-11 | 3H | 100 |
| 12-14 | 4H | 1000 |
| 15-17 | 8H | 10000 |
| 18-20 | 20H | 100000 |
| 21-24 | 40H | 1000000 |

FIG. 5

FIG. 9
FIG. 10
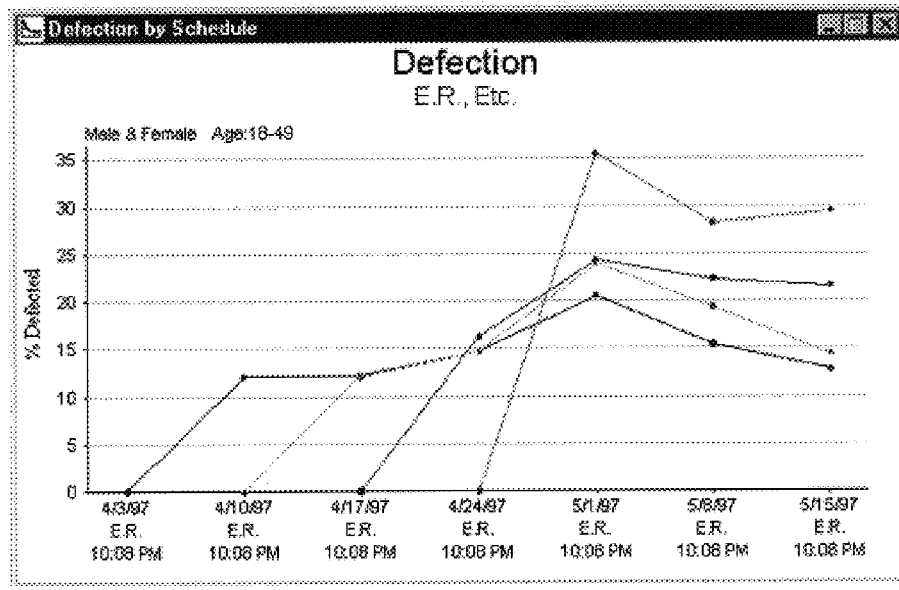
FIG. 11

| | | | | | | | |
|---|---|---|---|---|---|---|---|
| 0 | 6:23 | 7:23 n | 7:53 | 8:38 N | 9:38 A | 11:53 | |
| 1 | 6:23 | 7:23 n | 8:23 | 8:38 N | 9:38 A | 11:53 | |
| 2 | 7:53 | 8:38 N | 9:08 A | 11:53 | | | |
| 3 | 8:38 | 9:38 N | 11:53 | | | | |
| 4 | 7:08 | 7:53 n | 9:23 A | 10:53 C | 11:23 n | 11:53 C | |
| 5 | 7:08 | 7:53 n | 9:23 A | 10:53 C | 11:23 n | 11:53 C | |
| 6 | 7:53 | 9:08 F | 10:08 | 10:38 n | 11:53 | | |
| 7 | 7:53 | 9:08 F | 10:08 | 10:38 n | 11:53 | | |
| 8 | 8:38 | 9:08 F | 11:53 | | | | |
| 9 | 6:23 n | 6:53 N | 8:23 | 9:23 N | 9:53 F | 10:53 | 11:23 n | 11:53 |
| 10 | 6:23 n | 6:53 N | 11:53 | | | | |
| 11 | 6:23 | 6:53 N | 8:23 | 9:23 N | 11:53 | | |
| 12 | 11:53 | | | | | | |
| 13 | 6:23 | 6:53 N | 8:53 | 9:23 N | 9:53 F | 10:53 | 11:23 n | 11:53 |
| 14 | 8:53 | 9:23 N | 9:53 F | 10:53 | 11:23 n | 11:53 | |
| 15 | 8:53 | 9:23 N | 9:53 F | 11:53 | | | |
| 16 | 11:53 O | | | | | | |
| 17 | 11:53 O | | | | | | |
| 18 | 6:53 | 7:53 n | 8:23 F | 10:38 | 11:53 n | | |
| 19 | 6:53 | 7:53 n | 8:23 F | 10:38 | 11:53 n | | |
| 20 | 11:53 | | | | | | |
| 21 | 6:53 | 8:38 n | 9:53 C | 10:23 N | 10:53 | 11:23 n | 11:53 |
| 22 | 9:23 | 9:53 C | 10:23 N | 10:53 | 11:23 n | 11:53 | |
| 23 | 6:53 | 8:38 n | 9:53 C | 11:53 | | | |
| 24 | 7:53 | 8:38 n | 8:53 C | 11:53 | | | |
| 25 | 7:53 | 8:38 n | 11:53 | | | | |
| 26 | 11:53 | | | | | | |

FIG. 12

| SPOTS | AUDIENCE MEMBERS | | | | | | | | | |
|---|---|---|---|---|---|---|---|---|---|---|
| | 1 | 2 | 3 | 4 | 5 | 6 | 7 | 8 | 9 | 10 |
| A | | Y | | Y | | | | | | |
| B | Y | | Y | Y | | | | Y | | |
| C | | Y | | | | | Y | | | Y |
| D | Y | | | Y | | Y | Y | Y | | |
| VALUE | 0.8 | 0.0 | 0.0 | 1.0 | 0.0 | 0.4 | 0.8 | 0.8 | 0.0 | 0.0 |

FIG. 15

| FREQUENCY | VALUE |
|---|---|
| 1 | 0.4 |
| 2 | 0.8 |
| 3 | 1.0 |
| 4-6 | 0.8 |
| 7-10 | .2 |
| 11+ | 0.0 |

FIG. 16

| AGE RANGE | VALUE |
|---|---|
| 0 - 17 | 0 |
| 18 - 34 | 1.0 |
| 35 - 49 | .7 |
| 50+ | .4 |

FIG. 17

| HOUSEHOLD INCOME RANGE PER YEAR | VALUE |
|---|---|
| $0 - $25k | .6 |
| $26k - $35k | .85 |
| $36K+ | 1.0 |

FIG. 18

| SCORING TECHNIQUE | ASSUMPTIONS | REQUIRED DATA |
|---|---|---|
| AVERAGE FREQUENCY | * Higher frequency is better.<br>* Most audience members in a group are exposed near an average number of times. | * Total reach.<br>* Total impressions. |
| EFFECTIVE FREQUENCY | * Exposures fewer than a given number are not effective.<br>* Additional exposures beyond the given number are also not effective. | * Summary frequency distribution data. |
| REACH | * Coverage is more important than repetition.<br>* A single exposure has value. | * Total reach. |
| WEIGHTED EFFECTIVE FREQUENCY | * All advertising exposures may have some value.<br>* The value of exposure is different for each frequency level, and can depend on many factors. | * Frequency tabulations for individual audience members. |
| TIME WEIGHTED EFFECTIVE FREQUENCY | * Recent exposures have greater value than more distant ones.<br>* Distributed exposures for individuals over time is more valuable than closely clustered exposures. | * Exposure timing data for individual audience members. |

FIG. 19

| PERSON | SCHEDULE A | SCHEDULE B |
|---|---|---|
| 1 | 1 | 3 |
| 2 | 1 | 3 |
| 3 | 7 | 3 |
| AVERAGE FREQUENCY | 3 | 3 |

| NUMBER OF EXPOSURES | AUDIENCE COUNT |
|---|---|
| 0 | 44 |
| 1 | 32 |
| 2 | 15 |
| 3 | 7 |
| 4 | 2 |

FIG. 22

| EXPOSURE NUMBER | INDEX VALUE |
|---|---|
| 1 | 0.5 |
| 2 | 0.8 |
| 3 | 1.0 |
| 4 | 0.6 |
| 5 | 0.3 |

FIG. 23

| FREQUENCY | LINEAR | KRUGMAN | DIMINISHING RETURNS | EVENTUAL IRRITATION | S-CURVE |
|---|---|---|---|---|---|
| 1 | 1 | 0 | 4.7 | 2.6 | 0.0 |
| 2 | 1 | 0 | 3.6 | 1.9 | 1.0 |
| 3 | 1 | 10 | 2.8 | 1.3 | 2.0 |
| 4 | 1 | 0 | 2.2 | 0.9 | 2.7 |
| 5 | 1 | 0 | 1.7 | 0.5 | 3.0 |
| 6 | 1 | 0 | 1.3 | 0.3 | 2.8 |
| 7 | 1 | 0 | 1.0 | 0.2 | 2.2 |
| 8 | 1 | 0 | 0.8 | 0.1 | 1.7 |
| 9 | 1 | 0 | 0.6 | 0.0 | 1.3 |
| 10 | 1 | 0 | 0.5 | 0.0 | 1.0 |
| 11 | 1 | 0 | 0.4 | 0.0 | 0.8 |
| 12 | 1 | 0 | 0.3 | 0.0 | 0.6 |
| 13 | 1 | 0 | 0.2 | 0.0 | 0.5 |
| 14 | 1 | 0 | 0.2 | -0.1 | 0.4 |
| 15 | 1 | 0 | 0.1 | -0.2 | 0.3 |
| 16 | 1 | 0 | 0.1 | -0.4 | 0.2 |
| 17 | 1 | 0 | 0.1 | -0.7 | 0.2 |
| 18 | 1 | 0 | 0.1 | -1.0 | 0.1 |
| 19 | 1 | 0 | 0.1 | -1.5 | 0.1 |
| 20 | 1 | 0 | 0.0 | -2.2 | 0.1 |

FIG. 26

| PERSON NUMBER | EXPOSURE FOR BASE SCHEDULE | VIEWED ADDITIONAL SPOT | EXPOSURE VALUATION CURVE | | | | |
|---|---|---|---|---|---|---|---|
| | | | LINEAR | KRUGMAN | DIMINISHING RETURNS | EVENTUAL IRRITATION | S-CURVE VALUE |
| 1 | 1 | Y | 1 | 0 | 3.6 | 1.9 | 1.0 |
| 2 | 4 | N | | | | | |
| 3 | 0 | Y | 1 | 0 | 3.6 | 1.9 | 0.0 |
| 4 | 0 | N | | | | | |
| 5 | 6 | Y | 1 | 0 | 3.6 | 1.9 | 2.2 |
| 6 | 2 | Y | 1 | 0 | 3.6 | 1.9 | 2.0 |
| 7 | 13 | Y | 1 | 0 | 3.6 | 1.9 | 0.4 |
| 8 | 0 | Y | 1 | 0 | 3.6 | 1.9 | 0.0 |
| 9 | 0 | N | | | | | |
| 10 | 0 | N | | | | | |
| 11 | 2 | N | | | | | |
| 12 | 4 | Y | 1 | 0 | 3.6 | 1.9 | 3.0 |
| 13 | 9 | N | | | | | |
| 14 | 1 | Y | 1 | 0 | 3.6 | 1.9 | 1.0 |
| 15 | 0 | N | | | | | |
| TOTAL SCORE | | | 8.0 | 10.0 | 22.4 | 10.9 | 9.6 |

FIG. 27

| EXPOSURE NUMBER | INDEX VALUE |
|---|---|
| 1 | 10 |
| 2 | 0.0 |
| 3 | 0.0 |
| 4 | 0.0 |
| 5 | 0.0 |

FIG. 35

| PERSON # | EXPOSURE 1 | 2 | 3 A 8:00 p.m. | B 9:00 p.m. | C 10:00 p.m. | 6 | 7 | ALTERNATIVE A (8:00 p.m.) 1 | 2 | 3 | 4 | 5 | 6 | 7 | TOTAL | ALTERNATIVE B (9:00 p.m.) 1 | 2 | 3 | 4 | 5 | 6 | 7 | TOTAL | ALTERNATIVE C (10:00 p.m.) 1 | 2 | 3 | 4 | 5 | 6 | 7 | TOTAL |
|---|---|---|---|---|---|---|---|---|---|---|---|---|---|---|---|---|---|---|---|---|---|---|---|---|---|---|---|---|---|---|---|
| 1 | Y | | | | | | | 40 | 36 | 32 | 29 | 26 | 24 | 54 | 242 | | 36 | 32 | 59 | 53 | 48 | 69 | 338 | 40 | 36 | 32 | 29 | 26 | 24 | 54 | 242 |
| 2 | Y | | | | | | | 40 | 36 | 32 | 29 | 26 | 24 | 21 | 209 | 40 | 36 | 32 | 29 | 26 | 24 | 21 | 209 | 40 | 36 | 32 | 29 | 26 | 24 | 21 | 209 |
| 3 | | | Y Y Y | | | | | | | 40 | 64 | 58 | 75 | 67 | 303 | | 40 | 40 | 36 | 32 | 59 | 53 | 221 | | | 40 | 64 | 58 | 75 | 67 | 303 |
| 4 | | | | | Y | | Y | | | | | | | | | | | | | | | | | | | | | | | | |
| 5 | | Y | | Y | Y | | Y | | 40 | 36 | | 40 | 64 | 78 | 182 | | 40 | 36 | 40 | 29 | 64 | 78 | 182 | | 40 | 36 | | 40 | 64 | 78 | 182 |
| 6 | | | Y | | Y | Y | | | 29 | 36 | 32 | 29 | 26 | 50 | 45 | 288 | | 40 | 40 | 32 | 29 | 26 | 24 | 187 | | | 36 | 62 | 55 | 50 | 45 | 288 |
| 7 | | Y | Y | Y | | Y | Y | | 40 | 40 | 64 | 58 | 52 | 71 | 285 | | | | 36 | 32 | 29 | 57 | 195 | | | 40 | 64 | 58 | 52 | 71 | 285 |
| 8 | | | | | | | | | | | | | | | | | | | | | | | | | | | | | | | |
| 9 | | | Y | | | | Y | | | | | | | 40 | 40 | | 40 | 36 | 40 | 36 | 32 | 59 | 168 | | | | | | | 40 | 40 |
| 10 | | Y | | Y | Y Y | Y Y | Y | | 40 | 36 | | 62 | 77 | 86 | 92 | 392 | | 40 | 36 | 32 | 59 | 76 | 85 | 329 | | 40 | 36 | 62 | 77 | 86 | 92 | 392 |
| 11 | | | | Y | | | | | | | | | 40 | 36 | 32 | 108 | | | | | 40 | 36 | 32 | 108 | | | | | 40 | 36 | 32 | 108 |
| 12 | | Y | Y | | Y | | | | | | | 36 | 32 | 58 | 26 | 164 | | | 40 | 36 | 32 | 29 | 26 | 164 | | | | | 40 | 58 | 52 | 47 | 260 |
| 13 | | | | | | | Y | | | | | | | 47 | | | | | 78 | 87 | 78 | 87 | 78 | | | | | | | | |
| 14 | Y Y | Y | | Y Y Y | Y | Y | Y | | 40 | 64 | 40 | 78 | 87 | 78 | 78 | 513 | 40 | 64 | 78 | 87 | 78 | 87 | 78 | 513 | 40 | | 78 | 71 | 64 | 78 | 70 | 465 |
| 15 | | | | | | | | | | 40 | 36 | 32 | 29 | 26 | 56 | 220 | | 40 | 36 | 32 | 29 | 26 | 56 | 220 | | 40 | 36 | 32 | 29 | 26 | 56 | 220 |
| 16 | | Y | | Y | | | | | | | | | | | | | | | | | | | | | | | | | | | | |
| 17 | Y | | Y | Y | Y | Y | Y | | 40 | 36 | 32 | 29 | 26 | 56 | 50 | 270 | 40 | 36 | 32 | 59 | 53 | 72 | 65 | 358 | 40 | 36 | 32 | 29 | 26 | 56 | 50 | 270 |
| 18 | Y | | | Y | | | | | | 40 | 36 | 32 | 29 | 26 | 24 | 187 | | 40 | 36 | 62 | 55 | 50 | 45 | 288 | | 40 | 36 | 32 | 29 | 26 | 24 | 187 |
| 19 | | Y | | | | | Y | | | | 40 | | | | 168 | | | | 40 | | | 40 | 40 | | | | | | | 40 | 40 |
| 20 | Y | | | | | | | 40 | 36 | 32 | 29 | 26 | 24 | 21 | 209 | 40 | 36 | 32 | 29 | 26 | 24 | 21 | 209 | 40 | 36 | 32 | 29 | 26 | 24 | 21 | 209 |
| GRAND TOTAL: | | | | | | | | | | | | | | | 3678.9 | | | | | | | | 3729.7 | | | | | | | | 3699.5 |

| AGE | GENDER | INDEX VALUE |
|---|---|---|
| 1-11 | F | |
| 12-18 | F | 0.3 |
| 19-27 | F | 0.6 |
| 28-40 | F | 1.0 |
| 40+ | F | 0.7 |
| 0-27 | M | |
| 28-40 | M | 0.5 |
| 40+ | M | |

| HOUSEHOLD INCOME | INDEX VALUE |
|---|---|
| 0-10K | |
| 11-29K | 0.5 |
| 30-40K | 0.7 |
| 40K+ | 1.0 |

FIG. 38

| COUNTY SIZE | INDEX VALUE |
|---|---|
| A COUNTIES | 1.0 |
| B COUNTIES | 0.8 |
| OTHER | |

FIG. 39

| DAYS TO DECISION | INDEX VALUE |
|---|---|
| 0 | 1.0 |
| 1 | 0.6 |
| 2 | 0.3 |
| 3+ | 0.0 |

| PERSON # | 1 | 2 | 3 | 4 A | 4 B | 4 C | 5 | 6 | 7 | Weighted Effective Freqency A | B | C | Time Weighted Effective Freqency A | B | C | Age | Gender | Index Value | Income | Index Value | County | Index Value | Weighted Effective Freqency Score A | B | C | Time Weighted Effective Freqency Score A | B | C |
|---|---|---|---|---|---|---|---|---|---|---|---|---|---|---|---|---|---|---|---|---|---|---|---|---|---|---|---|---|
| 1 | Y | | | | | | | | | 0.5 | 0.5 | 0.5 | 242 | 242 | 242 | 23 | M | | 16 | 0.5 | A | 1.0 | | | | | | |
| 2 | Y | | | Y | | | | | | 1.0 | 1.0 | 1.0 | 209 | 338 | 209 | 54 | M | | 45 | 1.0 | B | 0.8 | | | | | | |
| 3 | | | Y | | Y | | | | | 1.0 | 1.0 | 1.0 | 303 | 209 | 303 | 52 | F | 0.7 | 45 | 1.0 | B | 0.8 | 0.56 | | 0.56 | 170 | 124 | 170 |
| 4 | | | | | | | | | | 1.0 | 1.0 | 1.0 | | 221 | | 17 | F | 0.3 | 45 | 1.0 | B | 0.8 | | | | | | 40 |
| 5 | | | Y | Y | | | Y | | Y | 1.0 | 1.0 | 1.0 | 182 | 182 | 182 | 14 | F | | 45 | 1.0 | B | 0.8 | | | | 44 | 44 | 44 |
| 6 | Y | | | | Y | | | Y | | 0.5 | 0.5 | 0.5 | 187 | 187 | 288 | 29 | M | 0.5 | 18 | 0.5 | A | 1.0 | | | 0.2 | 47 | 47 | 72 |
| 7 | | Y | Y | | Y | | Y | Y | | 0.5 | 0.5 | 0.5 | 285 | 195 | 285 | 29 | F | 1.0 | 18 | 0.5 | A | 1.0 | 0.5 | | 0.5 | 142 | 98 | 142 |
| 8 | | | | | | | | | | 0.5 | 0.5 | 0.5 | | | | 6 | M | | 18 | 0.5 | A | 1.0 | | | | | | |
| 9 | | | | | | | Y | | Y | 1.0 | 1.0 | 1.0 | 40 | 168 | 40 | 38 | F | 1.0 | 43 | 1.0 | A | 1.0 | | 0.5 | | 40 | 168 | 40 |
| 10 | | Y | | Y | | | Y Y Y | Y | | | | | 392 | 329 | 392 | 68 | F | 0.7 | 9 | 0.7 | C | | | | | | | |
| 11 | | | | | | | Y | Y | | 0.5 | 0.5 | 0.5 | 108 | 108 | 108 | 61 | F | 0.7 | 27 | 0.5 | B | 0.8 | | | 0.24 | 30 | 30 | 30 |
| 12 | | | Y | | Y | | | | | 0.5 | 0.5 | 0.5 | 164 | 164 | 260 | 26 | F | 0.6 | 18 | 0.5 | A | 1.0 | | | | 49 | 49 | 78 |
| 13 | | | | | | | | | | 1.0 | 1.0 | 1.0 | | | | 61 | M | | 53 | 1.0 | B | 0.8 | | | | | | |
| 14 | | | Y Y | Y | | | | Y | | 1.0 | 1.0 | 1.0 | 513 | 513 | 465 | 37 | M | 0.5 | 74 | 1.0 | A | 1.0 | 0.15 | 0.15 | | 257 | 257 | 232 |
| 15 | | Y | | | | | | | | 1.0 | 1.0 | 1.0 | 220 | 220 | 220 | 36 | F | 1.0 | 74 | 1.0 | A | 1.0 | | | | 220 | 220 | 220 |
| 16 | | | | | | | | | | 1.0 | 1.0 | 1.0 | | | | 9 | M | | 74 | 1.0 | A | 1.0 | | | | | | |
| 17 | Y | | | Y | | | | Y | | 1.0 | 1.0 | 1.0 | 270 | 358 | 270 | 35 | M | 0.5 | 74 | 1.0 | A | 1.0 | | | | 135 | 179 | 135 |
| 18 | | | Y | Y | | | | | | 1.0 | 1.0 | 1.0 | 187 | 288 | 187 | 23 | F | 0.6 | 56 | 1.0 | C | | | | | | | |
| 19 | | | | | Y | | | Y | | 0.7 | 0.7 | 0.7 | 168 | 40 | 40 | 22 | F | 0.6 | 33 | 0.7 | B | 0.8 | 0.17 | | | 56 | 13 | 13 |
| 20 | Y | | | | | | | | | 0.7 | 0.7 | 0.7 | 209 | 209 | 209 | 54 | F | 0.7 | 30 | 0.7 | C | | | | | | | |
| Exposure and Demographics SubTotals: | | | | | | | | | | | | | | | | | | | | | | | 1.38 | 0.95 | 1.50 | 1190 | 1228 | 1176 |

EXPOSURE VALUATION | AUDIENCE VALUATION | INDIVIDUAL SUBTOTALS

| ALTERNATIVE | INDICES | | | WEIGHTED EFFECTIVE FREQUENCY METHOD | | TIME WEIGHTED EFFECTIVE FREQUENCY METHOD | |
|---|---|---|---|---|---|---|---|
| | TIME RECENCY INDEX | RESPONSE INDEX | COST INDEX | SUBTOTAL | TOTAL SCORE | SUBTOTAL | TOTAL SCORE |
| A | 1.0 | 1.0 | 1.10 | 1.38 | 1.25 | 1190 | 1081 |
| B | 1.0 | 1.3 | 1.35 | 0.95 | 0.91 | 1228 | 1183 |
| C | 1.0 | 0.8 | 0.9 | 1.50 | 1.33 | 1176 | 1046 |

FIG. 42

| SCHEDULE NUMBER | NUMBER OF SLOTS | DAYS | AVERAGE INFLUENCE |
|---|---|---|---|
| 1 | 1 | 1 | 13.5% |
| 2 | 2 | 1, 9 | 24.3% |
| 3 | 3 | 1, 9, 15 | 32.8% |
| 4 | 3 (OPTIMIZED) | 1, 6, 14 | 33.1% |

| Analysis Type | Source Programming Segment | Destination Programming Segment |
|---|---|---|
| LEAD-IN SOURCE<br>LEAD-IN RETENTION<br>LEAD-IN LOYALTY<br>LEAD-IN DEFECTION | LAST QUARTER HOUR OF PREVIOUS PROGRAM | FIRST QUARTER HOUR OF SELECTED PROGRAM |
| IN-PROGRAM SOURCE<br>IN-PROGRAM RETENTION<br>IN-PROGRAM LOYALTY<br>IN-PROGRAM DEFECTION | FIRST QUARTER HOUR OF SELECTED PROGRAM | LAST QUARTER HOUR OF SELECTED PROGRAM |
| LEAD-OUT SOURCE<br>LEAD-OUT RETENTION<br>LEAD-OUT LOYALTY<br>LEAD-OUT DEFECTION | LAST QUARTER HOUR OF SELECTED PROGRAM | FIRST QUARTER HOUR OF SUBSEQUENT PROGRAM |
| TUNE-IN SHARE<br>SWITCHING SHARE<br>TUNE-IN + SWITCHING SHARE | LAST QUARTER HOUR OF PREVIOUS PROGRAM | FIRST QUARTER HOUR OF SELECTED PROGRAM |

FIG. 45

| ANALYSIS TYPE | NUMERATOR | DENOMINATOR |
|---|---|---|
| LEAD-IN SOURCE<br>IN-PROGRAM SOURCE<br>LEAD-OUT SOURCE | NUMBER OF PEOPLE WHO WATCHED BOTH THE SOURCE AND THE DESTINATION PROGRAM SEGMENTS. | NUMBER OF PEOPLE WHO WATCHED THE DESTINATION PROGRAM SEGMENT |
| LEAD-IN RETENTION<br>IN-PROGRAM RETENTION<br>LEAD-OUT RETENTION | NUMBER OF PEOPLE WHO WATCHED BOTH THE SOURCE AND THE DESTINATION PROGRAM SEGMENTS. | NUMBER OF PEOPLE WHO WATCHED THE SOURCE PROGRAM SEGMENT |
| LEAD-IN LOYALTY<br>IN-PROGRAM LOYALTY<br>LEAD-OUT LOYALTY | NUMBER OF PEOPLE WHO WATCHED BOTH THE SOURCE AND THE DESTINATION PROGRAM SEGMENTS. | NUMBER OF PEOPLE WHO WATCHED THE SOURCE PROGRAM SEGMENT AND ALSO WATCHED TELEVISION DURING THE DESTINATION PROGRAM SEGMENT |
| LEAD-IN DEFECTION<br>IN-PROGRAM DEFECTION<br>LEAD-OUT DEFECTION | NUMBER OF PEOPLE WHO WATCHED THE SOURCE PROGRAM SEGMENT, AND WHO WATCHED TELEVISION DURING THE DESTINATION PROGRAM SEGMENT BUT DID NOT WATCH THE DESTINATION PROGRAM SEGMENT | NUMBER OF PEOPLE WHO WATCHED THE SOURCE PROGRAM SEGMENT AND ALSO WATCHED TELEVISION DURING THE DESTINATION PROGRAM SEGMENT |
| TUNE-IN SHARE | NUMBER OF PEOPLE WHO WERE NOT WATCHING TELEVISION DURING THE SOURCE PROGRAM SEGMENT BUT WATCHED THE DESTINATION PROGRAM SEGMENT | NUMBER OF PEOPLE WHO WERE NOT WATCHING TELEVISION DURING THE SOURCE PROGRAM SEGMENT, BUT DID WATCH TELEVISION DURING THE DESTINATION PROGRAM SEGMENT |
| SWITCHING SHARE | NUMBER OF PEOPLE WHO WATCHED A COMPETING PROGRAMMING SEGMENT DURING THE SOURCE PROGRAM SEGMENT AND WHO WATCHED THE DESTINATION PROGRAM SEGMENT | NUMBER OF PEOPLE WHO WERE WATCHING TELEVISION DURING BOTH THE SOURCE AND DESTINATION PROGRAM SEGMENTS, BUT WHO CHANGED CHANNELS BETWEEN THE SOURCE AND DESTINATION PROGRAM SEGMENT TIMES |

FIG. 46

METHOD AND APPARATUS FOR ANALYZING DATA AND ADVERTISING OPTIMIZATION

BACKGROUND OF THE INVENTION

1. Field of the Invention

The present invention relates to the field of computer-assisted data manipulation and analysis. More particularly, the present invention relates to methods and techniques for quickly and efficiently accessing and sorting large quantities of demographic data and media access information for various decision-making purposes, especially advertising.

2. Description of Related Art

The business of supplying information and/or entertainment mingled with paid advertising to audiences has become an important part of the world economy. Many large corporations have as their primary business to inform or entertain their customers through media. In addition, most businesses depend on advertising to reach potential customers with product or service information. Television viewing, for example, is one of the most popular activities in homes around the world. Large numbers of people both in the United States and abroad use the television as a primary source for news, education, entertainment, and various social activities. This large population of television viewers is also a very desirable group of consumers, sought after for their purchasing power. Most businesses and companies recognize the potent power of the television when it comes to attracting and retaining consumers for their various products and services. Television has the capability to transmit virtually any message to millions of people in an instant. Because of this enormous potential, television advertising is believed to be one of the most important advertising vehicles available for reaching a desired consumer population.

Because television has an enormous potential to reach and influence many consumers, many businesses spend large amounts of money on television advertising, thereby making advertising revenue a major source of income for both the networks which create and commission television programs and the television stations which broadcast them. Broadcast television advertising revenue is estimated to be in excess of $30 billion per year, which explains why advertisers care so much about television viewing. The most important part of the equation is to try and get the advertising message in front of the right group of television-viewing consumers, i.e., matching the product with the desired target market.

Since the value of target marketing is well known, the focus of most businesses is to try and place their advertisements in commercial slots on television shows that effectively attract and retain the targeted consumer groups. For example, many major sporting events are heavily subsidized by advertising campaigns and commercials promoting beer. On the other hand, most weekly home and garden programs don't present any advertising or commercial promotions for alcoholic beverages. Obviously, the businesses that advertise and market alcoholic beverages such as beer have determined that the consumers who purchase beer are more likely to be watching Monday Night Football than Martha Stewart's Living. By focusing beer-related advertising efforts on those programs that the target audience is most likely to watch, the advertising campaign will, in theory, attract more consumers and pay greater dividends.

To effectively determine which shows are most favored by the desired target market, advertising agencies and businesses have utilized the services of various different research and consulting firms. These firms purportedly have the ability to accurately identify which segment of the consumer population is most likely to be viewing which television program at any given time. In addition, these research firms try to predict which viewers will be most receptive to various advertising campaigns, based on the demographic make-up of the viewing population. Based upon the weekly viewing information prepared and presented by the television viewing-related research firms/agencies, advertising campaigns are born and terminated. Above all, however, these advertising campaigns are most often the result of educated estimates, well-thought out probabilities, and other experience-based decision-making processes. It is most desirable to create an optimal campaign which effectively utilizes a finite combination of resources to communicate to the target audience. While this goal is easy to quantify, it is not so easy to achieve and many advertising campaigns are simply ineffective.

The reason why some advertising campaigns are successful and some are not is really very simple. Although the practice of identifying target markets and developing advertising campaigns attract those targeted consumers is a fairly developed practice, the ability to accurately and efficiently measure which advertising campaigns are most successful and what changes should be made in an advertising campaign to increase the overall effectiveness of the advertising campaign is a far-less developed area of industry. There is no way to effectively gather feedback for an advertising campaign and to accurately measure or evaluate the performance of the advertising effort.

One of the main problems with the currently used models and techniques for identifying and implementing the most optimal advertising campaign for a given product using a given advertising medium is the lack of effective tools for scoring, evaluating, and comparing alternative advertising strategies. There is no well known, acceptable technique or method for evaluating, scoring, and comparing one advertising plan or schedule and strategy with another. As further described below, this deficiency reduces the advertising optimization process to a series of estimates and educated guesses when determining which campaign, from among a group of similar campaigns, will be most successful in accomplishing the desired goals.

Another problem with developing effective media advertising campaigns is directly related to the technology limitations of presently implemented systems. Using the currently-available systems and methods to manipulate and analyze the huge amounts of data that are available to decision-makers can take days or even weeks to accomplish. Frequently, the various systems in use today will provide data that are no longer relevant by the time the data are generated. In addition, the lack of sophisticated advertising optimization tools impose artificial limits on advertising agencies and media planners that are actively involved in the decision-making process.

This is particularly true when trying to create and/or customize a campaign to reach the target market in the most cost-effective manner for a given advertiser. There are, at present, no broad-ranging interactive methods or tools available to the media planner for optimizing an advertising campaign in real time. Many media planners have the data available to make strategic decisions regarding advertising, but the available planning tools do not allow rapid and easy access to the data in an intuitive, interactive environment. Specifically, known systems focus only on "effective reach" and do not allow rapid week-to-week analysis of a unified sample.

In addition, present tools rely heavily on estimates and averages as a means of evaluating the impact of a given advertising plan or schedule. While good estimates may yield reliable results, good estimates are more of an exception than a rule. This means that the planning process is more an art than a science, and many years of trial-and-error experience are required to effectively determine or even estimate the probable effectiveness of a given advertising strategy. Because of these factors, many media planners are relatively ineffective in preparing valuable advertising strategies until they have several years of experience.

Another significant drawback of the systems and methods presently used to analyze television audience viewing data is limited access. Many analysis and decision support systems available today are large, expensive computer systems that many smaller companies cannot afford to purchase. Given limited access to necessary resources, many companies are forced to pay high-priced consultants to analyze the relevant data and to provide access to the desired information. This further limits the value of the available data for companies without the financial resources to engage consultants or purchase expensive equipment.

Without a more effective system for scoring, comparing and optimizing advertising campaigns for specific needs, advertising agencies, networks, businesses, and other interested organizations will continue to be limited in their efforts to produce effective advertising campaigns. The result will undoubtedly be less than optimal use of scarce advertising dollars and an unnecessary loss in revenue for everyone that relies on the presently available systems/methods for analysis and decision-making purposes.

DISCLOSURE OF THE INVENTION

According to a preferred embodiment of the present invention, a method and apparatus for quickly and easily analyzing large quantities of computer-based media-related data is disclosed. The data can be manipulated to evaluate, score and optimize an advertising campaign by interactively comparing many different options. The most preferred embodiment of the present invention is a computer-based decision support system that includes three main components: a database mining engine (DME); an advertising optimization mechanism; and a customized user interface that provides access to the various features associated with the system. In addition, the various preferred embodiments of the present invention are available for use with any standard personal computer, making the system available to a much larger group of decision-making executives than ever before possible.

The user interface, in conjunction with the DME, provides a unique and innovative way to store, retrieve and manipulate data from existing databases containing media-related access data, which describe the access habits and preferences of the media audience. By using a database with a simplified storage and retrieval protocol, the data contained therein can be effectively manipulated in real time. This means that previously complex and lengthy information retrieval and analysis activities can be accomplished in very short periods of time (typically seconds instead of minutes or even hours).

Further, by utilizing the advertising optimization mechanism of the present invention, businesses, networks, and advertising agencies can interactively create, score, rank and compare various proposed or actual advertising strategies in a simple and efficient manner. This allows the decision-makers to more effectively tailor their marketing efforts and successfully reach the desired target market while conserving scarce advertising capital. Finally, the user interface for the system provides access to both the DME and the optimization mechanism in a simple and straightforward manner, significantly reducing training time.

The foregoing and other features and advantages of the invention will be apparent from the following more particular description of preferred embodiments of the invention, as illustrated in the accompanying drawings.

BRIEF DESCRIPTION OF THE DRAWINGS

The preferred embodiments of the present invention will hereinafter be described in conjunction with the appended drawings, where like designations denote like elements, and:

FIG. 2 is a flowchart for converting person-by-person information from one format to another in accordance with a preferred embodiment of the present invention;

FIG. 3 is a flowchart depicting a process for loading database information containing person-by-person information from one storage location to another in accordance with a preferred embodiment of the present invention;

FIG. 5 is a filter mask according to a preferred embodiment of the present invention;

FIG. 9 is a screen shot of cross tabulation data extracted from a media-related record in a database file according to a preferred embodiment of the present invention;

FIG. 10 is a screen shot of an icon for accessing data contained in a database file according to a preferred embodiment of the present invention;

FIG. 11 is screen shot of a line graph representing data contained in a database file according to a preferred embodiment of the present invention;

FIG. 12 is a detailed graphical representation of a media-related database structure according to an alternative preferred embodiment of the present invention;

FIG. 15 is a tabular representation of a viewing history for a series of advertising spots;

FIG. 16 is tabular representation of frequency values for a given number of exposures to an advertising spot;

FIG. 17 is a tabular representation of age range index values for a group of audience members;

FIG. 18 is a tabular representation of income range index values for a group of audience members;

FIG. 19 is a tabular summary of various techniques for valuing exposures to an advertising message;

FIG. 22 is a tabular representation of effective frequency for a simple advertising campaign;

FIG. 23 is a tabular representation of sample index valuation for a given number of exposures to an advertisement;

FIG. 26 is a tabular representation of exposure valuation for various frequencies as applied in several different models;

FIG. 27 is a tabular representation of scoring exposure values as applied in several different models;

FIG. 35 is a tabular representation of a scoring example using a time weighted effective frequency model;

FIG. 38 is a tabular representation of index values based on income information;

FIG. 39 is a tabular representation of index values based on the size of the county where the audience member resides;

FIG. 40 is a tabular representation of index values for exposure recency;

FIG. 41 is a tabular representation of scoring using index values and models according to a preferred embodiment of the present invention;

FIG. 42 is a tabular representation of indices for three advertising alternatives using a scoring model according to a preferred embodiment of the present invention;

FIGS. 45 and 46 indicating properties analysis type.

BEST MODE FOR CARRYING OUT THE INVENTION

Figure 1:
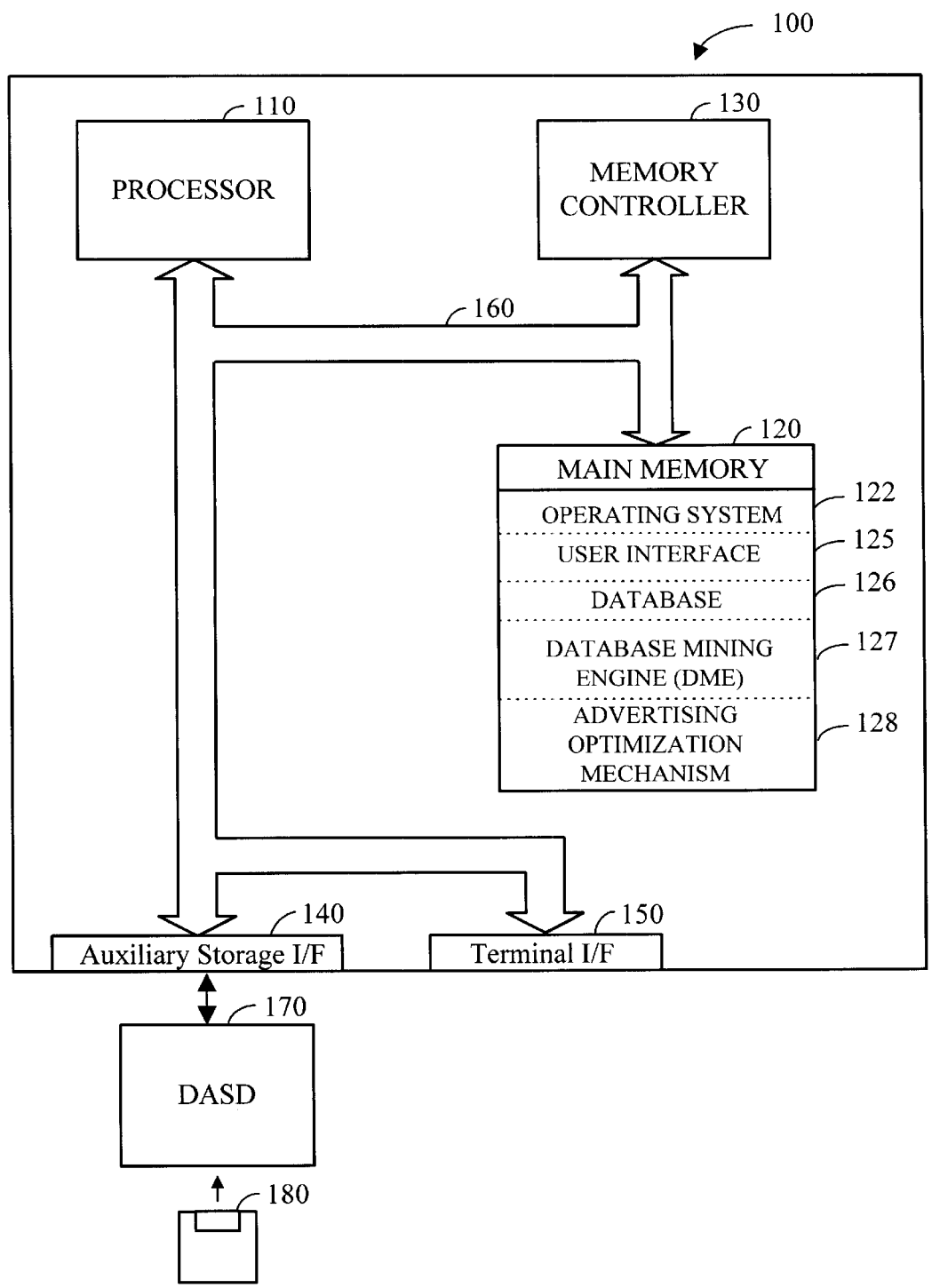
FIG. 1 is a block diagram of a preferred embodiment of the present invention.

The various preferred embodiments of the present invention below are described in connection with the person-by-person data gathered and distributed by Nielsen Media Research Service. This approach has been selected to more clearly and distinctly explain the various embodiments of the present invention. However, although the present invention is described in the context of television viewing, it is important to note that person-by-person data for any type of media may be utilized with various preferred embodiments of the present invention. For example, various embodiments of the present invention are contemplated to address readership information for magazines or newspapers as well as browsing information for individuals accessing web pages on the World Wide Web. The advertising optimization techniques described herein are equally effective for media advertising purposes in all other media as well.

In addition, although the present invention is described in the context of the Nielsen data as used in the United States, many other countries also have data collection services, which supply minute-by-minute, person-by-person data, rather than the mid-15 minute information supplied by Nielsen. The system and methods of the present invention are equally effective for these types of databases.

For those individuals who are not well versed in the generation and use of person-by-person data such as the data associated with the Nielsen Media Research Service, the Overview section below presents many of the concepts that will help to understand the invention. Those who are generally familiar with the present state of television ratings systems and analysis may proceed directly to the detailed description section below.

1. Overview

Television viewing for the population of the United States is estimated by A.C. Nielsen Company (Nielsen) based on viewing logs generated from a sample of 5,000 households, with a total of about 15,000 sample members living in those households. Using specialized equipment attached to televisions in the homes, and communicating with these devices using telephone line connections; Nielsen accumulates data. The Nielsen data describes the viewing choices of each of the household members in a time segment format. This viewing information is packaged and sold as a service by Nielsen to television stations, network programmers, advertising agencies, marketing research groups, universities, and other interested individuals.

On a weekly basis, Nielsen supplies to subscribers of their services person-by-person data files that detail the television viewing choices for each of the sample members in the sample population. The data contained in these files indicate whether or not each of the sample members was watching television during the midpoint of each 15-minute period during the week. If the sample member was watching television, the data also indicate which television program they were watching. Also delivered with the data is additional information describing the demographic characteristics of the households and sample members living in each household, such as geographic territory, household income, education, age, and gender of the members living in the household. The typical size of a data file for one week is about 35 Mbytes.

On a regular basis, Nielsen modifies the overall sample population profile by adding new households or dropping certain households from the sample. A household can be included in the sample for as long as two years, after which time the household will be removed from the sample population. However, for various reasons such as relocation, death, and unreliability, households will often remain in the sample for only a few weeks or months. Also, any given sample household and/or sample member(s) in the sample population can be judged by Nielsen to be out of tab for a day. This means that the television viewing data for a particular household or member for that day are not reliable for estimation and reporting purposes. Similarly, those households and members that have apparently reliable data for a given day are termed in-tab by Nielsen.

Nielsen assigns each of the sample households a globally unique household number that is used to track the data for that household as long as the household remains in the sample. Similarly, each household member is assigned a unique person number within each household. Thus, even though the data files are delivered to subscribers in separate files each week, the television viewing habits of sample members can be tracked for each and every week in which they are included in the sample.

Although people visiting the sample households and watching television in a sample household are logged and identified in the data, they are not assigned unique person numbers. Therefore, the viewing history for household visitors cannot be accurately tracked from one day or week to the next. Nielsen does, however, provide information regarding the age and gender of each visitor in a Nielsen household.

As previously mentioned, although this very significant body of data are available for use by businesses and organizations that hope to benefit by analyzing it, the limitations of the present analysis tools and techniques have been too cumbersome to overcome. The two main factors which in the past have made the Nielsen person-by-person data difficult to work with are the tradeoff between database size and system performance, and the problems associated with the unification of the sample data. In addition, several other difficulties with accessing and analyzing the Nielsen data have been noted. These various problems are explained briefly below.

Many types of data analysis require the use of many weeks, months, or, in some cases, years of data. Patterns of program and network loyalty, for example, cannot be effectively analyzed without a large quantity of data which spans periods that are at least as long as the time required to established these patterns. In the case of the Nielsen data, each additional week of person-by-person data increases the size of the Nielsen database by approximately 35 Mbytes.

As the size of the person-by-person database increases, system-level processing constraints and limitations become a significant concern. If, for example, a person wanted to select only those members of the sample population who fell into a particular demographic group, then the entire database for all weeks would need to be filtered using the specific demographic criteria selected. Using the Nielsen data, this task can be daunting.

In the context of analyzing the Nielsen data, the principle of sample unification refers to the process of correlating the individual data elements from multiple sets of data. The viewing data from each viewing day and week for each sample member, for example, needs to be matched or correlated for analysis. If a particular query requires data for 10 days of viewing spanning a four-week calendar period, then only those sample members who were both in the sample and in-tab for each of the 10 days should be included in the sample. For limited data sets and moderate sample sizes, the sample unification process is manageable using conventional database techniques. For data sets of the size available from Nielsen, the unification task becomes daunting one without the creation of specialized tools as described herein.

The most ambitious studies using Nielsen data previously undertaken by independent researchers and practitioners have spanned only a very few weeks, generally two to four weeks. These researchers have invariably noted the difficulties that they have encountered with the sheer size and cumbersome nature of the data. Periodically, Nielsen processes requests for specialized studies made by subscribers of their services that include more data than this. However, even these special studies still generally span a limited number of weeks of data, require the use of the substantial computing resources available to Nielsen, and may require several weeks of calendar time to generate the results.

Other problems related to the size of the Nielsen data files are particularly troublesome for organizations with multiple geographic locations that need to access the Nielsen data files. Organizations with offices spanning large geographic areas require duplication of the database in each location to avoid frequent remote retrieval of large quantities of data. Weekly updates to each database with 35 Mbytes of data would become prohibitively difficult. In addition, if such a data service became widely popular, the task of delivering and installing data for numerous clients using conventional database management systems would also become unreasonably difficult for a data vendor using existing technology.

In addition, users frequently need access to the data using desktop and laptop computer systems. This requires duplicating portions of the database on other computer systems. For example, if a user needs stand-alone access to three months worth of Nielsen data, they would have to install over 250 Mbytes of data into a new environment.

Yet another problem becomes apparent when using the Nielsen data for demographic studies and analysis. One mode of inquiry into the Nielsen data could be termed "browsing." In this mode a user interactively interrogates the data, often with a given inquiry being based on a previous inquiry. A user would, for example, look at some type of viewing analysis for a selected demographic group, then alter the selected demographic and examine the same analysis for comparison. The data analysis system, then, needs to be able to select a subset of the sample based on the demographic parameters chosen by the user. This, of course, is not a difficult task to perform for many database management systems. The SQL database query language, for example, supports these types of queries. But to do so with sufficient speed to allow interactive browsing is not possible at the current time with widely available computer systems and traditional DBMS software. The data sets are simply too large and the queries too complex.

Finally, the physical structure of the records in the Nielsen data files can also introduce unnecessary complexity into the analysis process. Nielsen supplies data to their subscribers in a record-oriented format. Six different record types are used to detail the person-by-person data and each of these six record types is explained briefly below.

Calendar Record (record type 0).

The calendar record identifies the broadcast week for all other records. One calendar record is provided for each week's data.

Example 0052970512970513970514970515970516970517970518 0970512097051309705140970515097051 6097 05170970518

This calendar record indicates that the week of data included in the data set begins on May 12, 1997 and ends on May 18, 1997.

Classification Data Record (record type 1).

The classification data record describes each household in the sample in terms of income, education of the head of the household, time zone, etc. This record also specifies the age and gender of each household member and visitors to the household during the week. The Nielsen data file typically includes 5000 records per week Example

1000405202000341172483425202222222213109605305A01Q02Y03J04A00

The classification data record shown above describes household number 200034. It indicates that the household was added to the Nielsen sample on the 53$^{rd}$ day of 1996, that the household was in-tab for all seven days of the week, and that the household for the week includes four household members and one visitor. Each household data item in each classification record will be translated to binary form. The income indicator "5" in the record above, for example, is translated to the binary number "00100000." Similarly, the age and gender data for each person in the record is also translated to binary form and assigned to the corresponding attribute in an object created for the person.

Program Data Lead Record (record type 2).

The program data lead record describes each quarter hour of programming broadcast during the week including program name, episode name, air date and time, program genre, etc. Typically, 1500 program data records are used to describe all programming broadcast in a given week Example 20453        1890800003020SEINF052501SEINFELD2100NCS09480128599

The sample program data lead record shown above indicates, among other things, that the Seinfeld show airs on NBC at 2100 hours (9:00 PM), it's a situation comedy, and that the program run length is 30 minutes. Dates, times, and quarter hour values in the program data item are converted from an ASCII representation as shown above to a binary representation, and assigned to corresponding attributes in a program object.

Program Data Continuation Record (record type 3).

Specifies those households and household members who were logged as viewing each quarter hour of network programming broadcast during the week as described by the program data lead record. There are 50,000 program data continuation records supplied in the Nielsen data per week.

Example 304530200034000020003 4Y030200074000020007 4X0102000741020200251000200251T0102003410000200341M0102003820000200382X010200382P02

This record indicates some of the households and people who were watching Seinfeld at 9:00 PM on NBC. As indicated by the 10 character string "200034000" (the "viewing event string") in the record, one of the households was number 200034. In that household, as indicated by a 10 character viewing event string in the record "200034Y03", person number Y03 was also watching the program.

Usage Data Lead Record (record type 4).

The usage data lead record identifies by sequence number each quarter hour during the broadcast week. There are 672 records per week contained in the Nielsen data files.

Example

40066020522200274804115

This usage data lead record assigns the sequence number 0066 to the quarter hour which begins at 10:00 PM on the 2$^{nd}$ day of the week (Monday). 2,748 households in the sample were using their televisions at that time, and 4,115 people were watching television in those households. The date/time in each usage data lead record is noted and used in reading each subsequent usage data continuation record.

Usage Data Continuation Record (record type 5).

Specifies those households and household members who were logged as using the television during each quarter hour as noted by the usage data lead records. There are 200,000 usage data continuation records per week supplied in the Nielsen data files.

Example

5006602000340000200034Y030200034J0402000830000200083W0102001050002001 05W010200105102020020100002002011040200251 0000200251U02

This usage data continuation record identifies some of the 2,748 households and 4,115 people in the sample who were watching television on the 2$^{nd}$ day of the week at 10:00 PM. One of the households was number 200034, as indicated by the 10 character viewing event string "200034000" in the record. In that household, person number Y03 was watching, as indicated by a 10 character "200034Y03" viewing event string in the record. The specific program being watched is not specified. It may have been a network program. Alternatively, it may also have been a cable channel or a broadcasting station unaffiliated with one of the networks.

Two separate records are used to describe television viewing in the Nielsen data files, a program data record and a usage record. The program data record indicates all those persons and households in the sample who viewed a particular network program. Viewing of non-network programming is not indicated in the "program data" record. The "usage" record indicates television usage by person and household. With this data, to find all instances where sample members watched non-network programming, those instances in which the program data indicates the household members were watching network programming must be subtracted from the usage entries. The usage entries remaining after this subtraction are the non-network viewing entries.

2. Definitions

Homes Base.

Home base is defined as the total number of homes in the United States with one or more television sets. Approximately 95 million homes fall into this category. This figure, on a percentage basis, includes more than 98% of all homes.

Prime Time.

The federal government defines prime time as those evening hours during which the television networks are allowed to broadcast their programming. These hours are from 7:00 PM to 11:00 PM on Sunday, and from 8:00 PM to 11:00 PM otherwise.

Households Using Television (HUTS).

HUTS is the total number of homes with televisions turned on at a given time. During prime time this number is often over 60 million. The percentage of all homes with television sets which had those sets turned on is referred to as "percent HUTS"or "HUT rating." If the homes base was 95 million and HUTS was 60 million, then the HUT rating would be HUT rating=homes watching television/homes with television=60 million/95 million=63.2% HUTS This value is consistently referred to as simply HUTS rather than percent HUTS or HUT rating. True HUTS (in millions of homes) is rarely used. This convention is adopted herein as well. In every case where the term "HUTS" is used, this will actually refer to HUT rating. HUT levels typically peak at over 60% during prime time and can be less than 20% between 7:00 and 10:00 a.m. during the summer. HUTS typically bottoms out at about 4:00 a.m. on weekdays at about 7%.

Household Rating.

Household rating is defined as the portion of all homes having televisions sets which had those sets tuned to a particular show. Assuming 95 million televisions in the nation and 15 million are tuned to a particular show then $$\text{rating=homes watching a show/homes base=15 million/95 million=15.8\%}$$

Demographic rating is similar to household rating, but this figure is calculated using the number of people in a particular demographic group who saw the show divided by the number of people in the population for that demographic group. This figure is used as another indicator used for decision-making based on demographics.

Share.

Share is defined as the portion of homes with television sets on which were tuned to a particular show. If 60 million homes had televisions turned on, as in the example above, and 15 million were watching a particular show, then $$\text{share=homes watching a show/homes watching television=15 million/60 million=25\%}$$

Rating and share are related through HUTS.

$$\text{rating=HUTS} \times \text{share=63.2\%} \times 25\% = 15.8\%$$

Homes Delivered.

Advertising effectiveness is sometimes based on homes delivered to an advertiser. This value is defined as the rating for a show multiplied by the total number of homes with television sets. The homes delivered for a show with a 15.8% rating would be $$\text{homes delivered=homes base} \times \text{rating=95 million} \times 15.8\% = 15.0 \text{ million}$$

This is equivalent to the total number of homes with their television sets turned on multiplied by the share. Assuming that 60 million homes were watching the show $$\text{homes delivered=homes base} \times \text{HUTS} \times \text{share=95 million} \times 63.2\% \times 25\% = 15.0 \text{ million}$$

Special rules defined by Nielsen apply for computing these types of household-based measurements for households with multiple television sets during those times when the television sets in the household are tuned to different channels. See Nielsen Media Research [1994] for a detailed description of these rules.

Viewers Per Viewing Household (VPH).

VPH is defined as the number of viewers of television averaged over all households watching television and varies by half-hour and by show. Some shows tend to have larger groups of people watching than other shows. This number by definition is never less than one, and is rarely over two.

Impressions.

Advertisers often speak in terms of impressions. An impression is defined as one person viewing either one show or one advertisement one time. It can be calculated using homes delivered and VPH. Assuming that for a particular show, the average number of people watching per home is two, then impressions is the product of homes delivered and VPH.

$$\text{impressions=homes delivered} \times \text{VPH=homes base} \times \text{rating} \times \text{VPH=95 million} \times 15.8\% \times 2 = 30.0 \text{ million}$$

3. Detailed Description

As explained above, a computer-based system according to a preferred embodiment of the present invention includes four main components: a database mining engine (DME); a DME database; an optimization mechanism; and a user interface which controls the system and allows a user to manipulate and analyze the data in the DME database by using the DME. Taken together, these components offer a powerful tool for manipulating and analyzing Nielsen viewer data for decision-making purposes. Further, since the various embodiments of the present invention are designed to be used in a computer-based environment, a suitable computer system is necessarily a part of the present invention. Each of these main components will now be described in greater detail.

Computer System

Referring now to FIG. 1, a computer-based system 100 for advertising optimization in accordance with the most preferred embodiment of the present invention includes an IBM PC compatible computer. However, those skilled in the art will appreciate that the methods and apparatus of the present invention apply equally to any computer system, regardless of whether the computer system is a complicated multi-user computing apparatus or a single user device such as a personal computer or workstation. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100. Those skilled in the art will recognize that there are many possible computer systems which will be suitable for use with the present invention.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes an object-oriented computer program 122 within main memory 120.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD ROMS, and transmission type media such as digital and analog communication links, including wireless communication links.

Memory controller 130, through use of a processor (not shown) separate from processor 110, is responsible for moving requested information from main memory 120 and/ or through auxiliary storage interface 140 to processor 110. While memory controller 130 is shown as a separate entity for purposes of explanation, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports bi-directional communication in a computer-related environment could be used.

Main memory 120 suitably contains an operating system 122, a graphical user interface 125, a Database Mining Engine (DME) database 126, a Database Mining Engine (DME) 127, a data conversion mechanism 128, and an advertising optimization mechanism 129. Operating system 122 in memory 120 is used to control the functional operation of system 100. Graphical user interface 125 in memory 120 provides access for a user of system 100, allowing the user to access the various features of system 100. DME database 126 is a customized version of a previously created database that is optimized for access by DME 127 via graphical user interface 125. DME 127 is a specialized database management system (DBMS) which is optimized to search, manipulate, and analyze person-by-person records in a database format. DME 127 uses a customized set of filters to access the data contained in DME database 126 to formulate responses to queries from a user of system 100.

Advertising optimization mechanism 129 allows a user of system 100 to interactively create, score, analyze, and compare various advertising-related decisions, using the data contained in DME database 126. Although shown as separate components for this example, the various components shown in memory 120 may be provided separately or, alternatively, may be individual parts of a single software program. The various components loaded into memory 120 are typically loaded into memory 120 from a secondary storage location such as DASD 170. The term "memory" as used herein refers to any storage location in the virtual memory space of system 100.

It should be understood that main memory 120 does not necessarily contain all parts of all mechanisms shown. For example, portions of operating system 122 may be loaded into an instruction cache (not shown) for processor 110 to execute, while other files may well be stored on magnetic or optical disk storage devices (not shown). In addition, although Database Mining Engine (DME) 127 is shown to reside in the same memory location as DME database 126 and operating system 122, it is to be understood that main memory 120 may consist of multiple disparate memory locations (e.g. backside cache, look-aside cache, etc.).

DME AND DME DATABASE

1. Introduction

The following section describes some of the most salient features of DME database 126, DME 127, and the associated techniques and tools used in preparing the Nielsen television-related viewing data (Nielsen data) for use in system 100. In order to more quickly and efficiently process the large volume of data contained in the Nielsen data files, the generally accepted concepts of database design and manipulation so prevalent today must be discarded or modified. This is simply because the various relational and hierarchical database models in use today are too unwieldy for manipulating large data files with any significant speed, absent very specialized and expensive computer hardware. Although not preferred, the methods of the present invention can be practiced with other, less efficient models.

The unique format of DME database 126, combined with the functional aspects of DME 127, overcomes several limitations of conventional database and data processing techniques which tend to reduce the performance of most data analysis systems to unacceptable levels. Although the various preferred embodiments of the present invention are presented and described in the context of television viewing, other types of data may be manipulated and analyzed in a similar fashion. It should be noted that the concepts and techniques of the present invention are equally applicable to tracking and analyzing the behavior of a sample population for visitors to web pages on the World Wide Web. Similarly, information about the readership populations for magazines and newspapers could also be manipulated and analyzed by applying various preferred embodiments of the present invention. Indeed, any advertising firm/agency, business, or other organization that wishes to track large quantities of information regarding various sample populations can successfully implement the various techniques and methods described herein.

A system 100 according to various preferred embodiments of the present invention has the following significant advantages: the ability to add, on a weekly basis, large quantities of data to the existing user databases; a way to easily move relevant portions of existing databases from location to location (such as from a central server to a laptop computer); the ability to retrieve large blocks of data from the database, organize the data in memory, and analyze the data; the ability to filter the data according to user selected demographic criteria; and retrieve information for the same sample members across multiple weeks.

The various capabilities listed above are a direct product of the unique design of DME database 126 and the techniques associated with manipulating the data contained in DME database 126. The design of DME database 126 is performance driven and, for at least one preferred embodiment, is specifically designed to efficiently access the Nielsen data. Using most standard computers, the performance of a general purpose DBMS will typically be inadequate for interactive analysis when manipulating the hundreds of Mbytes of data that comprise the Nielsen data. Recognizing this, a custom DBMS (i.e. DME database 126 and DME 127) can be created to take advantage of the specific characteristics of the data (in this case, television viewing data prepared by Nielsen). The organization and manipulation methods and techniques for accessing DME database 126 are described below.

2. Detailed Description of DME Database

DME Database Organization

A DME database 126 according to a preferred embodiment of the present invention is capable of spanning many weeks and is composed of .tvd discrete files, one file corresponding to each week of the Nielsen data. The name assigned to each of the files in DME database 126 is the date of the Nielsen data contained within that file. For example, data for the week ending Jul. 28, 1997 is contained in a file with the name 19970728.tvd. TVD is an acronym for Television Viewing Data and is used to identify all files with a format suitable for use with the present invention. To add an additional week of Nielsen data to DME database 126, the .tvd file that contains that week's viewing data is simply placed into the directory for DME database 126 along with all other .tvd files. This feature of the present invention makes it very easy to keep DME database 126 up to date.

A user or system administrator can create a copy of all or a selected portion of DME database 126 by copying some or all of the .tvd files to another memory storage location, and then, by using a command that can be accessed through graphical user interface 125 described below, direct system 100 to access the new database location. No other database installation process is required.

DME Database File Format

The .tvd data files contained in DME database 126 can be considered object-oriented for several reasons. First, the various components of the Nielsen data are treated as a group of various objects, i.e. a household object, a person object, a television program object, etc. Accordingly, all of the data for each discrete object, such as a household, person, or television program object, is located contiguously in the .tvd file.

For example, the data describing a particular person's age, gender, and person number are physically adjacent in the individual database file, rather than as columns in a relational table. In addition, the length and relative byte position of each data element for each object in the database file is the same as the required length and byte position of those same data elements in memory 120. Further, the relative positions of data in the file and in memory 120 are the same. A region of memory 120 is allocated for loading a sets of person objects (or program objects, or household objects). Memory 120 is sized according to the type of object being loaded and number of objects in the collection.

Given this memory allocation, the data is loaded in a binary fashion from the Nielsen data file into memory 120. During this loading process, data attributes are ignored. The first byte of person object data for the person collection in the file, for example, is loaded into the first byte of allocated memory. The second byte of data is then loaded into the second byte of allocated memory, etc. This process is both fast and reliable. It is important to note that the data are not loaded as objects, but once the data is loaded into memory 120, system 100 can operate on the data as objects. Third, data items are retrieved from the database as objects and collections of objects, rather than as discrete data elements which are assembled into objects in memory. Finally, the data for similar objects, such as people in the same household, or programs of the same day, are also located contiguously in the file.

This unique database structure allows for binary data transfer of large blocks of objects from disk to memory 120. The objected-oriented database management software (DME 127), requires memory based data objects for processing and can begin operating on the .tvd data immediately after retrieval from DME database file 126.

DME Database File Creation

Although the data received from Nielsen is very valuable for analysis and advertising purposes, the format of the data does not readily lend itself to quick and efficient manipulation. For this reason, the various preferred embodiments of the present invention will read the data from the magnetic tapes supplied by Nielsen, reformat it, and store it in DME database 126 using .tvd files. The data conversion process is detailed in FIG. 2.

Referring now to FIG. 2, a process 200 in accordance with a preferred embodiment of the present invention for converting data from a first data format (i.e., the Nielsen format) to a second format (i.e., the .tvd format) is illustrated. As shown in FIG. 2, process 200 generally involves organizing the input data from the standard format (in this case, the Nielsen format) into the format required for object-oriented processing, then writing this memory data in binary form to individual .tvd files within DME database file 126. The basic steps for this process are: allocate blocks of memory 120 (step 210); assign these memory blocks to arrays of objects, such as arrays of person objects or program objects (step 220); read the data supplied by Nielsen and assign values to the object data elements in memory, such as age, or program name (step 230); and, write the blocks in binary form from memory 120 into a newly created DME database .tvd file (step 240). It is important to note that there is no requirement to locate all blocks of memory 120 in a contiguous fashion. Blocks of memory 120 may be allocated as needed, where needed to accommodate the input data.

Referring now to FIG. 3, a process 300 in accordance with a preferred embodiment of the present invention for accessing DME 127 is illustrated. When the data in DME database 126 is being used for analysis, the direction of data transfer is reversed. First, blocks of memory 120 are allocated and the blocks of memory 120 are assigned to arrays of objects (step 310); the blocks of data are read from the .tvd data files in DME database 126 in binary form into the allocated memory blocks (step 320); and then DME 127 can access the television viewing data. This type of data retrieval is not possible using conventional database systems because the binary representation of the data in a typical database is typically not the same as the data in memory 120. As explained above, for the various preferred embodiments of the present invention, the data storage format is identical.

Note, however, that if the structure of the various data objects in DME database 126 is modified to accommodate expanded types of analysis, then the .tvd database files also need to be modified to reflect those changes. As noted above, data is binary loaded from database file 126 into memory 120. Portions of memory 120 are sized according to the type of object being loaded and the number of objects in the collection. Using a database that is composed of 52 discrete weekly .tvd files, the assumed size of person objects in each of the 52 files is identical. Person objects in collections loaded from the week 1 file are the same size as person objects from the week 10 file.

For example, if the size of person objects in the Nielsen data is expanded by adding additional attributes, such as an occupation attribute or a head-of-household flag, this change would also need to be reflected in the size of the person objects in each of the 52 weeks of data. All 52 files would need to be recreated with the newly resized person objects. The design of DME database 126 does not provide the data type independence of many commercially available database management systems in which the representation of the data in the database is independent of the representation of the data in memory. However, by mirroring the data in both locations, a significant speed advantage is recognized.

As previously mentioned in the Overview section, the records in the Nielsen data files are converted for use with the preferred embodiments of the present invention. Each of the six supplied files plays a part in creating DME database 126 and the following conversion details are performed by DME 127. Once again, information in the calendar record is read but is not entered into the TVD database file. The data in the calendar record is used only to validate dates in other record types.

Each household data item in each classification record is translated to binary form as described in the section "Sample Filtering". This binary form of the data item is then assigned to the corresponding attribute in the household object created for the household. The income indicator "5" in the record above, for example, is translated to the binary number "00100000." Similarly, the age and gender data for each person in the classification record is also translated to binary form and assigned to the corresponding attribute in the person object created for the person. As Household and Person objects are created, they are added to their respective Group collections.

Each program data item in each program data lead record is assigned to the corresponding attribute in the program object created for the program. Dates, times, and quarter hour values in the program data item are converted from an ASCII representation as shown above in the Overview section to a binary representation, and assigned to the corresponding date/time attributes in the program object. As Program objects are created, they are added to the Program Group collection.

Prior to the step in the creation of DME database 126 where the program data continuation records are read, a Viewing Index is created, as described in the section "Viewing Data", and illustrated in the figure showing "Database Structure."

After creating the Viewing Index, for each network viewing event in each program data continuation record, the Household or Person object referred to in the event is found in the Household Group or Person Group collections. As described in the section "Viewing Data," the memory location in the viewing data memory for this household/person and date/time is identified, and a notation is made indicating that the household/person viewing the network program at the indicated date/time. The date/time in each usage data lead record is noted and used in reading each subsequent usage data continuation record.

Using the date/time from the usage lead record, for each viewing event in each usage data continuation record, the Household object or Person object referred to in the event is found in the Household Group or Person Group collections. As described in the section "Viewing Data", the memory location in the viewing data memory for this household/person and date/time is identified. At this point a notation may be made to the record, conditioned on the presence or absence of a preexisting notation:

1) If a notation has already been made in this location based on a viewing event string in a Program Data Continuation record indicating that the household or person was watching network television, then no further notation is made. It can be assumed that the usage viewing event refers to this network viewing.

2) If no notation is found, then it can be assumed that the household or person was viewing non-network television, and a notation is made accordingly.

After processing all Nielsen data records for a given week, the resulting memory objects are written to disk as a TVD database file. Each memory location is written in binary form in sequence: first the viewing index is written. This index includes the offset value described in the section "Viewing Data". Following the index, all household objects are written, followed by all person objects, and program objects. Finally, the actual viewing data is written, all in binary form.

As described above, in the Nielsen data files, two separate records are used to describe television viewing. One is a program data record, and the other is a usage record. The program data record indicates all those persons and households in the sample who viewed a particular network program. Viewing of non-network programming is not indicated in the "program data" record. The "usage" record indicates television usage by person and household. With this record arrangement, to find all instances where sample members watched non-network programming, those instances in which the program data indicates the household members were watching network programming must be subtracted from the usage entries. The usage entries remaining after this subtraction are the non-network viewing entries.

It is important to note that this technique of assigning non-network viewing to those individuals who are viewing television but not viewing network programming will result in occasional over-counting of non-network program viewing. This occurs when the television stations in certain markets delay the broadcasting of regularly scheduled programming. Av viewer can watch the program at the delayed time. Nielsen will attribute the viewing for the program at the regularly scheduled time, but also note television usage at the delayed time. When this occurs, the network television viewing audience counts will be accurate, but the non-network audience counts will be inflated.

Figure 6:
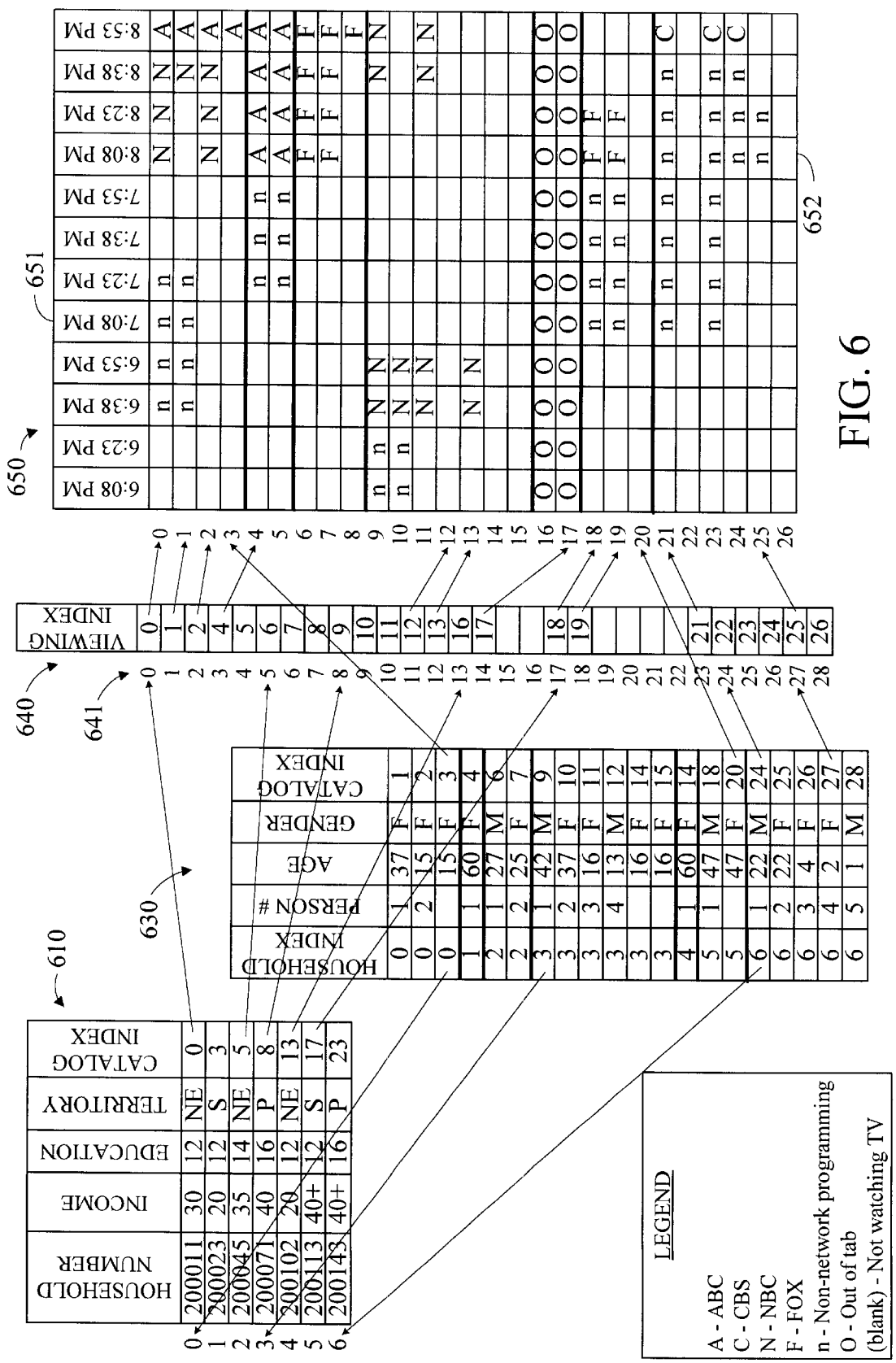
FIG. 6 is a detailed graphical representation of a preferred embodiment of the data structure of the .tvd files in the database.

Referring now to FIG. 12, an alternative preferred embodiment for storing information in database 126 is illustrated. Rather than allocate a fixed set of memory locations for each person/viewing time as shown in FIG. 6, memory space can be conserved by allocating memory only for changes in viewing status. Each viewing record is a variable length record which tracks each change in viewing status over a given period of time. For example, referring to record number 0 in FIG. 6, the viewing status for the individual represented by record 0 changed between 6:23 and 6:38. This change is illustrated in FIG. 12 by a single entry of "6:23<blank>" which indicates that from the beginning of the period covered by the viewing data through 6:23 p.m., the individual represented by this record was not watching television. The next entry is "7:23, n" meaning that the viewer was watching the "n" network beginning from the previous entry through 7:23 p.m. The last entry for each for the records is one for 11:53 p.m., the last time entered for the period. Using these entries as an end-of-file (EOF) delimiter, the end of each variable length record can be detected.

Data Conversion Mechanism

Figure 4:
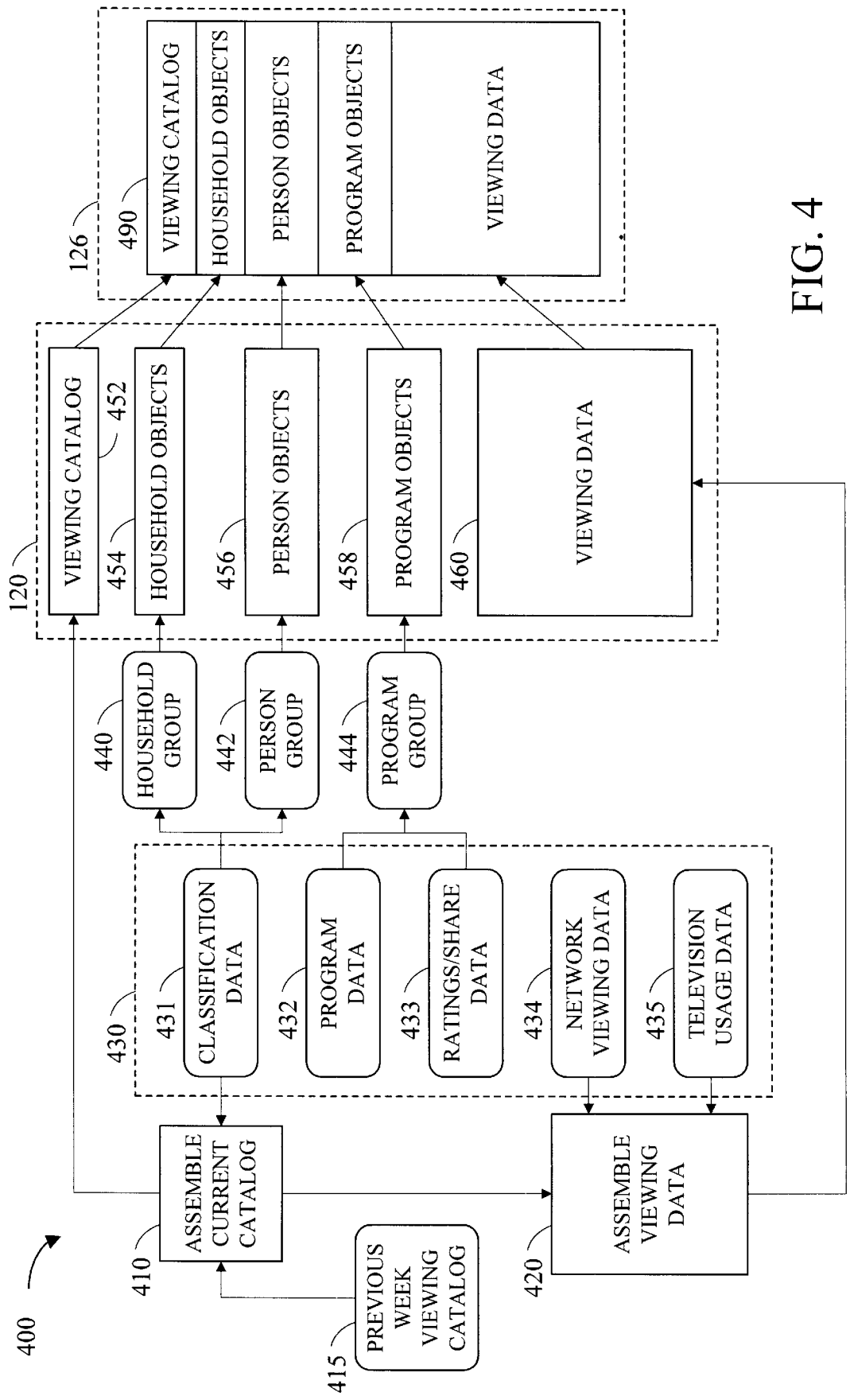
FIG. 4 is a block diagram of a data conversion method according to a preferred embodiment of the present invention.

Referring now to FIG. 4, a sample data conversion mechanism 128 and process adapted for use with the present invention are illustrated. A data conversion mechanism 128 according to a preferred embodiment of the present invention is a computer-implemented process for converting person-by-person media-related data from a first data format to a second data format. The data conversion mechanism will use Processor 110 to execute the process and memory 120 as a storage location in order to convert the data. The process of creating a .tvd data file for DME database 126 involves reorganizing a weekly set of data delivered by Nielsen into the form required for object-oriented processing, then writing this memory data in binary form to DME database 126.

Referring now to FIG. 4, the steps for performing data conversion via process 400 are described.

1) Allocate blocks of memory 120 which are sufficiently large to accommodate the data in the week being processed, and assign these memory blocks to arrays of household objects 454, person objects 456, program objects 458, and viewing data 460. Because it is unknown at this stage of the process exactly how many programs, households, etc. are include in the Nielsen data for the week, it is likely that portions of each of these memory blocks 120 will not be used, and will not be written to the completed .tvd database file 126.

2) Read all classification records.
   a) Read a classification record from Nielsen data 430.
   b) Select the next household object in the household object array 454 for this data.
   c) Translate to binary form the household attributes in the classification record. Each household data item in each classification record is translated to binary form as described in the section "Sample Data Filtering" below. This binary form of the data item is then assigned to the corresponding attribute in the household object selected for that given household. The income indicator "5" in the record above, for example, is translated to the binary number "00100000".
   d) Increment the household object array counter in Household Group 440 to indicate that the household has been added to household object array 454.
   e) For each person in the classification record, select the next person object in person object array 456.
   f) Translate to binary form the person attributes of age and gender data, and assign to the corresponding attribute in the person object selected for the person.
   g) Increment the person object array counter in Person Group 442 to indicate that the person has been added to person object array 456.

3) Assemble current viewing catalog (step 410).
   a) Allocate a block of memory 120 which is sufficiently large to accommodate viewing catalog 452 for the current week.
   b) For each household in household object array 454, locate the entry for the household in the viewing catalog for the previous week.
      i) If an entry exists in the viewing catalog for the previous week, then make an entry for the household in the same position in the viewing catalog for the current week.
      ii) If an entry does not exist in the viewing catalog for the previous week, then make a new entry for the household at the end of the viewing catalog for the current week.
      iii) Assign an entry in the viewing data 460 region of memory 120 for the household. Indicate this entry position in viewing catalog 452 for the current week.
   c) For each household member in the person object array, locate the entry for the person in the viewing catalog for the previous week.
      i) If an entry exists in the viewing catalog for the previous week, then make an entry for the person in the same position in the viewing catalog for the current week.
      ii) If an entry does not exist in the viewing catalog for the previous week, then make a new entry for the person at the end of the viewing catalog for the current week.
      iii) Assign an entry in the viewing data memory region for the person. Indicate this entry position in the viewing catalog for the current week.
   d) Entries are not made in the viewing catalog for those who are not members of households (visitors). Thus, for each person in the person object array who is not a member of a household, assign an entry in the viewing data memory region for the visitor. Indicate this entry position in the person object.

4) Read all program data records (both the lead and the continuation records) from Nielsen data 430.
   a) For each classification lead record, select the next program object in the program object array for this program data.
   b) Assign data items in the program data lead record to the program object selected for the program. Dates, times, and quarter hour values in the program data item are converted from an ASCII representation to a binary representation, and assigned to the corresponding date/time attributes in the program object.
   c) Increment the program object array counter in the Program Group to indicate that the program has been added to the program object array.
   d) For each program data continuation record, locate the Household or Person object referred to in the viewing event in the Household Group or Person Group collections.
   e) As described in the section "Viewing Data in the DME Database", identify the memory location in the viewing data memory for this household/person and date/time using the newly assembled current week viewing catalog for households and household members.
   f) Enter in the viewing data memory location a notation indicating that the household/person viewed the network program at the indicated date/time.

5) Read all usage data records (both the lead and the continuation records).
   a) For each usage lead record, identify the date and time of the quarter hour viewing event for the lead record. This date/time is used in reading each subsequent usage data continuation record.
   b) For each Household or Person in each usage continuation record, locate the Household or Person object in the Household Group 440 or Person Group 442 collections.
   c) As described in the section "Viewing Data in the DME Database", identify the memory location in the viewing data memory for this household/person and date/time using newly assembled current week viewing catalog 452 for households and household members.
   d) Enter in the viewing data memory location a notation indicating that the household/person viewed the television at the indicated date/time. This notation is conditional on the presence of a preexisting notation:

i) If a notation has already been made in this location based on a viewing event string in a Program Data Continuation record indicating that the household or person was watching network television, then no further notation is made. This assumes that the usage viewing event refers to this network viewing event.

ii) If no notation is found, then it may be assumed that the household or person was viewing non-network television, and a notation is made accordingly.

6) Write the allocated blocks of memory 120 onto disk in binary form into a newly created .tvd database file 490 located in DME database 126. In all cases, except as noted, the blocks of data are appended contiguously to .tvd file 490.

a) Write header text which identifies the file for those users who attempt to edit, type or print .tvd file 490.

b) Write a file format version number which can be read by DME.127 c) Write five long integers to .tvd file 490, each initially have a value of zero. These values are used to note the offset position in the database file of each of the arrays of objects and data. Each of these values will be updated (as noted below) with an actual offset value.

d) Write the viewing catalog 452 to .tvd file 490.
  i) Write the length of viewing catalog 452
  ii) Write the portion of viewing catalog 452 which has been used. Note the offset position from the beginning of the file of this catalog.
  iii) Write the offset value to the first offset position as described in (c) above.

e) Write the portion of household object array 454 to .tvd file 490.
  i) Write the number of entries in household object array 454.
  ii) Write the portion of household object array 454 which has been used. Note the offset position from the beginning of the file of this catalog.
  iii) Write the offset value to the second offset position as described in (c) above.

f) Write the portion of the person object array 456 to .tvd file 490.
  i) Write the number of entries in the person object array 456.
  ii) Write the portion of the person object array 456 which has been used. Note the offset position from the beginning of the file of this catalog.
  iii) Write the offset value to the third offset position as described in (c) above.

g) Write the portion of the program object array 458 to .tvd file 490.
  i) Write the number of entries in the program object array 458.
  ii) Write the portion of the program object array 458 which has been used. Note the offset position from the beginning of the file of this catalog.
  iii) Write the offset value to the forth offset position as described in (c) above.

h) Write the portion of the viewing data 460 to the file.
  i) Write the number of entries in the viewing data.
  ii) Note the offset position from the beginning of the file of this data.
  iii) Write the offset value to the fifth offset position as described in (c) above.
  iv) For each of the 28 periods of 6 hours each, write the portion of the viewing data 460 which has been used.

7) Close .tvd database file 490.

8) Write current viewing catalog 452 to a separate file for use in assembling the viewing catalog for the next week.

Although the example presented above specifically references person-by-person media-related data for network broadcasting, cable television network data can be added to the database file using similar techniques. In addition, similar database files can be created for other media types using similar techniques.

Sample Data Filtering Using DME Database

One significant advantage of the preferred embodiments for DME database 126 is the very fast access to the data for purposes of filtering data according to custom queries. Users will typically want to analyze the viewing behavior of selected demographic groups of people or households in the Nielsen sample for purposes of analyzing behavior and targeting desired consumer groups for advertising campaigns. The Nielsen data contains various data elements that can be used for filtering. These elements include: age; gender; income; level of education; profession; hours of weekly television viewing; and the ages of family members that live in the household. This data can be used to identify and select various consumer groups for purposes of analysis relating to advertising campaigns. For example, a user might wish to select all women between the ages of 18 and 49 who live in households with children, and having incomes greater than $40K per year. Rather than using complex mathematical relations to make this sample selection, the data in DME database 126 is organized so that the selection can be made using Boolean logic, which is relatively fast, in order to compute using most typical computer systems.

Referring now to FIG. 5, the data elements for representing the age of the sample audience members, for example, are not stored as integers, but are stored as a 16 bit field where each bit represents one of the available age ranges. The first several age ranges are assigned bits in the field according to the table shown in FIG. 5 Additional age ranges can be represented in a similar manner. Given this structure, filtering the data contained in DME database 126 for age-specific criteria is a simple Boolean mathematical exercise. To select sample members based on age, graphical user interface 125 utilizes a 16 bit age selection mask with the required bits set to indicate the desired age range. If, for example, the user wanted to analyze sample members in the 12–20 age range, then the age selection mask would be 8H+10H+20H=38H (hex), or 0000000000111000 (binary). To determine whether or not a particular sample member represented in DME database 126 is in the desired age range, DME 127 performs a logical "and" operation using the member's age field and the age-appropriate selection mask. In the C programming language, this procedure may be represented as "PersonAge & AgeSelectionMask."

If the person were actually in the age range of 15–17, then the values would be

```
  0000000000010000  (age of audience member)
+ 0000000000111000  (age selection mask)
  ─────────────────
  0000000000010000
```

Which would result in a value of TRUE for the operation, thereby indicating that the person is in the requested age range.

Other similar operations can be envisioned to create filter masks for other demographic information contained in DME database 126. Given this structure, a sample selection based on multiple demographic fields would combine similar elements for those fields. For example, in the C programming language, a selection based on age, income, and education could be represented as shown immediately below.

((PersonAge & AgeSelectionMask) &&
(HouseholdIncome & HouseholdIncomeSelectionMask) &&
(HouseholdEduc & HouseholdEducSelectionMask))

By providing the appropriate mask for the desired demographic characteristics, DME database 126 can be quickly and efficiently screened to locate the sample audience members who fit the desired criteria. This kind of Boolean computation can be executed very quickly on a digital computer. Alternatively, although not preferred, a more conventional approach for a similar selection might be the expression shown immediately below.

if (PersonAge>=LowerSelectionAge &&
PersonAge<=UpperSelectionAge &&
HouseholdIncome>=LowerSelectionIncome &&
HouseholdIncome<=UpperSelectionIncome &&
HouseholdEduc>=LowerSelectionEduc &&
HouseholdEduc<=UpperSelectionEduc)

The above expression is much more time consuming to evaluate in a computer by virtue of the fact that it is longer and the math operations (such as ">=") are more time consuming for processor 110 to evaluate than simple logical operations (such as "&") are to evaluate.

Viewing Data in the DME Database

The Nielsen person-by-person data provides "viewing data" for any given week. The viewing data indicates the viewing choices made by sample households and members living in the sample households for the midpoint of every 15 minute period during the week. For example, for the week of Sep. 22, 1997, the data may indicate that the viewing selection made by person number 2 in household number 200011 at 8:08 PM on Sep. 24; the midpoint of the 8:00 PM to 8:15 PM quarter hour. The viewing options for this person include at least three distinct options: 1) watching one of the broadcast networks—ABC, CBS, Fox, or NBC; 2) watching non-network programming such as unaffiliated stations or cable; or 3) turning the television off, i.e. not watching television. As Nielsen makes other notational options available, such as including the Warner Brothers Network, these new options can also be noted in the data structure without modification.

If a person was not watching television during a given quarter hour, then no viewing records are present in the Nielsen data for that quarter hour. In addition, if the person was not in-tab for that quarter hour, then the data delivered by Nielsen indicates that condition as well.

In DME database 126, the sample viewing data provided by Nielsen for a given week requires about 7 Mbytes of storage space. In order to conserve memory space during subsequent processing and analysis, it is desirable to avoid allocating memory for an entire week of data when a user requires access to only some small portion of it. Therefore, a week of Nielsen viewing data is divided into 28 blocks of about 250 Kbytes each, with each block representing six viewing hours during the week for all households and people in the sample. The broadcasting week begins at 6:00 AM on Monday morning. Thus, the first block of viewing data begins at 6:08 AM on Monday and ends at 11:53 AM. Similarly, the second block begins at 12:08 PM and ends at 5:53 PM, etc.

Each of these 28 blocks for a given week contains all of the viewing data for a six-hour period either for all sample households and members. Thus, if a system user requested viewing data for a particular member of the sample at a specific time, then the appropriate block of data in DME database 126 will be retrieved from DME database 126 and loaded into memory 120. This block will be the block that contains all the viewing data for a six-hour period (including the requested time) for all members of the sample audience. Alternatively, the broadcast week could have been subdivided into a greater or lesser number of blocks by selecting an alternative size for each of the blocks.

This memory management procedure is consistent with anticipated mode of system use for a typical user. Typically, if a user requests a type of analysis which requires viewing data for a given sample member at a particular time, then the desired analysis will generally also require viewing data for many or most other members of the sample audience for the selected time and for adjacent times. Thus, all necessary data is efficiently loaded as a single block from DME database 126 into memory 120. This is a more efficient process than would otherwise be required using conventional database management systems which repeatedly return to the database file for more data for other sample members or for other times in an iterative fashion.

Referring now to FIG. 6, a simplified graphical representation of the data contained in a .tvd file as stored in DME database 126 is shown. The data in FIG. 6 represents a total of 7 households, with 17 members residing in those households, and 3 visitors. The indices in each of the arrays indicate a relationship to the data contained in other arrays, and the viewing status elements in the viewing data arrays are typical for actual members of the sample audience. Although somewhat involved, FIG. 6 presents a useful example of how the actual database arrays relate to each other. In an effort to avoid too much confusion in the figure, not all possible relationship arrows are included.

The arrows in FIG. 6 indicate some of these index relationships between various data elements. Normal programming practice in C++ suggests the use of memory pointers rather than indices to relate one object to another. However, as explained above, it is unknown where in memory 120 the allocated blocks will be located after they are retrieved from DME database 126. So, using the various preferred embodiments of the present invention, pointers cannot be used to access database 126. The indices are used in place of pointers to indicate an offset into each block of data.

Each cell 651 in a block of viewing data 650 indicates a television viewing status element for one member of the Nielsen sample, or for one household, for the mid-point of one quarter hour time period 651. If, for a particular record in the viewing data, the person or household is watching one of the viewing options (such as ABC, CBS, Fox, NBC, one of the cable networks, or non-network programming), it is indicated. If the member was not watching television, then cell 651 is blank. Also indicated is whether or not the sample member is out-of-tab (shown in as an "O" in each out-of-tab cell.)

DME database 126 includes a viewing catalog data structure 640 that relates person and household objects to viewing data 650. The data for each household and person includes an index value 641 indicating the position in viewing catalog 640 for that person. So, to retrieve viewing data for one member of the Nielsen sample for a single quarter hour period, DME 127 will perform the following tasks.

First, DME 127 will allocate a block of memory 120 for all person objects for the desired week, and loads all person data objects from disk into the allocated block of memory 120. Next, DME 127 allocates a block of memory 120 for all household objects for the week, and loads all household data objects from disk into memory 120. Then, DME 127 will allocate a block of memory 120 for viewing data 650 and load the desired six-hour block of viewing data 650 into this block of memory 120. Once viewing data 650 is loaded into memory 120, DME 127 will allocate a small block of memory 120 and loads viewing catalog 640 into this block of memory 120. Next, DME 127 will locate the person object in memory 120 for the requested member of the sample and move to the position in the viewing catalog as indicated by the catalog index value in the person object. Then, DME 127 moves to the appropriate record in the viewing data as indicated by the viewing index value in the viewing catalog. Finally, DME 127 can move along the record in viewing data 650 to the desired time during the six hour time block and retrieve the viewing indicator.

For example, to find out what person #4 in household #200143 was watching at 8:23 PM, DME 127 will search through the array of person objects 630 until it finds person #4 in household #200143. In searching for this particular person, the household number of each person is found by reading the household index number, which, in this case, is 6, and then reading the household number for array element number 6 in the household objects array 610. After finding the person, the catalog index number is read, which, in this case is 27. Then, the $27^{th}$ element of viewing catalog 640 is read for the viewing index, which is 25. Next, the $25^{th}$ element in the person viewing data array is accessed. Finally, by referencing the appropriate cell, this element indicates that at 8:23 PM the person was watching non-network television.

There are at least two important reasons for redirecting the viewing data locations through viewing catalog 640 rather than indicating the location of viewing data with viewing data block 650 directly from household objects array 610 and person objects array 630. First of all, by redirecting the data lookup through viewing catalog 640, viewing catalog 640 can remain consistent from one week to the next. "Consistent" in this context means that the various entries in viewing catalog 640 are in the same relative position from week to week. The entry for person #1 in household #200143, for example, is always six positions following the entry in viewing catalog 640 for person #1 in household #2000013. Given a consistent viewing catalog 640, it is only necessary to load a single person objects array 630 or one household objects array 610 from a single week in order to retrieve data spanning multiple weeks. The catalog index values in these arrays can be used with a viewing catalog 640 from any week of data. Second, in order to maintain consistency between weeks in viewing catalog 640, when members drop out of the sample, empty space will remain in viewing catalog 640. Viewing catalog 640 is not compressed to eliminate the spaces, as indicated by the empty cells shown in viewing catalog 640 at positions 15, 16, and 19–20. But, because of the indirection in the viewing index, these spaces are not necessary in the viewing data, thus reducing the memory requirements for the data.

DME 127 can also be used to review the viewing habits of person #1 in household #200143 over a period of several weeks. As indicated earlier, for the week shown in FIG. 6, the catalog index number for of person #1 in household #20014325, and the viewing index number is 22. For the week shown in FIG. 6 viewing index number 22 is used to retrieve the viewing information. However, in order to analyze what this same person was watching during the following week, there is no need to load another array of person objects 630 and find the catalog index value for this person for the next week, the existing index can be used.

The catalog index values remain the same for all members of the sample from one week to the next. This person's catalog index value is still 25. So, DME 127 loads viewing catalog 640 for the next week and retrieves the viewing index value from catalog index position 25. This viewing index value may not be 22 as it was in the first week. If there is no viewing index value in viewing catalog 640 at position 25 for the next week, it may be assumed that this person was dropped from the sample, and that there is no viewing data contained in viewing data block 650 for the person during that week.

In summary, the use of viewing catalog 640 eliminates two time and memory consuming tasks in retrieving viewing data which spans days or weeks. First, there is no need to load person and household objects for multiple weeks. Next, the need to search through multiple person or household arrays for sample members is also eliminated.

The above described architecture for DME database 126 is not absolutely essential for the implementation of graphical user interface 125. However, because of the significant speed advantages afforded by this structure, it is currently the most preferred embodiment for storing Nielsen data for use with the present invention. An alternative preferred embodiment is described in conjunction with FIG. 12. Future advances in computer hardware may make it possible to implement the present invention using conventional database management techniques. However, the specific database designs of the present invention as described within this specification will still provide a significant speed advantage over other database structures presently known.

Figure 7:
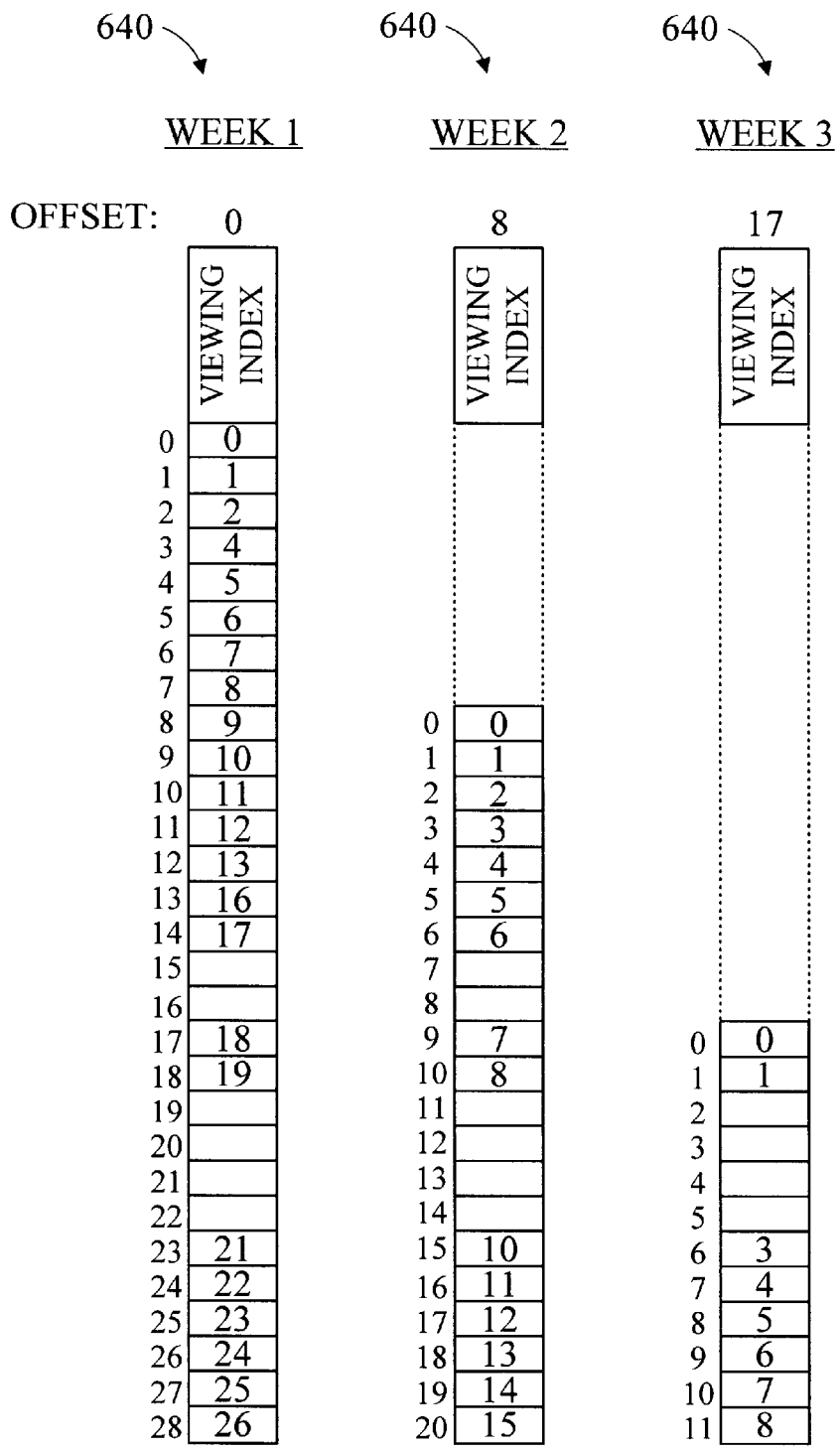
FIG. 7 is a graphical representation of the viewing catalog for a three-week period.

Referring now to FIG. 7, three viewing catalogs 640 for three consecutive weeks are shown (week 1, week 2, and week 3). In the week following that shown in FIG. 6, the first three households (up through household #200045) are dropped from the sample. As shown in FIG. 7, viewing catalog 740 has blank spaces in cells 0–7. There is no viewing data for these households. Therefore, it is no longer necessary to store cells 0–7 in the database, as indicated by the dashed lines in FIG. 7. For week 2, viewing catalog 640 will begin with the cell that corresponds to cell #8 of the previous week, together with the absolute cell position of this first cell. The number of the first valid cell in the viewing catalog is referred to as the catalog offset (in this case, 8).

To extend the example, if households #200071 and #200102 are dropped in week three, then the cells which correspond to cells 0–14 of week 1 will be blank. Recognizing that cells 15, and 16 were already blank, the first valid cell for week three is #17. This is illustrated in FIG. 7 for viewing catalog 640 for week 3. Similarly, only those cells of viewing catalog 640 beginning with cell 17 along with this offset number are stored. From week to week, the index to viewing data for each sample member is stored in the corresponding cells of viewing catalog 640 as shown in FIG. 7. For example, the catalog index for week 1 for person #3 in household number 200143 is 26, for week 2 it is 18, and for week 3 it is 9. Note that the viewing catalog index values (the numbers down the left hand side of each viewing catalogs 640) change from week to week, but the relative positions of the cells do not.

Using the catalog index for any weeks, along with the appropriate catalog offset values, DME 127 can compute the catalog index value for any week in DME database 126. This capability allows DME 127 to avoid needlessly searching through person object arrays or household object arrays for other weeks that include the sample member of interest. For example, it will be fairly simple to retrieve the viewing data for person #3 in household number 200143 for all of the above weeks. Although any week could be used as the starting point, for illustrative purposes week 2 is selected. In week 2 the catalog index for person #3 in household number 200143 is 18.

The catalog index for any other week is a combination of this catalog index and offsets for the two weeks, as calculated below.

Catalog Index n=Catalog Index 0+Offset 0− Offset n

Therefore, the catalog index value for week 1 is:

Catalog Index 1=18+8−0=26 and for week 3 the catalog index value is:

Catalog Index 3=18+8−17=9

Figure 8:
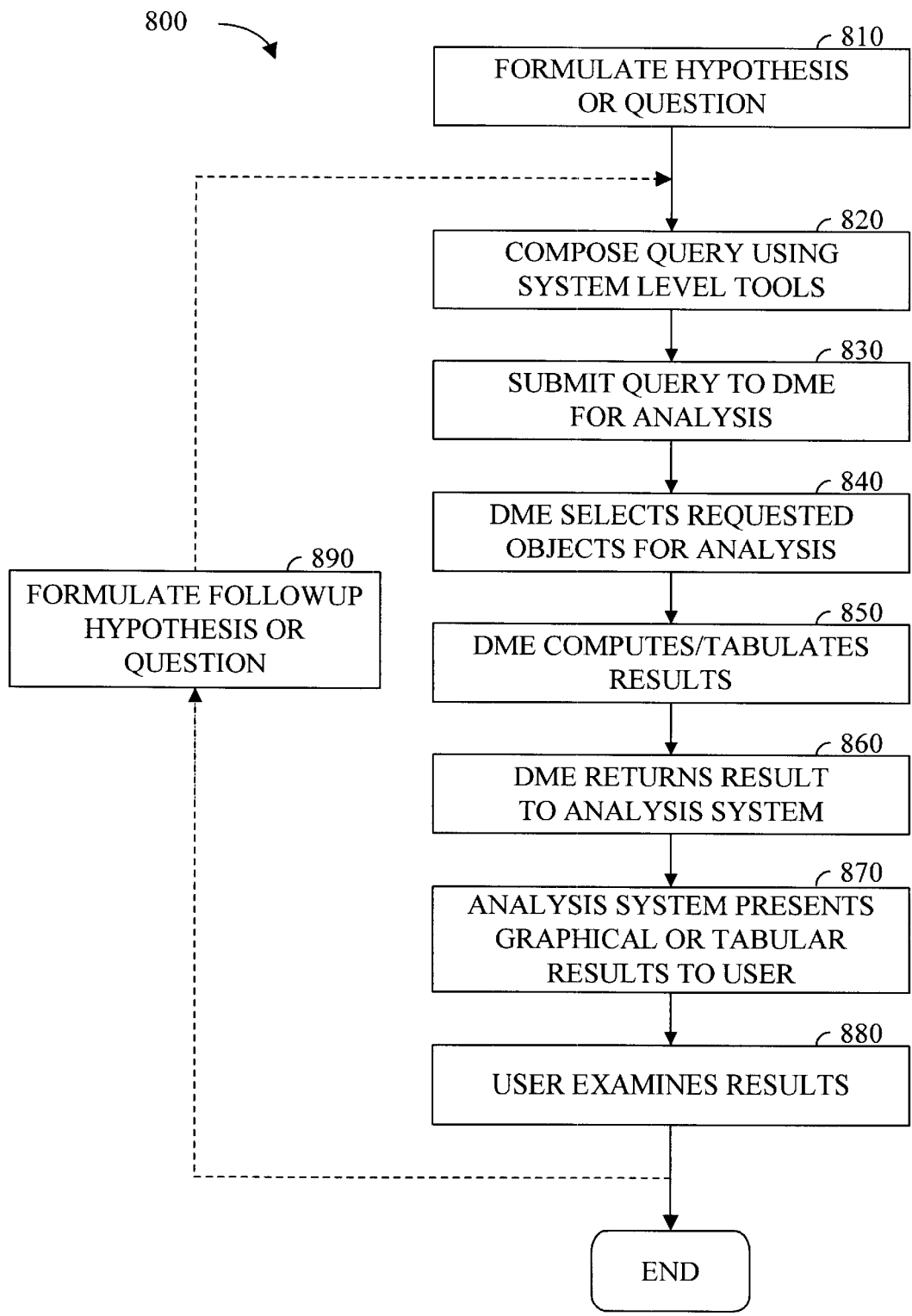
FIG. 8 is a flowchart of a method 800 for using a graphical user interface to analyze the records in the database using a preferred embodiment of the present invention.

The calculation of the catalog index value can be seen in FIG. 8. Now, using a combination of the viewing catalogs 640 and catalog offsets for several weeks, the viewing information for a selected person in the Nielsen sample can be quickly accumulated. First, the viewing catalog index number for the desired person is retrieved from any one of the weeks of interest. Then, each of the viewing catalogs 640, along with the associated catalog offset for the catalog, is successively loaded for person #3 in household number 200143, along with the viewing data for the associated week. Then, by comparing the catalog offset, the viewing index, and catalog values, one of the following conclusions will be reached. If, for any given week, the calculated catalog index is less than the catalog offset for that week, then the desired person has been dropped from the sample. Additionally, if the location in the viewing catalog for the catalog index plus the catalog offset is blank, then the desired person has been dropped from the sample. Finally, if the calculated catalog index is greater than the size of the viewing catalog, then, for that specific week, the person has not yet been added to the sample.

Most types of analysis dealing with advertising and broadcasting require retrieval of media exposure data for demographically related groups of people, not just individuals as in the example above. For example, it might be desirable to know what people in the 18–49 age group were watching at time 1 during week 1, time 2 during week 2, and at time 3 during week 3. DME database 126 is designed so as to be particularly well suited for these types of queries. This is illustrated in the following pseudo-code shown immediately below.

1) load the person and household objects for week 1
2) for each of three weeks
3) load the viewing catalog
4) load the catalog offset
5) load the viewing data
6) next
7) for each person in week 1
8) if this person is in the selected demographic group
9) for each week n
10) calculate the catalog index
11) retrieve the viewing data for time n
12) if this person is not in-tab or in the sample
13) go to the next person
14) end if
15) next
16) add results to summary values
17) end if
18) next
19) return the summary values Viewing catalog 640 will not grow indefinitely because viewing catalog index positions are assigned to households and people in the order in which they are added to the Nielsen sample. Therefore, the sequence in which they are dropped from viewing catalog 640 will be in approximate chronological order. The sample members that are most likely to be dropped from the sample are at the top of the catalog index because they have been in the sample the longest.

User Interface

Graphical user interface 125 provides access to DME 127 and, by extension, to DME database 126 via DME 127. User interface 125 provides an opportunity for a media planner to distribute advertisements over time or space based on actual or anticipated individual or collective advertising exposure. There are several unique characteristics available in conjunction with user interface 125 that are especially advantageous for analyzing media-related audience access information, such as the Nielsen data for television viewing. Each of these specific features is explained below.

Referring now to FIG. 8, a method 800 for using a preferred embodiment of the present invention to access the television viewing data is described. System users can gain insight into how audiences make television viewing decisions by using the system to interactively browse through the viewing data. To use the system, a person typically iterates through the steps illustrated in FIG. 8. The user formulates a question or hypothesis about audience viewing behavior (step 810). The user composes a query based on the question or hypothesis using graphical tools supplied user interface 125 (step 820). The user submits the query to the DBMS (step 830). DME 127 selects a subset of the audience sample based on demographic choices the user made in composing the query (step 840). DME 127 computes/tabulates the results (step 850) and returns the results to system 100 (step 860). Then, user interface 125 of system 100 presents the query results in graphical and/or tabular form to the user (step 870). The user then examines the results, and in doing so, may formulate new questions or hypotheses about viewing patterns and decisions (step 890). In this case, and based on these new hypotheses, the user may return to step 810 as often as desired in order to compose one or more new queries.

Referring now to FIG. 9, sample cross tabulation information for the hit television program "Friends" is shown. This type of graphical presentation for media-related data is not readily available for general use in the market today. Typically, this type of information is only available by contacting organizations that specialize in producing it. However, with the various preferred embodiments of the present invention, this type of information can be made readily available to a large audience. Another feature of graphic user interface 125 is the ease of selecting desired demographic information. Demographic groups can be selected by adjusting the length and position of a series of graphical bars, in which the position of each bar represents the selected range for a single demographic attribute. The user clicks on the numerical values indicating the selected range of values. The bar position is adjusted to reflect this selection. In addition, a user of system 100 can immediately access a variety of useful media-related person-by-person information by merely clicking on a single icon.

Similarly, referring now to FIG. 10, a user may "click" a mouse on the defection icon and generate the line graph shown in FIG. 11. The icon-driven graphical user interface 125 provides single click access to very sophisticated types of information. Anywhere on any screen where a program names or data is displayed, the user may retrieve more detailed information on a given program by selecting the program name or data region using the mouse. Alternatively, if a user selects a program as described above, the system could be configured to display historical ratings trends. Finally, the user can customize the system to determine the information that is displayed when the user selects an item. Some useful items that can be accessed via user interface 125 are explained briefly below.

Program Lists.

Using a variety of interactive mechanisms, a user can assemble lists of program episodes. Analysis can then be performed on these lists.

Program Schedule Data Dynamics.

A user can select a program plan or schedule for display, and then select other data elements for display in the context of the plan or schedule. The user can, for example, select for display the programming schedule for NBC for all Monday evenings between two dates. The user then could select for display adjacent to the name of each of the programs the retention or lead-in value for the program.

Advertising Exposure Valuations

Some of the features of graphical user interface 125 provide mechanisms allowing the user the ability to assign advertising response values to various selected alternatives. This allows a media planner to perform "what-if" analysis to compare various options and determine which options are most viable. In addition, costs for various advertising exposure options can be assigned based on time or space boundaries for the purpose of scoring or valuing various alternative options for an advertising plan. For example, the media planner can graphically interact with the mechanisms of user interface 125 to select various options from a variety of alternatives, thereby arranging a proposed or actual advertising schedule in space and time. User interface 125 will provide real-time feedback for comparing the various options as the media planner cycles through the available choices to determine the most effective use of resources. Through the mechanisms of user interface 125, the media planner can specify "space" boundaries for a given advertisement or group of advertisements, thereby maintaining a specified distance from other advertisements. The mechanisms of user interface 125 can also provide information regarding the estimated influence of advertising messages on individuals or audiences base on many factors such as exposure influence over time based on the declining influence of advertising over time, the accumulated influence effect of multiple exposures over time, influence due to frequency of exposure to the advertisements, etc.

A computer system 100 for data manipulation and analysis in accordance with a preferred embodiment of the present invention employs a unique user interface 125 which, in conjunction with DME 127, can retrieve the Nielsen data from DME database 126 and then present the data in graphical and tabular forms to system users. Then, combining this information in various ways using advertising optimization mechanism 128, advertizing decisions can be optimized for practically any desired set of objectives. The various embodiments of user interface 125 are designed to be easy to use and intuitively simple. This allows broadcasting and advertising professionals to understand the viewing patterns of the television audience with little or no formal training and to quickly and easily arrive at optimal advertising solutions for the desired objectives.

System users are often interested in the television viewing behavior of particular demographic groups. They may, for example, be interested only in adults in the age range of 18 to 49 years old who live in the northeast United States, and who live in households with incomes greater than $40,000 per year. The data analysis system of the present invention is designed to provide convenient isolation of these types of demographic groups in the sample, and the necessary tools for analyzing their viewing habits.

Advertising Optimization Mechanism

1. Introduction

A significant challenge in media advertising is to identify optimal compromises in satisfying simultaneous but sometimes conflicting advertising objectives. The media advertising planner, for example, would like to advertise only to those people who frequently use an advertised product or service, but he recognized that many or most people, to some degree, may be potential product or service users; that an advertising audience is composed of a range potential for using an advertised product or service. The planner targets one well-defined demographic group in terms of age, gender, income, education, territory, etc. but also recognizes that people in other demographic groups may also have some marginal value as potential customers. The planner wants broad advertising reach, but only to the extent that it is cost effective and does not result in excess exposure. The audience needs to be informed about the product but not saturated with the advertising message. In addition, advertisements need to be aired on specific days or times so that the message is still fresh in the minds of the audience when they are ready to purchase. Finally, the advertisements also need to be placed on programs where the audience is attentive, and where the programming is consistent with the advertising message.

The range and volume of data available to a media planner that can be used to develop an advertising plan can be formidable. Data can be readily licensed from a variety of sources that detail a variety of elements important to the planning process. Some data measures individual and aggregate exposure to advertising media using a breadth of demographic and other factors. Other data specify the product and service usage habits by either demographic group or media usage. Media planners readily agree that the data is potentially valuable in assessing the merits of a media plan. The challenge however, is to systematically use all of these data in guiding the development of a optimal plan. All of the data is systematically considered and weighted at the same time.

The following portion of this specification describes the preferred embodiments of an integrated method for optimizing the scheduling or positioning of advertisements and promotions in a media environment. The integrated method is accomplished by using advertising optimization mechanism 129 (shown in FIG. 1). The method is integrated in the sense that it considers a comprehensive set of factors for identifying optimal plans or schedule, including product or service usage, reach, frequency, learning, timing, demographics, viewer response, and cost. Using this method, all of these factors can be considered simultaneously in the decision making process. This is accomplished by measuring the achievement of specific objectives based on these factors using detailed historical audience exposure data, and then merging the individual factor measurements to arrive at a comprehensive indicator of advertising success.

The various preferred embodiments of the optimization methods described herein may be used at several different points during the process of developing a comprehensive advertising campaign. It could be used early in the planning process to test the sensitivity of selected advertising objectives against media vehicles. Later in the process, it could be used to build plans or schedule, or test modifications to a plan or schedule when more is known about the availability of advertising slots. Finally, after an advertising campaign begins, the system could be used to compare planned versus actual objectives, to monitor the effectiveness of the campaign, and to adjust the plan or schedule to make up for deficiencies. In cases where there is detailed information available to the planner about market conditions and consumer characteristics, the method consistently and systematically applies this information in the decision making process. When very little information is available, the method can still be used by the media planner in investigating the efficiency of past advertising campaigns, and in improving the planner's understanding of audience exposure patterns.

In addition, the various preferred embodiments of the present invention can significantly improve the efficiency of creating advertising plans or schedule for a variety of media types (i.e., print media, radio, television, etc.). The methods of optimization presented herein consistently include much more relevant data than many other planning techniques generally in use today. The methods embodiment in advertising optimization mechanism 129 provide the framework for describing all types of media objectives and presents a knowledgeable user with a complete complement of tools necessary for quickly and easily performing what-if studies and making profitable advertising decisions.

2. Detailed Description

Advertising Optimization

The process of optimizing an advertising plan or schedule according the preferred embodiments of the present invention is an incremental one. It begins in the same way that conventional media planning processes begin, by defining a set of media objectives that are generally based on market objectives and research information.

Figure 13:
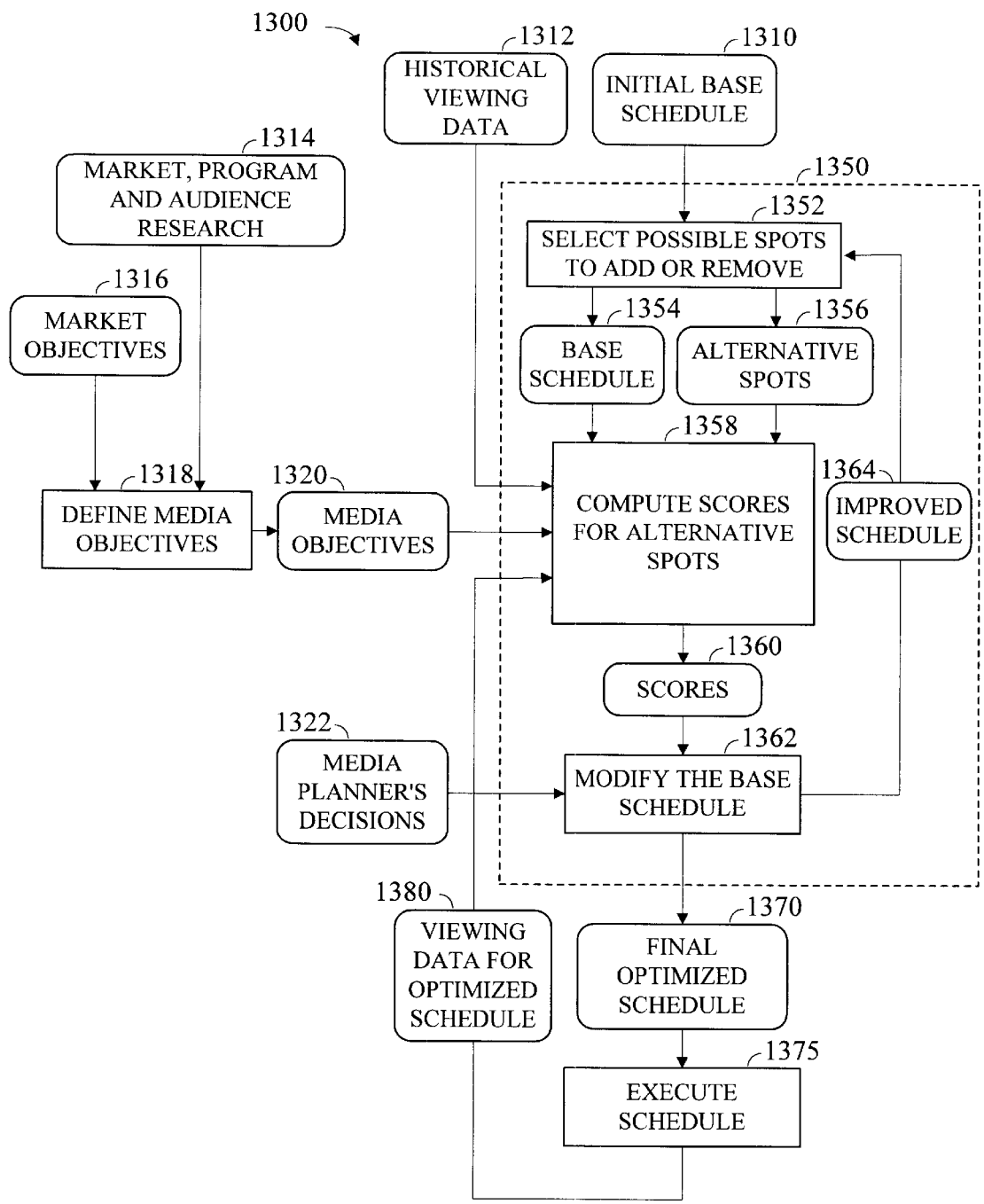
FIG. 13 is a flow chart depicting an optimization method according to a preferred embodiment of the present invention.

Referring now to FIG. 13, a process 1300 for optimizing an advertising plan or schedule according to a preferred embodiment of the present invention is described. Typically, an initial based plan or schedule 1310 is prepared, again, in generally the same way that advertising plans or schedule are prepared currently. However, after the base plan or schedule is prepared, adjustments, additions, and deletions are made in a very different manner. This is where optimization process 1300 takes over, by incrementally modifying the base plan or schedule to more closely meet the set of media objectives, or to reduce cost. Several spots are selected by the media planner as possible additions to (or deletions from) the plan or schedule (step 1352). Each of these alternative spots is scored according to its ability to efficiently contribute to meeting the objectives (step 1358), resulting in a series of scores 1360. It should be noted that historical viewing data 1312, market, program and audience research 1314, market objectives 1316, media objectives 1320 are all possible factors to be used in the scoring process. In addition, viewing data for an optimized plan or schedule 1380 may also be used as a feedback mechanism for computing scores.

Then, based on these scores, the media planner selects one of the alternative spots to add to (or delete from) the advertising plan or schedule. This improved plan or schedule 1364 then becomes the base plan or schedule upon which further modifications can be made using this same optimization technique (step 1362). The media planner continues to iterate through this process until satisfied with the optimized plan or schedule. At that point the final optimal plan or schedule 1370 is achieved, the initial optimization process ends, and the plan or schedule is executed (step 1375). However, as shown in FIG. 13, part of the process may include additional feedback and scoring, as desired.

Given this type of interaction, system 100 provides a user interface 125 for optimization purposes and the necessary tools (i.e. DME 127) to manipulate DME database 126. This allows system 100 to be used to program the plan or schedule and to rapidly achieve the desired results. According to a preferred embodiment of the present invention, an advertising plan or schedule is optimized one spot at a time. This is because the contributed value of adding an advertisement to a plan or schedule depends on what spots are already in the plan or schedule. In the case of broadcast advertising, for example, an advertisement in isolation may have one value or score, while the value or score of the same advertisement could be far different if it were aired immediately following another advertisement in the same advertising plan or schedule.

As shown in FIG. 13, an optimization mechanism or process 1350 could be an interactive one between a media planner and system 100. Although scoring is not particularly complex mathematically, it is data and computation intensive, and requires access to large, person-by-person, media exposure databases, such as the Nielsen data. In order to optimize an advertising plan or schedule, a media planner should take several steps. First, the media planner should use market, program and audience research input 1314 coupled with market objectives input 1316 to define the desired media objectives (step 1318). If, for any reason, an interactive approach is not desired, the system can be configured to automatically iterate through a series of options to find the highest scores.

In initiating the planning process for an advertising campaign, media planners will typically select objectives for the campaign. Currently, these objectives are often established in terms of desired reach and frequency, and are based on experience and techniques separate from the optimization techniques described herein. One objective for an advertising campaign, for example, might be to reach 60% of the adults 18–49 in a population with at least three "opportunities to see" over a four week period. Based on these objectives, then, advertising vehicles and advertising plans or schedule are selected.

The preferred embodiments of the present invention described herein expand on the options available to media planners for setting advertising campaign objectives. The methods of the present invention increase the flexibility available to media planners in specifying reach and frequency objectives. For example, various preferred embodiments of the present invention allow a media planner to specify the relative value of several levels of exposure at the same time. The media planner is no longer confined to selecting a single level at which advertising exposure becomes effective. Further, the present invention provides options for specifying campaign objectives not previously used.

Media planners, for example, have long believed that advertising exposure becomes increasingly valuable as the time between exposure and the purchasing decision narrows. Without the methods of the present invention, however, there has been no systematic way of incorporating these beliefs into the planning process. Therefore, the present invention not only outlines a method which media planners can use to specify temporal advertising objectives, but it also includes a method for using these objectives in scoring specific advertising campaigns for decision-making purposes. Using at least one preferred embodiment of the present invention, for example, a media planner can specify that an exposure on the same day as a purchasing decision for a particular item has twice the value as an exposure on the day previous to the decision.

Once identified, media objectives input 1320 become a critical input parameter for optimization process 1350. In addition to media objectives input 1320, historical viewing data input 1312 and the initial base plan or schedule input 1310 are used as contributing factors for scoring various advertising choices in a subsequent step. Historical viewing data input 1312 is typically Nielsen person-by-person data or some other relevant source of data regarding viewers and their person-by-person viewing choices.

Next, the media planner will identify and select (step 1352) alternative spots input factor 1356 to add to or delete from the initial base plan or schedule input 1310 to arrive at a new base plan or schedule input 1354. Once new base plan or schedule input 1354 is in place, the media planner can start the computer-based process of scoring each of the alternatives (step 1358). Step 1358 represents an automatic scoring process, based on predetermined parameters, which is performed by system 100. The actual scoring methodology is explained below in conjunction with FIG. 14. The computed scores input 1360 is used to modify base plan or schedule input 1354 (step 1362). From this point, the media planner can make various decisions 1322 and return to step 1352 to analyze the value of the selected changes. This iterative process continues until the media planner arrives at the final optimized plan or schedule 1370. Finally, the media planner will execute the optimized plan or schedule (step 1375). Note that the media planner can have input to modify the base plan or schedule each time through the loop by making selections from among the scored alternatives. This input is illustrated by media planner's decisions 1322.

So, as illustrated by the example above, method 1300 for optimizing an overall advertising plan or schedule is a gradual process. It is also important to note that, even after a plan or schedule begins to run, a media planner may wish to review the results of the optimized plan or schedule using actual exposure data for the first few weeks of the plan or schedule. The feedback loop in FIG. 13 indicates that viewing data input 1380 for the optimized plan or schedule can become input to the process of computing plan or schedule scores. This allows a media planner to further refine an advertising campaign after implementation based on results of the previously implemented decisions. This feedback activity is very valuable to a media planner and represents yet another way that system 100 can be used.

Scoring Methodology

It should be clear from the discussion above that the process used to compute the scores of alternative spots is the key to effectively and efficiently optimizing an advertising plan or schedule. If the scoring process is flexible, accurate, and fast, then a media planner should be able to search through many alternative plans or schedule for one that is efficient in terms of meeting the pre-identified media objectives, and, at the same time, minimizes cost. This most preferred embodiments of the scoring process implemented by system 100 is detailed below.

Figure 14:
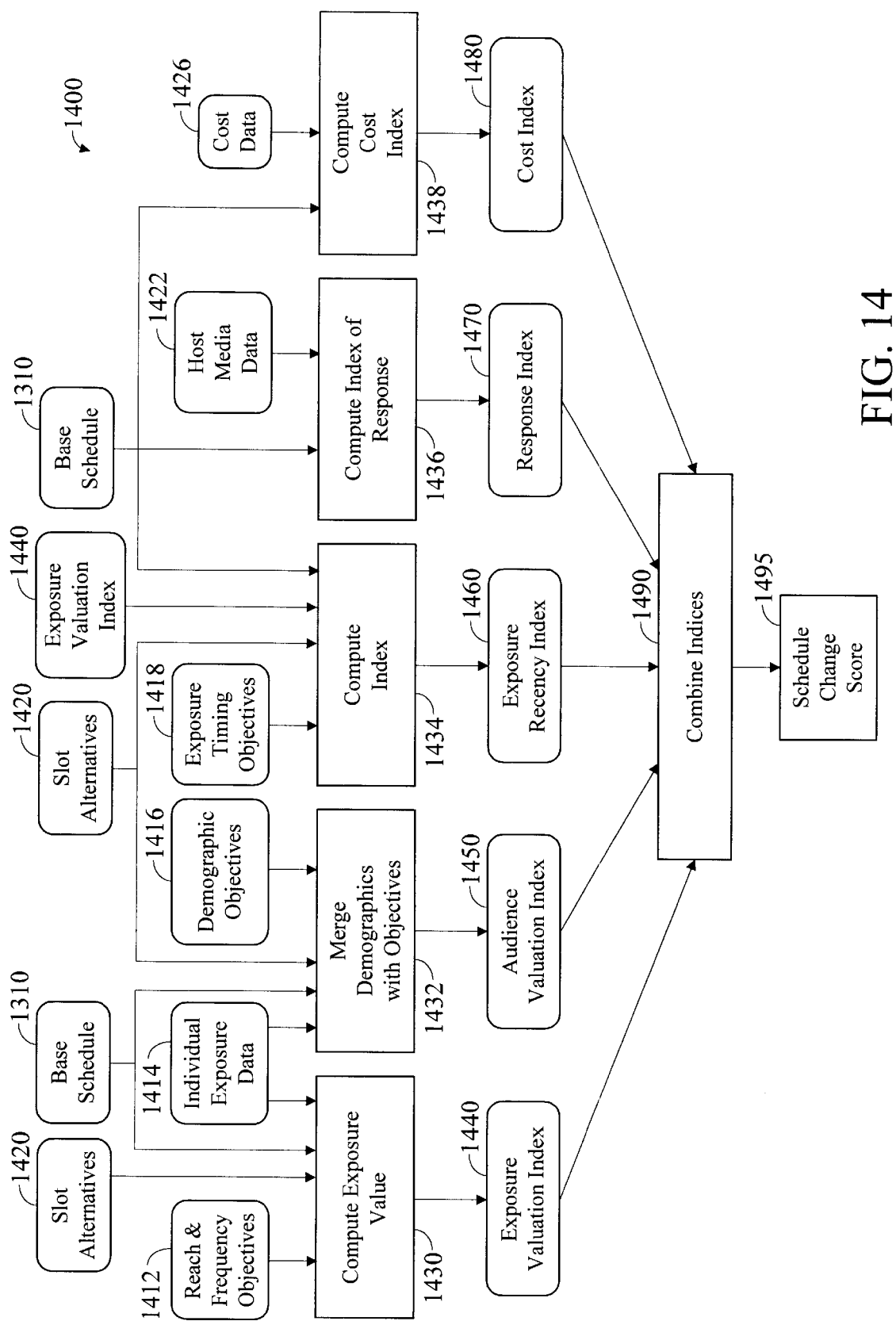
FIG. 14 is a block diagram of a scoring calculation method according to a preferred embodiment of the present invention.

Referring now to FIG. 14, a scoring method 1400 according to a preferred embodiment of the present invention is illustrated. Scoring method 1400 may be used as step 1358 of FIG. 13. As shown in FIG. 14, the total score for a given alternative spot is preferably composed of five distinct measures or indices which are combined into a single score. Each of these five factors is computed based on media objectives and/or historical exposure data for individual members of a sample audience. It is important to note that in the most preferred embodiments of the present invention, every element that could influence the value of an advertising plan or schedule is included in one and only one of the five factors. It is also important to note that certain of these factors may be omitted. However, the most preferred embodiments of the present invention uses all five indices or factors.

This flexible scoring design allows a media planner to use all five of the indices, if desired. Alternatively, a media planner may wish to generate an optimum advertising plan or schedule using limited data that does not need input data for all five indices. If the relevant data regarding host media data required to generate a response index are not available, the media planner can ignore the response index. The resulting optimum campaign may not reflect the influence of variations in response, but it may be adequate for early planning purposes. Similarly, if a media planner chose to ignore advertising spot timing while, at the same time, factor in detailed demographic data, this could also be accomplished.

The computed value for each of these five factors is referred to as an index, and as such is an indicator of relative, rather than absolute, value. The audience valuation index, for example, is a number that indicates the relative value of audience members to a particular advertiser. The value has no units of measure, such as $/person, but is expressed as a percentage. If one plan or schedule has an exposure valuation index of 200% for an advertiser, and another is rated at 100%, then the first has twice the value to that advertiser as the second does. This allows for easy and accurate comparisons to be made.

In order to more accurately describe the scoring process and methodology, the following section presents a brief overview of the scoring process. First, each of the indices is described. Next, the scoring process is presented and described in equation form. Finally, a specific detailed example of how system 100 uses a simple plan or schedule and a small audience sample to compute a score.

Scoring Factor Description

According to a preferred embodiment of the present invention, there are five indices used to score each alternative slot or scheduling choice that a media planner may consider in the advertising optimization process. These five indices are: an exposure valuation index 1440; an audience valuation index 1450; an exposure recency index 1460; a response index 1470; and a cost index 1480. Each of these indices is explained briefly below. While the descriptions below provide insight into specific preferred embodiments, many variations are possible, based on the preferences and goals of the media planners implementing the scoring methodology.

Exposure Valuation Index 1440.

Exposure valuation index 1440 is the sum of the value of all individual audience exposures to an alternative spot. It reflects that belief that the value of a first exposure for an individual may not have the same value as a second exposure, or a third exposure. Exposure valuation index 1440 represents a total exposure valuation, not an average. If an alternative spot has many exposures because of scheduling or vehicle popularity (i.e., the spot is shown during a highly rated program), then the value of the spot is higher than if few viewers are exposed to the spot. The value of each individual exposure is computed using one of several techniques, which are all based on two significant elements. Those two elements are exposure objectives in the media plan, and the exposure history for the individual audience member.

One technique, for example, depends on an assigned exposure value for each frequency level. The first exposure to an advertisement by an individual may be assigned a value of 1.0. A second exposure may be valued at 2.5, etc. Then, the viewing history for each member of an audience who is exposed to the advertisement of interest is examined to determine the number of times each has seen the advertisement previously. Finally, the exposure value is returned for that frequency level. These exposure values are summed across all exposures to produce exposure valuation index 1440.

Suppose two people are together in a room watching television when an advertisement is aired. The first person has never seen the ad before, while the second person has already seen the ad 100 times. The value to the advertiser of airing the ad is different for the two people. The first person might learn something about the advertised product, while the second person will probably only be annoyed by having to view the ad for the $101^{st}$ time. The value to the advertiser of exposing the first person to the ad might be quantified as having a value of 1.0, while the second person has a value of zero or less than zero. Using a similar approach for the rest of the viewing audience, and by summing the values of all of the individual exposures, the total exposure value for this advertisement can be determined. This number is a total exposure valuation, not an average. If an alternative spot results in many impressions because of scheduling or vehicle popularity, then the value of the spot is higher than if few impressions result.

Note that the potential exposure value of the advertising slot will be different for each advertiser and for each advertising message depending on how frequently the ad has been aired previously, when it was aired, and who in the audience has already seen the ad.

In computing exposure valuation for specific dates and times in the future, there are at least two possible sources of respondent level data available for use in the evaluation. The first is to identify a time in the past for which respondent level data is available, during which time the media and advertising conditions are similar to those anticipated during the advertising campaign. Some of the considerations that might influence the selection of the historical period include proximity to holiday periods, sporting events, other seasonal conditions, etc. Exposure valuation can be based directly on this historical data. The most significant advantage to this approach is simplicity.

The second option would be to forecast viewing behavior at the individual respondent level based on historical data. This forecasted viewing could then be used as the basis for computing exposure valuation.

Audience Valuation Index 1450.

The target audience for many media plans is narrowly defined using just a few demographic parameters, such as age and gender; women 18–49, for example. The demographic profile for the users of most products, however, can usually be characterized more continuously using more dimensions. Some audience age ranges, for example, may be more valuable to particular advertisers than others, but many age ranges could have some value. Similarly, other demographic parameters, such as income and education, could also be used to characterize a typical product user.

The total value of an audience member to an advertiser can be computed using values assigned by the advertiser to the various demographic characteristics. Each income level, for example, could have an assigned value. These values for each of the demographic measurements for each audience member are then combined to arrive at a total value for that audience member.

Audience valuation index 1450, then, is a sum of the value of individual member of the audience who is exposed to an advertising spot. This is a total audience value, not an average. If many people in a sample audience are exposed to an alternative spot, then the audience valuation index for that spot will be higher than if few saw the spot. The values assigned to the individual members of the viewing audience are based on demographic objectives in the media plan and these values will vary based on the goods or services being advertised. The plan specifies a set of values for each demographic characteristic. Each income level, for example, could have an assigned value. Then, for those who were exposed to the alternative spot, the assigned values are returned for each demographic characteristic of interest. These values are multiplied together to arrive at a total value for that audience member. These values are then summed across all exposures, to produce the audience valuation index. Again, this is a total audience value, not an average. If many people in a sample audience are exposed to an alternative spot, then the audience valuation index for that spot will be higher than if few members in the sample audience saw the spot.

Exposure Recency Index 1460.

Exposure recency index 1460 is an indicator of the timeliness of a spot based on advertiser preferences for time of day, or day of the week. The purchasing decisions for some types of advertised products are frequently made at predictable times, and the media plan or schedule may indicate the relative value of advertisement placement based on timing. The influence that advertising exposure has on persuading people to purchase the advertised products gradually declines over time, and the more time that elapses between the time of exposure and the time of purchase, the less influence the advertisement will have on the purchase decision.

Assumed an advertiser has two identical advertising slots with identical audiences available, one early in the week and one on Thursday or Friday, the use of exposure recency index 1460 can be demonstrated. If the advertiser knows that 30% of the purchases of the advertised product occurs on Saturdays, then he will probably consider the Thursday/Friday night advertising slot to be more valuable than an earlier one. If for example, an early week ad is worth $X to the advertiser, then a Thursday ad slot might be worth $1.3X. The exposure recency index for the Thursday ad slot would then be 1.30.

Response Index 1470.

Response index 1470 is an indicator of the average level of response that audience members are expected to have as a result of being exposed to a given advertisement. This value is probably judgmental in nature, and is dependent on a number of factors. For network television, these factors might include a variety of factors. For example, two important factors to consider in response index 1470 might be average program attention level for the program in which the advertisement is placed and the consistency between programming themes and the advertised product. Again, this highlights the correlation between the advertised product or service and the target market.

It is important to note that response index 1470 should not be dependent on factors which are accounted for in other indices, such as program loyalty levels for series programs because loyalty levels are related to frequency. Similarly, factors that reflect audience skew toward one demographic group or another are not included in the response index. As mentioned earlier, these examples are merely representative, and should not be considered exclusive or exhaustive. Obviously, those skilled in the art will recognize that many other conditions, including media selection, audience characteristics, and scheduling, may influence the response indices assigned to specific advertisement alternatives. These various indices will typically be specifically selected to shift the scoring emphasis as desired for a given set of media objectives.

In quantitative terms, if a program is judged to have a response index of 1.0 for a particular product, and another program has a response index of 0.5 for this same product, then the first program, all other things being equal, should have twice the appeal to advertisers of the product.

Cost Index 1480.

Obviously, all other factors being equal, as the total cost of a given spot increases, the attractiveness of the spot to an advertiser declines. It is possible, however, that based on the other four factors introduced in this section, an inexpensive spot might not be worth the cost to a particular advertiser while a relatively expensive one might be. Conversely, some advertisers might be committing to relatively expensive spots that have less value than more plentiful and less expensive alternatives. The optimization techniques of the present invention provide a comprehensive method for making this kind of quantitative determination. Cost index 1480 simply tracks the absolute cost of the alternative spot as measured in dollars. An important part of any advertising campaign is to determine the appropriate tradeoff between maximum desired exposure and finite constraints on advertising dollars. While buying all of the available advertising time on the Super Bowl will guarantee very broad exposure, most media planners try to get the best "bang for the buck." Cost index 1480 will bring the dollar factor into the equation.

Scoring Equation

Symbolically, the computed score for an incremental change in an advertising plan or schedule based on these five factors is:

$$S_b(a) = \sum_{i=1}^{N_a} \left[ V_I^n(i) \times \prod_{d=1}^{D} V_A^d(i) \right] \times V_T(a) \times V_R(a) \div V_C(a)$$

where

| | |
|---|---|
| $S_b(a)$ | Total score for alternative spot a in plan or schedule b. |
| $N_a$ | Total number of exposures of spot a by a sample audience. |
| $D$ | Number of demographic factors considered. |
| $V_d^a(i)$ | The index value attributed to demographic factor d for the audience member who saw exposure i out of N exposures to spot a. |
| $\prod_{d=1}^{D} V_A^d(i)$ | The product of the index values of each of the D demographic factors for one audience member. In other words, this is the total indexed value for the demographic characteristics of a single audience member to a particular advertiser for a particular advertised product. |
| $V_I^n(i)$ | The index value of exposure i out of a total of N exposures to spot a, which, for this member of the sample audience, is the nth exposure to advertisements in plan or schedule b. |
| $V_I^n(i) \times \prod_{d=1}^{D} V_A^d(i)$ | The indexed value of a specific exposure times the indexed value of the demographic characteristics of a single audience member to a particular advertiser for a particular advertised product. |
| $\sum_{i=1}^{N_a} \left[ V_I^n(i) \times \prod_{d=1}^{D} V_A^d(i) \right]$ | The total value of exposing all members of an audience (or all members of a sample group) to a particular advertisement at a specific point in time. |
| $V_T(a)$ | The exposure time recency index value for spot a. |
| $V_R(a)$ | The response index value for spot a. |
| $V_C(a)$ | The cost index value for spot a. |

$V_T(\alpha)$ The exposure time recency index value for spot $\alpha$.
$V_R(\alpha)$ The response index value for spot $\alpha$.
$V_C(\alpha)$ The cost index value for spot $\alpha$.

Although the scoring equation is rather formidable looking, a simple example is useful to show how the scoring process may be accomplished by adding a particular advertisement to an advertising plan or schedule.

Scoring Example

In order to further explain the preferred embodiment of the scoring methodology of the present invention, equation (1) above will be used to illustrate planning a new advertising plan or schedule for network television. To simplify things, assume a total audience sample of only 10 people. In the hypothetical planning process, one new spot, spot D, is being considered for addition to an advertising plan or schedule. The present advertising plan or schedule has just three advertisements: spot A, spot B, and spot C. To begin, a period of time during the previous month which has programming similar to the period which the new plan or schedule will span is identified. That period is used as the basis for planning the future plan or schedule. The effect of adding spot D to the plan or schedule will be examined in the context of the five indices described above. Spot D represents an additional airing of the same advertisement represented in spots A, B, and C.

Referring now to FIGS. 15–18, the operation of the scoring methodology of the present invention is illustrated. FIG. 15 presents the information used to calculate exposure valuation index 1440. Exposure to each of the four spots, including spot D, by the 10 members of the audience sample as shown in the table depicted in FIG. 15. The members of the audience sample are numbered 1–10. The letter "Y" in the block below the audience member number indicates that the audience member was exposed to the spot. The scoring methodology of the present invention will be used to compute the score that results from adding spot D to the plan or schedule.

As illustrated in FIG. 15, person #1 saw the advertisement when it aired in spot D. In addition, person #1 has already been exposed to the advertisement one previous time, when the advertisement aired at spot B. Based on media studies for the product being advertised, the ideal frequency, or total number of desired exposures during the life of the advertising campaign is three. Using three exposures as the ideal number, relative frequency values have been assigned to each exposure as shown in FIG. 16.

FIG. 16 clearly illustrates that the exposure to spot D for person #1 is not as valuable as it would have been had it been the third exposure for person #1, as it was for person #4. Therefore, based on market and product research, this second exposure of person #1 has a value which is 80% of what it would have been had it been the third exposure for person #1:

$$V_I^2(i)=0.8$$

Similarly, this exposure value also applies to person #7 and person #8 because spot D represented the second exposure to the advertisement for them as well. However, in the case of person #6, spot D represented the first and only exposure to the advertisement so the value of $V_I^1(i)=0.4$ applies to person #6. By extension, spot D represents the third exposure for person #4, so $V_I^3(i)=1.0$.

The values for other members of the audience sample have been similarly calculated and are shown in FIG. 15. As shown in FIG. 15, some members of the sample audience, such as person #2, were not exposed to the advertisement when it aired in spot D. Therefore, the exposure to spot D for person #2 does not contribute to the exposure valuation index score for spot D. The scoring methodology of the present invention sums over the number of exposures, not over the number of audience members.

Audience Valuation Index 1450.

This index is related to the individual demographic characteristics of the sample audience which will view spot D when it airs. For this particular example, the media planner is interested in only two demographic characteristics: age, and household income. Assume that the values assigned to these demographic characteristics are summarized in the tables shown in FIG. 17 and FIG. 18. FIG. 17 is the age range and assigned value for female members of the audience sample. Similarly, FIG. 18 depicts the income range and assigned value for the audience sample. The various weights for the values shown in FIG. 17 and FIG. 18 are assigned based on market research that indicates which consumer is most likely to buy the advertised product. The consumer most likely to purchase the advertised product is a woman between the ages of 18 and 34 with a household income of at least $36,000 per year.

For purposes of this example, person #1 is a woman of age 37, living in a household earning $26–$30K per year. The values for the demographic characteristics being considered for this person are:

$$V_A^1(i)=0.70 \text{ (Age)}$$

and $$V_A^2(i)=0.85 \text{ (Income)}$$

Other demographic values, such as household education, are not specified, so those values are all assigned a default value of 1.0 Thus, for person #1, the expression in equation (1) above is:

$$V_I^n(i) \times \prod_{d=1}^{D} V_A^d(i) = 0.80 \times 0.70 \times 0.85 = 0.476$$

According to the assumed criteria, exposing person #1 to an advertisement in spot D is 47.6% as effective as it would have been under perfectly optimal conditions where a woman of age 18–34 in an upper income household saw the ad exactly three times.

To fully evaluate the score for spot D, this process is repeated for all 10 people in the sample and then the individual scores are summed:

$$\sum_{i=1}^{N}\left[V_I^n(i) \times \prod_{d=1}^{D} V_A^d(i)\right]$$

where N is the total number of impressions for the sample audience for this advertisement (i.e., spot D), which, in this case, is five. Note that audience members who do not see the advertisement in spot D do not contribute to the total score. For purposes of illustration, assume that the other four people who saw the advertisement were, on average, the same as person #1, so the sum of all five is:

$$\sum_{i=1}^{N} .476 = 2.38$$

Exposure Recency Index 1460.

In order to calculate this index, assume that the product being advertised is a product that is frequently purchased on the weekends, such as movie tickets, or meals at restaurants. The media planner has discovered, through market research, that the best time to advertise this product is on Thursday evening, and that advertising on Wednesday, one day from the ideal time, is about 85% as effective. Since proposed spot D represents an advertising air time on a Wednesday night program, it will have a lower value than the Thursday night program. Thus:

$V_T(a)=0.85$

Response Index 1470.

The relevancy of response index 1470 is related to the host program where the proposed advertisement will air. In this case, the host program for spot D is a particularly popular one, perhaps Seinfeld or Friends, for example. In this case, most media planners would believe that associating their product with this particular host program will lead to a more positive image for the product and, in turn, increased sales of the product. Level of involvement is a term that refers to the attentiveness that a viewer exhibits when viewing a given program. The higher the level of viewer involvement with a program, the more likely it is that the viewer will retain the information presented. The media planner also believes that the level of involvement for this program is higher than average and, therefore, believe that this involvement will carry into the advertisement, thereby making the advertisement more effective. For these various reasons, the media planner has concluded that advertising on this program is 135% as effective as advertising on an average program. Thus:

$V_R(a)=1.35$

Cost Index 1480.

Finally, as would be expected, the cost of advertising on this relatively more desirable program is higher than average when compared to other, less desirable programs. Therefore, the media planner would assign a relatively higher value for cost index 1480 to this program. Thus, to include spot D in the advertising plan or schedule for this program:

$V_C(a)=1.50$

It should be noted that an entire list of relative cost indices can be prepared for any given product, making the application of including cost index 1480 relatively straight forward.

Finally, given all of the scores for the various indices, all of the pieces for computing the total score for spot D are available and the indices can be combined (step 1490) by using the previously explained equation:

$$S_c(a) = \sum_{i=1}^{N} \left[ V_I^n(i) \times \prod_{d=1}^{D} V_A^d(i) \right] \times V_T(a) \times V_R(a) \div V_C(a)$$

$$= 2.38 \times 0.85 \times 1.35 \div 1.50$$

$$= 1.82$$

At this point the media planner can compare the score for spot D against the scores of alternative spots E, F, and G which are have been previously scored using the same criteria. The higher the score, the more efficiently the selected advertising plan or schedule will match the predetermined media objectives. Using this comparative information, a media planner is in a position to make an informed decision on how to best expand the simple advertising plan or schedule from three spots to four spots. To expand the campaign to five spots, the process can be repeated again. The media planner selects a set of alternative spots, scores them and then selects an alternative based on the scores. Although this process can obviously be performed by hand, it would be an extremely tedious and error-prone process. For this reason, the most preferred embodiments of the scoring mechanism for the present invention are implement in a computer-based optimization mechanism as depicted in FIG. 1. Using a computer-based system, the process of evaluating even a large plan or schedule requires only a few minutes.

Although some of these above-mentioned factors are occasionally used in media planning, the methods for computing and combining these factors in ways that contribute to informed decision making is unique. The advertising optimization methods of the present invention are sufficiently flexible to accommodate a wide variety of beliefs about advertising, how audiences behave, and how they respond to advertising. The methods also provide a variety of mechanisms for explicitly including virtually any type of information that may contribute to or detract from the value of advertising exposures. While there are some assumptions made along the way, the assumptions are quantified and remain constant from one evaluation to the next, assuring a consistent application of the assumptions to the data. This will provide a more useful relative index for purposes of comparison between various advertising options. Finally, the advertising optimization methods of the present invention provide a way for systematically and consistently applying information and beliefs to the decision making process so that the resulting decisions can be entirely consistent with the information available.

Detailed Explanation of Scoring

Although the basic concepts of scoring have been explained above, there are additional details that require a more significant background for purposes of explanation. This section will provide additional background information and specific detail on other unique aspects of the various preferred embodiments of the present invention.

Although advertisers pay standard rates for audience exposures, measured in cost per thousand (CPM), exposures are not of equal value to advertisers. The true value of an exposure is based on a variety of factors beyond just age and gender, such as: the number of times that an audience member has already seen the advertisement; exposure spacing; other individual and household characteristics; the time of day; media type; elements surrounding the advertisement; time of year; nature of the product being advertised; and buying habits of the individual. These factors may include: the number of times that an audience member has already seen the advertisement; exposure spacing; various individual and household characteristics; the time of day; the type of media; elements surrounding the advertisement; the time of year; and the nature of the product being advertised.

All of these factors may combine and contribute to the value of an audience member being exposed to a specific advertisement. In fact, given sufficient data by which to compute the value of an exposure, each instance in which a member of an audience is exposed to a specific advertisement could have its own unique value to an advertiser, and that value could be different for each advertiser. An important objective for advertisers, then, is to plan or schedule their advertisements so that many audience members that they consider valuable will see the advertisement, while, at the same time, avoiding plan or schedule choices and positions where the proportion of valuable audience members is relatively low.

While this line of reasoning may, at first, appear obvious, it includes a point of emphasis which is missing in many known techniques. The focus of media planning using the preferred embodiments of the present invention is on computing the value of each individual exposure for each individual member of an audience, not on simply estimating audience value based on demographic groupings, or basic factors such as estimated reach and frequency. Using the optimization mechanism of the present invention, the value of an entire advertising plan or schedule can be computed by computing the value of each individual exposure and then summing these exposure values. The whole is the sum of the parts.

An optimization "objective function" as used herein is an expression that is to be maximized in order to optimize an advertising plan or schedule. Using the methods and techniques of the preferred embodiments of the present invention, an objective function is formulated from a set of factors that are derived from media objectives. These factors, at the simplest level could include familiar expressions for target audience age, gender, and reach. At the other extreme, they could include elements describing media characteristics, advertised product usage by audience members, and exposure timing.

The most preferred optimization methods of the present invention use five factors or categories of data. All conditions that might influence the value of an advertising campaign falls into one of the five categories. If a condition can be measured, in can be included for consideration in the objective function and it will thus influence the optimization process. As explained earlier, these five factors are: multiple exposure value; audience value; timing; response; and cost. Each of these five factors is explained in more detail below.

Multiple Exposure Valuation

The multiple exposure valuation factor embodies the notion that people will respond differently to an advertisement depending on how many times they have already been exposed to it, and when they were exposed. In the case of television advertisements, for example, a room full of demographically identical people could all see an advertisement at the same time, but have dramatically different reactions to the advertisement based solely on their individual exposure history for the ad.

For example, a person who sees the advertisement for the first time may not fully understand what is being advertised. With a second exposure, a person may listen more attentively, or, having seen it previously, may ignore it. Further, the third exposure to the same advertisement may convey enough information to motivate the person to actually try the product. Alternatively, if it has been many days or weeks since the previous exposure, much about the advertised product may have been forgotten, and an additional exposure may have the same influence as the first exposure did. Finally, if a person has already had many recent exposures to a given advertisement, then a subsequent, new exposure may be ignored entirely. The value of a single exposure, then, can be determined only in the context of other exposures in an advertising plan or schedule. One cannot place a value on an advertising exposure for an individual without knowing what other exposures the individual has had. The first exposure could be quite valuable, but the twentieth exposure to a given advertisement during a given week may have no value.

Quantifying the multiple exposure valuation factor, then, is the process of estimating the value of an individual exposure based on the position and timing of other exposures in the same advertising plan or schedule. Many studies have been conducted, concerning the influence that multiple advertising exposures have on subsequent purchasing behavior. Researchers have been interested in a number of issues, such as how many exposures are required to convert an audience member into a purchaser, the ideal spacing in time of advertising exposures, and message saturation that might occur after being exposed to many advertisements. The methods and techniques of the present invention as described herein make no rigid assumptions about these issues. It is likely that a variety of factors, including such things as product type and advertising vehicle, will heavily influence the audience response to multiple advertising exposures. The preferred embodiments of the present invention do, however, provide a flexible framework by which a user can specify the value of multiple exposures to a particular advertising message. The system then optimizes a plan or schedule based on those predetermined specifications.

The techniques used in formulating an advertising campaign are drawn from the media objectives that a media planner already has available. These techniques can range from the relatively simple to the complex. The simple techniques are easy to use, and require very little data, but may not fully describe the influence of multiple advertising exposures on particular audiences. The more complex methods require more data and processing, but the resulting plans or schedule will be more efficient and consistent with the media plan, and with assumptions about how people respond to advertising.

For the purposes of the present invention, an efficient advertising plan or schedule is defined as one that exposes an audience to an advertising message in a way which is consistent with a predetermined set of media objectives, and one which does so at the least cost. A very simple set of media objectives, for example, might include requirements such as exposing women 18–49 to a given advertisement at least three times over a four-week period. Given this objective, and in comparison with less efficient plans or schedule, an efficient advertising plan or schedule would do any one of the following: have fewer women in the age range who are exposed fewer than three times for the same cost; have fewer women in the age range who are exposed more than three times at a reduced cost; have more evenly distributed exposures throughout the four week period for more of the audience for the same cost; expose women equally at a reduced cost. While all of these elements cannot be satisfied simultaneously, the purpose of the scoring system is to consistently weight each of these elements (and other elements which will be introduced shortly) to arrive at an optimum advertising plan or schedule. At least five general techniques can be used to estimate the value of multiple advertising exposures. The explanations presented below will begin with the simplest technique and progress to the more complex. These various techniques are summarized in the table shown in FIG. 19

Average Frequency Technique

Average frequency is defined as the average number of times an audience is exposed to an advertising vehicle over a given period of time. The time span is sometimes referred to as the purchase cycle for the product advertised, and is, by convention, often four weeks long. Average frequency can be computed by dividing the total number of impressions by the total reach. An average frequency of 2.5 means that, on average, the members of an audience who have seen an advertisement have seen it 2.5 times over a specific period of time. Media plans often specify a target average frequency for a proposed advertising plan or schedule. Adding more spots to an advertising plan or schedule naturally increases the average frequency.

It should be recognized, however, that there is a tradeoff between reach and frequency. Most known optimization methods suffer from this tradeoff. For example, some combinations of advertising campaigns tend to expose the same group of people over and over again. This results in increasing frequency for those individual who are exposed, but has only a limited effect on reach. Other sets of advertising spots tend to expose many people a relatively few number of times, increasing reach but not frequency. While adequate in some circumstances, there are two limitations to using an average frequency approach to specify the objectives of an advertising campaign. The first stems from the fact that plans or schedule with identical average frequency values can have very different frequency distributions.

Figures 20, 21:
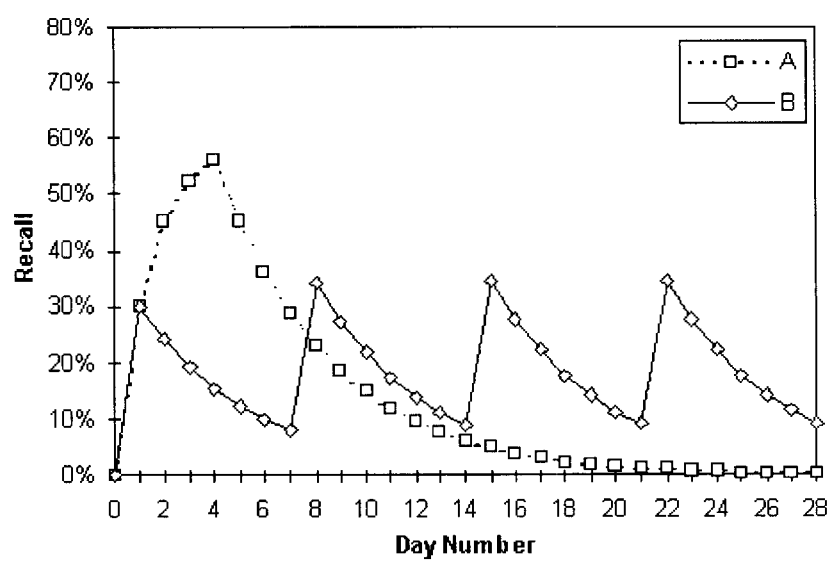
FIG. 20 is a tabular comparison of comparative average exposure frequencies according to two different plans or schedule.
FIG. 21 is a graphical representation of two different exposure plans or schedule for an advertisement.

The data shown in the table in FIG. 20 illustrates a simple example of two advertising plans or schedule that have identical average frequency values, but with greatly differing frequency distributions. Two members of the sample for plan or schedule A were exposed only one time each, while person number 3 was exposed seven times, thus resulting in an average frequency of three. The audience exposure for plan or schedule B is ideal. Each member of the sample is exposed three times, also resulting in an average frequency of three. While these two plans or schedule represent the two extremes of frequency distribution, these plans or schedule demonstrate that there are media plans which have identical average frequency values, but with significantly different frequency distributions, and probably have differing influence on audience members.

The other limitation of average frequency for optimization purposes lies in the potential for having exposure timing patterns at an individual level which are not optimal. Exposure to several advertisements clustered during a short period of time followed by a lengthy period with no exposure does not have the same value as being exposed to a similar number of advertisements that are evenly spaced over the entire period. The average frequency and the frequency distribution for two different advertising plans or schedule could be identical, but the average recall at the individual viewer level could be dramatically different. The data plot in FIG. 21 illustrates this point.

Assume that an advertisement is aired every day during a four week period. The distribution of this advertising plan or schedule is perfectly distributed. In this example, person A and person B are both exposed to a total of four of the 28 advertisements aired during the period. Both are initially exposed on day 1, which, for both, results in a recall rate of 30%. Person A continues to be exposed for three more days in succession. The incremental effect of these repeated exposures in recall ability declines as indicated by concave shape of the curve. Each time person A is exposed to another advertisement in quick succession, the additional benefit in recall ability drops as the person approaches a point of saturation. This is consistent with learning theory, as well as with many studies for recall following exposure to advertising. By contrast, person B is exposed once a week for the next three weeks. Each time person B is exposed there is a sharp rise in the rate of recall. In both cases, on the days when the people are not exposed, their recall ability declines at a steady and equal rate.

The recall results of the two exposure patterns are significantly different. From day 1 to day 7, the recall ability of person A is consistently above that of person B. But beginning with day 8 until the end of the four week period the recall of person A is consistently lower than person B. This simple graph demonstrates that in order to maintain a steady level of recall, people need to be exposed to advertisements consistently over time. Average frequency, taken by itself, does not provide sufficient information to determine how well specific advertising plans are meeting objectives. Unfortunately, most presently known optimization techniques rely heavily on average frequency to determine the most optimal plan or schedule.

Effective Frequency

Effective reach refers to the total number of people who are exposed to more than a specific number of advertising messages (usually three) over a selected period of time. Summary frequency distribution data is required to compute effective frequency. The effective frequency tabulation for a simple advertising campaign might be as shown in FIG. 22. In this case, out of 100 total people in a small sample audience, there were 32 people who saw one and only one of the advertisements, 15 who saw exactly 2 ads, etc. If it is assumed that advertisements become effective only after audience members have seen three advertisements, then the effective frequency for this plan or schedule is 9. This is because a total of 9 out of 100 people saw at least three advertisements.

The practice of using effective frequency to specify the objectives of an advertising campaign suffers from the same problems that average frequency does. While attempting to gauge the value of a plan or schedule based on the total number of people that might respond, plans or schedule with identical effective frequency values can still have different frequency distributions, and different advertising exposure distributions over time.

Weighted Effective Frequency

Weighted effective frequency valuation is an attempt to account for the fact that all exposures may have some value, and that plans or schedule which have skewed frequency distributions, such as plan or schedule A shown in FIG. 20 above, are not as desirable as are plans or schedule with more even distributions.

To illustrate this point, different exposure values have been assigned to different distributions as shown in FIG. 23. As shown in FIG. 23, a value of 1.0 has been assigned to instances in which an audience member is exposed to an advertising message for the third time during a fixed period of time. It is important to note that the second exposure to this same message has some value, but may not as valuable as the third exposure. Therefore, the second exposure in the fixed period of time is assigned a value which is 80% of the value of the third exposure. The interpretation of this value might be that if a person has an X% probability of purchasing a product as a result of being exposed to an advertisement for the third time, then this same person will have an 0.8X% probability of purchasing the product as a result of the second exposure. By the same reasoning, the first exposure has 50% of the value of the third exposure.

The total value of multiple exposures can be calculated by combining the value of each individual exposure. For example, if a person is exposed to two advertisements which are both part of an advertising campaign, the total value of both exposures is the sum of the individual exposure values: 0.5+0.8=1.3. In theory, this person has a 1.3X% probability of purchasing a product as a result of being exposed two times to an advertisement. Now, if a second person who has not seen any advertisements in the campaign joins this first person, and the two of them are exposed to another advertisement, then the value of this exposure is different for each person. For the first person, the one who has already seen two advertisements, the value of the third exposure is 1.0, while the value of the same exposure to the second person is only 0.5. The total value for these two exposures is 1.5. Using this method, the total value of all exposures for plan or schedule A in FIG. 20 is 4.3 C two people are exposed only once for a value of 0.5 each, while one person was exposed seven times for a total value of 3.3. All exposures after the fifth exposure for person number 3 are worth nothing. Using the same process, the total value of plan or schedule B is 6.9. These total scores are more intuitively appealing, and probably more accurately reflect the true value of a given advertising plan or schedule.

Frequency Level Valuation Alternatives

The exposure level values in FIG. 23 are used only to illustrate how to compute the total exposure value for an advertisement. The assignment of value to various exposure levels has been the subject of much debate over the years, and many individuals have proposed exposure valuation schemes which are significantly more complex than the one illustrated in FIG. 23. These proposals are all rooted in an effort to understand how audience members react to being exposed on multiple occasions to advertisements. Five of the most widely discussed approaches for valuing multiple exposures are reviewed below.

Linear

One simple approach to computing the value of exposure is to assume that all exposures are of equal value; that the first exposure to an advertisement by an individual viewer has the same influence on the person as the twenty-third exposure. Under this assumption, it is hypothesized that the more a person sees an advertised product, the more likely he or she will be to buy it. If this effect can be assumed to be perfectly linear; a person who has seen an advertisement 101 times is 1% more likely to buy the advertised product than a person who has only seen the advertisement 100 times.

Figure 24:
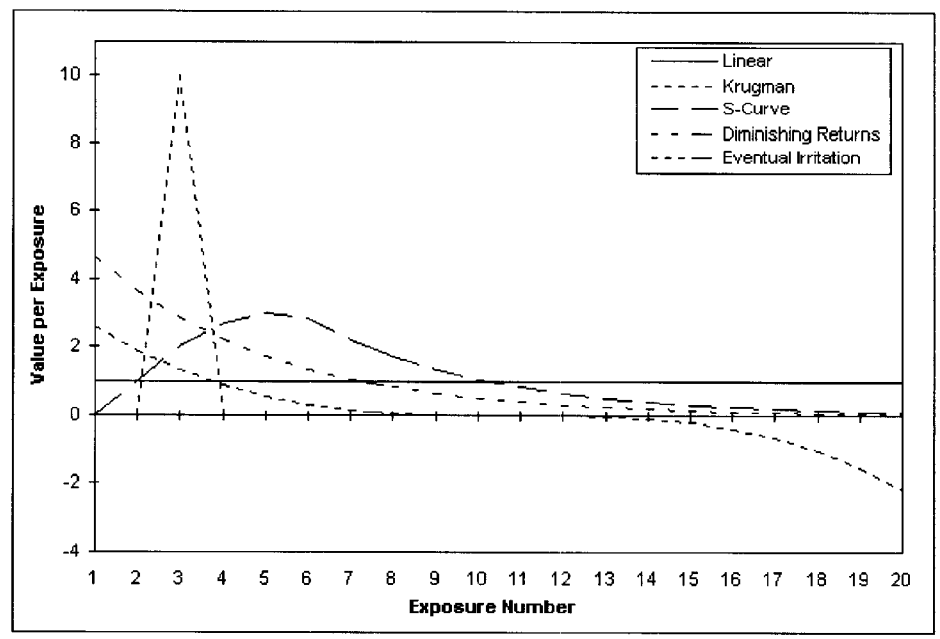
FIG. 24 is a graphical comparative representation of a number of exposure valuation models.

While this theory has obvious flaws, it is useful to present as a contrast to other assumptions that are introduced below. FIG. 24 shows a plot of this "linear" assumption together with plots for other assumptions. The horizontal axis is the exposure number, i.e., the number of times that individual viewers have seen particular advertisements. The vertical axis is the value of each of these exposures.

As shown in FIG. 24, the value for each "linear" exposure is equal to 1.0, regardless of how many previous times the viewer has seen the advertisement. The twentieth time a viewer sees an advertisement is just as valuable in persuading him to purchase the advertised product as the first or second time he or she sees the ad.

For purposes of optimizing an advertising plan or schedule, no units of measure are required for exposure values. The magnitudes indicate only the relative value of exposures. In the linear case, they indicate that all exposures are of equal value, but they do not indicate what that value is. Any number, such as two or ten or any other number, could be selected as the constant value. As will be shown below, the conclusions reached in optimizing a plan or schedule will remain the same regardless of the absolute value selected. While the relative values of alternative changes in an advertising plan or schedule can be compared, there is no way to compute the absolute value of an advertising plan or schedule or a change in a plan or schedule.

Krugman

Many advertisers believe that a certain theoretical number of advertising exposures is required to convert individuals into purchasers. As an extension of this belief, media plans will frequently specify required effective frequency values. These media plans assume that if individual audience members are exposed to fewer advertisements than this critical number during a given period of time, then it is likely that the message will not be well enough understood or sufficiently motivating to result in any change in purchasing decisions. If, by contrast, audience members are exposed to more advertisements than this critical number during the same period of time, any exposures in excess of the critical number will not have any additional influence because the audience members will have already made their purchasing decisions.

This critical number of exposures has also been the subject of much debate. Some scholars have suggested that the optimal exposure number is universal and well defined, and that it is independent of the product being advertised and the message content. Others have argued that all exposures have some influence on the purchasing decisions of audience members, but that the level of influence follows a curve.

One of the most frequently cited studies is by Krugman. Krugman claims that in order to influence people to make specific purchasing decisions, they must be exposed to three and only three advertisements. According to Krugman, with fewer than three exposures, people will not yet be sufficiently aware or informed of the product to consider making a change in their buying decisions. Any exposure beyond three, Krugman claims, will have no influence because people will have made their decisions, and that these decisions are final.

This assumption about viewer behavior is illustrated in FIG. 24. The Krugman line is at zero for all exposure numbers except the third. The total benefit of exposure number three is valued at ten. Again, the actual value is arbitrary, but indicates that the value of the third exposure is infinitely greater than that of all other exposures. Beyond three exposures, exposure value for the Krugman assumptions returns to zero.

S-Curve

It has also been suggested that the response to repeated exposures of an advertising message is somewhat consistent with Krugman's claims, but follows a gradual curve rather than an abrupt spike as Krugman proposed. This theory postulates that people do require several exposures to become fully aware and informed about a product, but they also believe that the benefit of additional exposure continues, possibly because of the need for periodic reinforcement of the message. This enhanced benefit, however, comes at a declining rate.

This curve is often referred to as the S-curve. The S-curve is also illustrated in FIG. 24, which indicates the accumulated, rather than the individual (as in FIG. 21), value of exposures for an audience member. When the total number of exposures is low, the S-Curve gradually increases in slope, indicating, for example, that being exposed on four occasions to an advertising message has more than twice the value of being exposed only twice. As the total number of exposures becomes progressively greater, above about seven in this case, the S-Curve gradually decreases in slope. The value of being exposed 20 times is still greater than the value of being exposed 19 times, but only marginally so.

Figure 25:
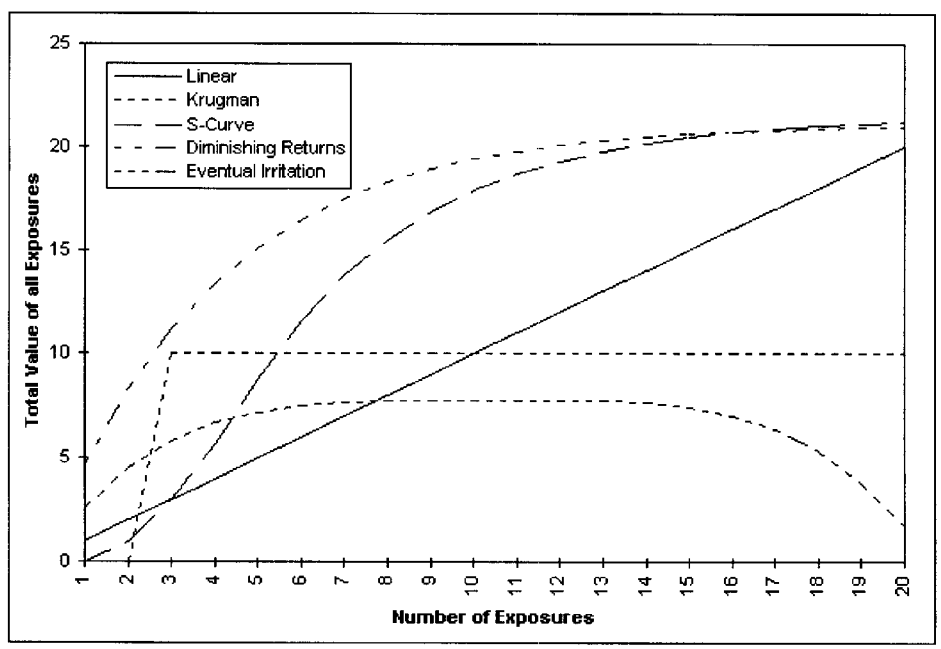
FIG. 25 is a graphical comparative representation of total exposure valuation using several different models.

The plotted value is referred to as an S-curve because, as shown in FIG. 25, it does have a slight S shape. When plotted on an exposure value curve as in FIG. 24, however, it is not S shaped. It rises to a maximum point, which, in this case, is at about five exposures, and then gradually returns zero as the number of exposures increases.

Note that in each case, the curves in FIG. 24 are the first derivative of the curves in FIG. 25. This means that the accumulated area under each curve in FIG. 24 is the amplitude of the corresponding curve in FIG. 25.

Diminishing Returns

As suggested by the S-curve, it is reasonable to assume that being exposed to increasing numbers of advertisements follows a line of diminishing returns. Some theorists have suggested, however, that the first exposure is the most influential, and that the value of subsequent exposures consistently drops. This is represented in the diminishing returns line in FIG. 24. This line is initially quite high, and then consistently falls with each succeeding exposure. This indicates that the value of exposures can become very small with large total numbers of exposures, but the value never reaches zero. In terms of accumulated value of exposure, FIG. 25 shows the curve increasing at a decreasing rate, and approaches a limit at high exposure levels.

Eventual Irritation

Closely related to a belief in the law of diminishing returns is the belief held by some scholars that people may eventually become irritated with being exposed to the same advertisement many times. As indicated in FIG. 24, this line at some point falls below zero, indicating that the probably that people will be converted into purchasers actually decreases at high exposure levels.

Exposure Value Computation

For purposes of optimizing an advertising campaign, the value of exposure is most conveniently represented by individual exposure value as shown in FIG. 24 rather than by the total value of accumulated exposures as shown in FIG. 25. The exposure values for FIG. 24 are summarized in the table shown in FIG. 26.

In planning an actual advertising plan or schedule, exposure values may not be known in detail, nor may there be a high level of confidence in the values that are known. However, any information that the media planner may have, either from technical journals, research, corporate experience, or just gut feel, concerning the value of additional exposure is useful in optimizing an advertising plan or schedule. The optimization methods of the present invention provide a mechanism for incorporating whatever information is available into the decision making process in a systematic way.

Referring to equation (1) above, the total score due to the value of exposure for an audience sample is:

$$\sum_{i=1}^{N} V_I^n(i) \quad (2)$$

where

N Total number of exposures of advertisement α for an audience $V_I^n(i)$ The value of exposure i which is the $n^{th}$ exposure of advertisement a of a member of the audience.

To compute the total value in equation (2) for the addition of one spot to an advertising plan or schedule, the following steps are performed. (See the table in FIG. 27 for a sample of the computations for an audience sample of 15 people.)

1) Tabulate the frequency for each member of the sample for the advertising plan or schedule without the additional spot. (The second column in FIG. 27)
2) Identify those people who saw the additional advertisement. (The third column in FIG. 27)
3) Enter the individual value per exposure from FIG. 24 or FIG. 26 for those who saw the additional advertisement based on the exposure valuation assumptions.
4) Total the individual exposure values.

The relative value of the total scores between, Krugman and the S-Curve is not important. As previously mentioned, the value of 10 for the one exposure for person #6 under the Krugman assumption is an arbitrary number. Any value could have been selected. The objective is not to compute the total value of an advertising plan or schedule, but to compute the change in value of a plan or schedule for alternative plan or schedule modifications. For example, using the S-Curve, a score can be computed for a particular advertising plan or schedule plus one added advertising spot. Then using the S-Curve again, the score can be re-computed for the same advertising plan or schedule, but with a different spot added to the plan or schedule. These two scores can then be compared to determine which additional spot contributes the greatest value to the plan or schedule based on the S-Curve exposure values. It is possible to reach an entirely different conclusion on how to optimize the plan or schedule if other exposure valuation assumptions were adopted, such as the assumptions inherent in the Krugman curve.

Using Exposure Values to Optimize Advertising Plans or Schedules

While the simple examples shown above might work for an audience of 10 people, there are additional considerations once the size of the audience expands to larger levels.

Figures 28, 29:
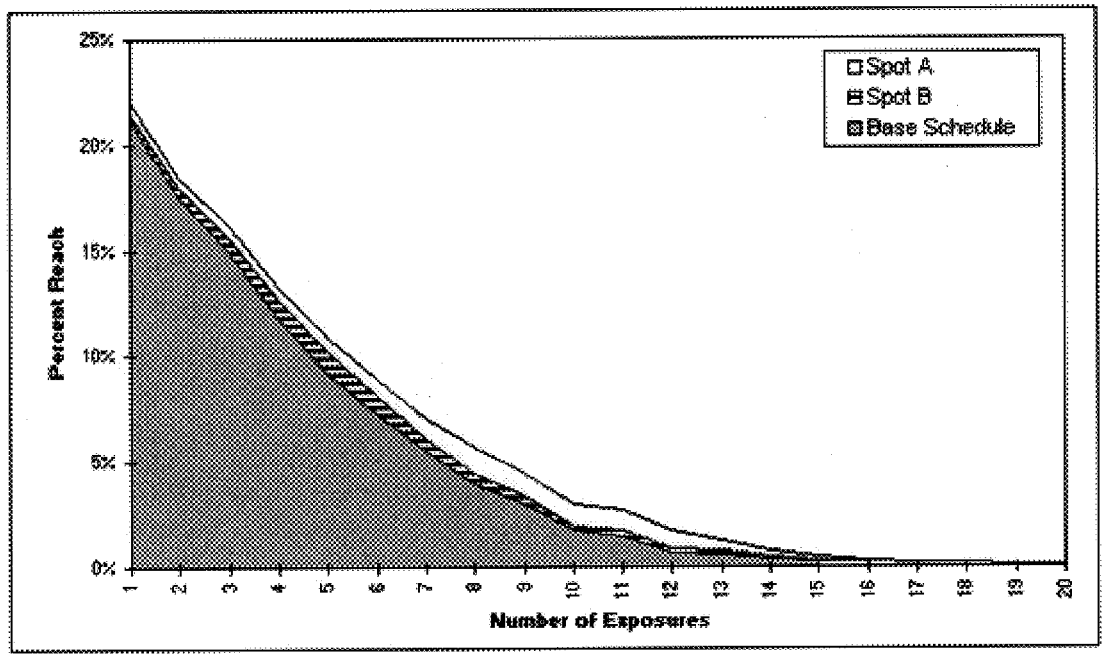
FIG. 28 is a graphical representation of change in frequency based on choosing alternatives to a base plan or schedule.
FIG. 29 is a tabular representation of frequency exposure valuation for a series of multiple exposures to a given advertisement.

The graph shown in FIG. 28 illustrates how exposure valuation can be used to gauge the relative value of two alternative advertising spots. For example, assume that for a particular advertising campaign, exposure levels between two and six exposures are ideal and of approximately equal value, while exposure levels less than two or greater than six are worth nothing. In addition, assume an existing advertising plan or schedule to which one additional spot must be added. The frequency curve for the base plan or schedule is shown in FIG. 28. On top of this frequency curve is plotted the change in frequency that would result from adding either of the two alternatives to the base plan.

As indicated in FIG. 28, the change in frequency for both spots ranges from one to about 15. In both cases there are people who are exposed few times, and people who are exposed many times. However, the average change in frequency for spot B is clearly less than change in frequency for spot A. The plot for spot B is thicker at low numbers of exposures than is the plot for spot A. In the range of from two to six exposures, the sum total value of exposure for spot B probably exceeds the total for spot A, even though the total number of exposures for spot A may be slightly greater than the number of exposures for spot B.

Even though spot B appears preferable to spot A, note that spot B is not ideal in the sense that there are many exposures which fall outside the range considered to be valuable. An ideal advertising campaign would be one in which all audience members are exposed to precisely the specified number of exposures. But no campaign is ideal. If, however, one spot were to be added to our base campaign, and if spots A and B are the only two spots available, then adding spot B would be the optimum solution, even though it is not an ideal solution. The process of optimizing an advertising campaign is one of selecting from among the available spots those spots that maximize the total value of all exposures for the campaign.

Other Issues

Reach

One important criteria against which many advertising campaigns are measured is the total number of people who are exposed to one or more advertising messages over a specific period of time. This is termed reach. As discussed above, is has been observed that modifications to an advertising plan or schedule to increase either reach or frequency is often at the expense of the other. In addition, because of the limitations associated with reach, the underlying wisdom of using reach as a measure for the value of an advertising campaign has been questioned.

If a media planner were to optimize a plan or schedule based on total reach using the weighted effective frequency method, then the Krugman curve with the spike at one exposure (see FIG. 24) would accurately describes this objective. Using this weighting, only when audience members are exposed to advertisements for the first time are the exposures included in the total exposure valuation. This is precisely the definition of reach. In other words, for a weighted effective frequency exposure valuation table similar to the table shown in FIG. 23 for optimizing a plan or schedule based on reach alone, the values would be as shown in FIG. 29.

Effective Frequency

If a Krugman curve with the spike set at three exposures is adopted, the results for the weighted effective frequency valuation method become identical to the commonly known effective frequency valuation method. Exposures below three are worth nothing, as are all additional exposures above three. The weighted effective frequency optimization method presented herein is a more general type of effective frequency. Using a simple Krugman curve, the generally accepted version of effective frequency can be derived. Using one of the other frequency valuation curves, such as the S-Curve, a continuous frequency function can be defined, which, in effect, describes the probability of decision and conversion at multiple frequency levels, a somewhat arguably more realistic assumption. This approach recognizes that there is no clearly defined point of conversion as Krugman claims, but allows the valuing of exposure at many levels.

There are many other scoring alternatives that are more accurate in describing the value of advertising exposure than either reach or conventional effective frequency. However, the optimization methods of the present invention as described herein are flexible enough to allow optimization of an advertising plan or schedule based on any set of criteria for exposure value measurement, including reach and simple effective frequency. It should be noted, however, that the most preferred embodiments use additional valuation techniques to further improve and refine the results.

Promotions

A television program promotion is an advertisement on a host program which publicizes a target program. The intent of a given promotion is to increase the probability that audience members will choose to watch the targeted program. In other words, the objective of promotion could be either of the following: to persuade those people who otherwise would not have watched the target program to watch it; or, to encourage people who generally do watch the target program not to defect to other programs. Promotions that target only those who are not currently loyal viewers could be distinctly different than promotions that target loyal viewers. They could be made more introductory in nature, and might possibly be somewhat longer, while loyal viewers might only require brief teasers to maintain their interest and commitment to watch.

It can be shown that for regularly scheduled weekly programs, relatively few people alternate between competing programs from one week to the next. They are either loyal or not. Very few are undecided one week after another and alternate between competing programs. Therefore, it may possible to promote programs using promotions which are targeted to any one of three groups: groups of loyal viewers; groups of non-loyal viewers; and groups which have both loyal and non-loyal viewers. If viewers are partitioned for a program according to their level of program loyalty and promotions are created accordingly, then the optimization is slightly different for each of the alternatives.

Referring back to FIG. 27, for conventional advertisements, the exposure scores for members of the sample audience are included only if they viewed the advertisement. For promotions aimed at loyal viewers, the process is modified slightly by including exposure scores only if the audience members satisfy two conditions. The audience member must both see the promotion and see the target program. For a promotional campaign aimed only at non-loyal viewers, to be included in the scoring totals, the audience members must both see the promotion and not see the target program.

Finally, the optimization process for promotional campaigns which are aimed at both loyal and non-loyal viewers can treated as conventional advertisements in which audience viewership (i.e., whether or not the audience members saw the target program) is ignored. What makes it possible to modify the process for promotions in this way is the fact that the data that are used to measure exposure are the same data that are used to measure the response. This is the data contained in DME database 126. For purposes of promotion analysis, person-by-person exposure data provides a form of single source data. If single source data was available for other advertised products, then this type of analysis would also be possible. Under some circumstances or for some types of products, one could choose to exclude exposure values for all audience members except for potential customers. People who are already loyal users of the advertised product would not contribute to the optimization process.

In the optimization process, if the targeted audience is determined based on whether or not they are loyal viewers (or loyal customers), then second-order effects, which are not otherwise present, can be introduced into the optimization process. This means that the optimal plan or schedule could change over time as a direct result of executing the optimal plan or schedule itself. This occurs through the following sequence of events: 1) create a promotional campaign which is aimed at, for example, loyal viewers only; 2) select a given set of media objectives and assumptions about the role and effectiveness of promotions; 3) using the media objectives, arrive at a particular optimal plan or schedule; 4) use the optimal plan or schedule for airing the promotions; 5) the nature of the promotion plan or schedule influences a change in the viewing patterns of some members of the audience—these members, over time, either remain loyal to the target program because of exposure to the promotions, or defect to competing programs because of the lack of adequate promotion; 6) the changes in viewing patterns then change the results of the optimization process for future promotions. This occurs because individual exposure values are included in the audience exposure totals based on whether or not the are loyal to the program. If the people who see the target program change, then the total scores and the resulting optimal plan or schedule will also change. Similar logic applies to a second-order effects in conventional advertising campaigns if an advertising campaign can be targeted exclusively at loyal or non-loyal customers. Note that the methods of the present invention as shown in FIG. 13 provide a feedback mechanism to the overall process to allow a media planner to account for and adjust for second-order effects.

Additional research may be performed to identify valid media objectives for promoting programs. This research will typically require designed experimentation with promotions, and analysis of the resulting viewing behavior. It should be noted that the methods of the preferred embodiments of the present invention described herein are sufficiently broad to accommodate any type of media objective that may be derived from a study involving promotions. In addition, a computer system using the preferred optimization methods and techniques of the present invention as described herein is a valuable tool in aiding in the analysis of this type of experimentation. Even without any experimentation, the preferred embodiments of the present invention are useful in improving the efficiency of existing promotion plans or schedule based on the planning assumptions and spending levels that are already in place.

Time Weighted Effective Frequency

Time weighted effective frequency valuation is another new valuation technique that goes one step beyond the techniques used for weighted effective frequency. Here, in addition to recognizing the fact that all exposures may have value, as weighted effective frequency does, it is also recognized that the distribution of advertising exposure over time is important in gauging the reaction that audience members will have to an advertising plan or schedule. As shown in FIG. 21, a cluster of exposures may not be as desirable as a group of more evenly distributed exposures would be.

Ideal advertising exposure, then, involves: 1) providing individuals with an adequate number of exposures; 2) over a specified period of time, 3) with the proper spacing between exposures. Optimizing an advertising plan or schedule to achieve this objective is not possible with any known techniques. But with individual exposure data extracted from database 126, it is possible to identify plans or schedule from among various alternatives that have optimal exposure patterns for individuals, not just optimal exposure frequencies.

Before examining some of the techniques that may be used to compute the time weighted effective frequency for an advertising plan or schedule according to the preferred embodiments of the present invention, it is necessary to explore in more detail the influence of timing in advertising. Specifically how people learn and forget over time.

Learning and Recall in Advertising

The first time people are exposed to advertising, their ability to recall is less than perfect. The second time they are exposed, their recall improves. The incremental amount that they learn as a result of the second exposure, however, may not be as much as the amount learned from the first exposure. With a third exposure, recall shows additional incremental improvement, but to a lesser extent than exhibited with the first exposure.

Figure 30:
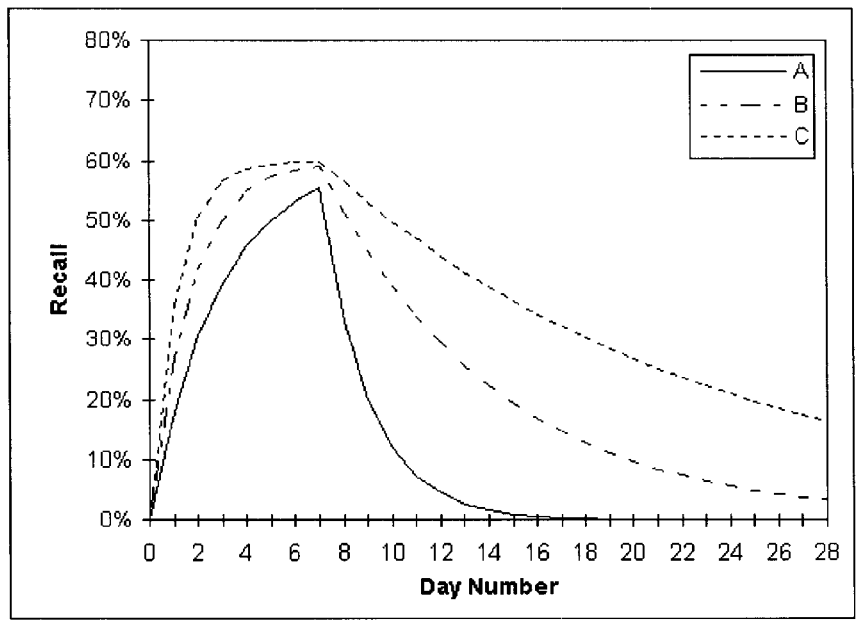
FIG. 30 is a graphical representation of the decay of influence resulting from the passage of time.

This phenomenon is illustrated in FIG. 30. Three groups of people are exposed to advertisements for three separate products on seven successive days, followed by 21 days in which they experience no advertising exposure. The curves shown in FIG. 30 plot the average ability for audience members to recall the advertisements for each of the three products. Each of the three curves rises steeply for the first two or three days, but then each begins to level out. Each successive exposure results in a recall improvement, but the improvement diminishes with the number of exposures. In each case, the recall rate approaches a theoretical limit, which in this case is 60% for each of the three products. This simply means is that no amount of advertising will raise the recall rate above that level.

The difference between the three curves for the three products is a reflection of a variety of factors that might influence the rate of learning, such as advertisement length, product value, etc. These issues will not be examined here.

Note that although the learning curves for the first seven days in FIG. 30 are similar in shape to the curve for diminishing returns in FIG. 25, the audience behavior assumptions behind the two curves are not the same, and should not be confused. Diminishing returns as described in FIG. 25 refers only to frequency rates as indicated by the "number of exposures" scale on the horizontal axis. The learning curve in FIG. 30, by contrast, introduces a factor of time into the influence of advertising. It suggests that diminishing returns occurs only when exposures are closely spaced in time. Refer to FIG. 21 for an example where two exposure plans or schedule with identical frequency levels result in significantly different influence curves over time. Curve A clearly shows the effects of diminishing returns while curve B does not.

Recall Decay

If advertising is not reinforced with additional exposure, a person's ability to recall an advertised product declines over time, as does influence that promotions have on television viewing decisions. A number of studies have found that recall and the decline in recall over time is dependent on a variety of environmental and demographic factors such as product category, time of day, host program, personality, and exposure history. Referring again to FIG. 30, beginning on day 8 the advertising message is no longer reinforced with additional daily advertising exposures. When reinforcement ends, the recall curves immediately begin to decline. The rate of decline in average recall for the three products differs, but in each case the curves consistently drop towards zero. Initially the slope for each of the curves is steep, but becomes less so over time.

Influence Index

For purposes of scoring advertising plan or schedule changes using time weighted effective frequency, the vertical axis in FIG. 30 is redefined to be the influence index, which is the relative level of influence that exposure to one or more advertisements in an advertising plan or schedule has on purchasing decisions. The minimum value is zero, which means that previous exposures to advertisements in an advertising plan or schedule have no influence on current purchases. The maximum influence index value is 100%. If a person is at a 100% level of influence, it means that the influence on purchasing decisions which results from being exposed to advertisements will not increase with additional exposure to the advertising.

Influence index as defined herein should not be interpreted as the probability of purchase. It is only an index that indicates a level of influence if a person makes a purchase. People at 100% influence index do not necessarily buy the advertised product when given an opportunity. It only indicates that the level of influence cannot increase with additional exposure.

Figure 31:
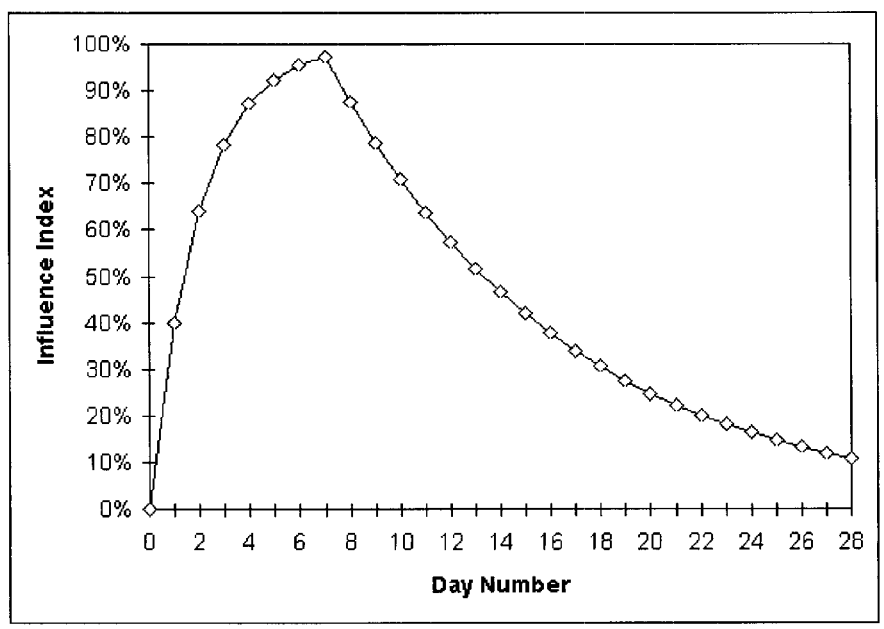
FIG. 31 is a graphical representation of an index for logarithmic influence.

Adopting this convention allows us to describe the curves in FIG. 30 logarithmically using only two parameters:

α The rate of increase in influence with exposure
β The rate of decline of influence without exposure
The equation for the influence index at time t+1 is:

$$I_{t+1} = \begin{cases} I_t + \alpha(1 - I_t) & \text{Was exposed} \\ (1 - \beta)I_t & \text{Was not exposed} \end{cases} \quad (3)$$

and the plot where α=0.4 (suggesting a moderately rapid improvement in influence), and β=0.1 (a gradual decline in influence) is shown in FIG. 31. This person is exposed to advertisements on seven consecutive days. Then, beginning on day 8, the person is exposed to no other advertisements through the end of a four week period.

This plot is generated by computing the influence index for each day in succession using equation (2) above. Beginning with day 1, a day in which the person was exposed, the influence index is computed as:

$I_1=0.0+\alpha(1-0.0)=0.0+(0.4)(1.0)=0.40$

This same person on day 2 is exposed to another advertisement. The resulting influence index on day 2 is:

$I_2=0.40+\alpha(1-0.40)=0.40+(0.4)(0.60)=0.64$

If the person at day 7 is at an influence index of 97%, and is not exposed to an advertisement on day 8, then the resulting influence index on day 8 is:

$I_8=(1-0.10)0.97=0.87$

The advertising frequency required to maintain a given level of influence depends only on α and β,. If, under a given set of market and product conditions, the level of influence grows slowly and/or declines quickly for an advertising message, then the message requires frequent reinforcement. If the influence increases quickly and/or declines slowly, then reinforcement is required less frequently. It should be noted that the alpha/beta approach to modeling learning and decay is only one possible alternative for modeling the concepts of learning and decay. Those skilled in the art will recognize that many other techniques may be applied to accomplish the same or similar results. For example, a numerical look-up table with a series of predetermined values that have been empirically derived from a series of marketing studies could also be used to model learning and decay. The scope of the present invention contemplates the use of alternative modeling techniques/methods and includes all such similar techniques.

Advertising Influence Over Time

Figure 32:
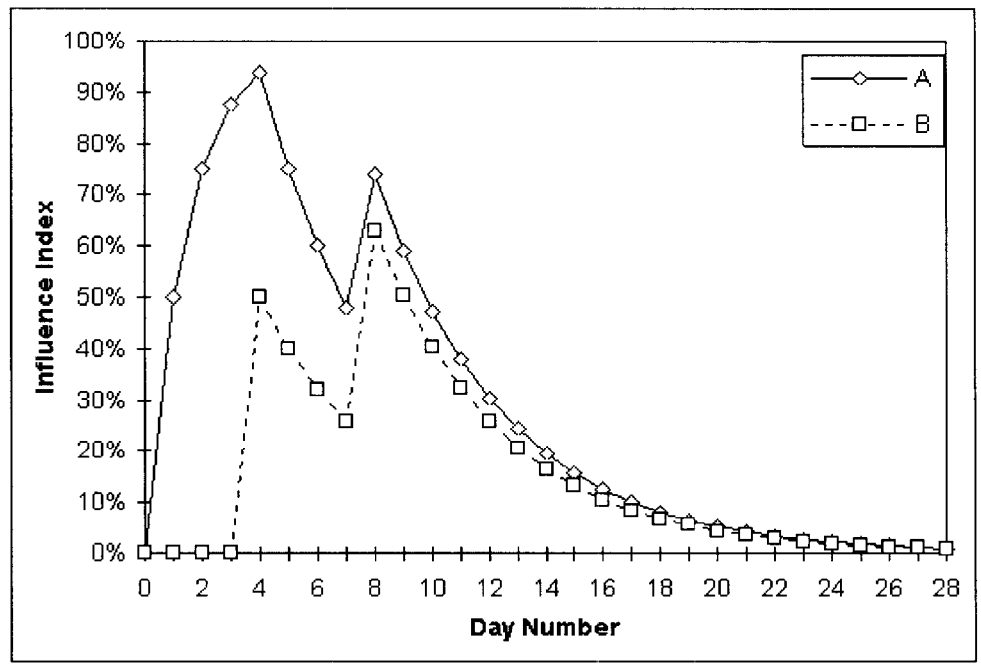
FIG. 32 is a graphical representation of influence to advertising based on exposure frequency.

The total influence that a series of advertisements has on an individual accumulates over time. When there is either a sequence of exposures to an advertisement, or periods of non-exposure, as shown in FIG. 31, the curves are smooth and consistent. When exposure is intermittent, the curves are also logarithmic, but in a discontinuous way. This is illustrated in FIG. 32. In this case two individuals are initially exposed unequally to an advertising plan or schedule. Beginning with day number 1, Person A is exposed to three consecutive advertisements. Then, on day 4 and beyond, both person A and person B are exposed to the same advertisements B on day 4 and again on day 8.

As indicated by FIG. 32, even two weeks after the sequence of advertisements began, there continues to be a difference in total influence for the two people. Person A is at 19%, while person B is at 16%. The difference between the two people is small, and gradually becomes smaller over time, but it continues to be measurable. This phenomenon is entirely consistent with most theoretical learning models. Even though the exposure history for both people has been identical for many days, there continues to be some residual influence that stems from earlier exposures for person A. As time progresses, the difference consistently decreases, but it never entirely disappears.

Illustration of Plan or Schedule Change

Modifying an advertising plan or schedule to more evenly distribute advertisements may not improve the overall effectiveness or value of the plan or schedule if the individual exposures do not become more evenly distributed as a result of the modification. It is possible that a plan or schedule could be evenly distributed over time, but still have an overall uneven distribution of exposure because of uneven distribution of exposure by various categories of audience members.

To illustrate how a plan or schedule might be modified to achieve a better time distribution of exposure without necessarily modifying the distribution of the actual advertisements, a more realistic example, at least in terms of how people might actually be exposed to advertisements in a plan or schedule, is presented below.

Figure 33:
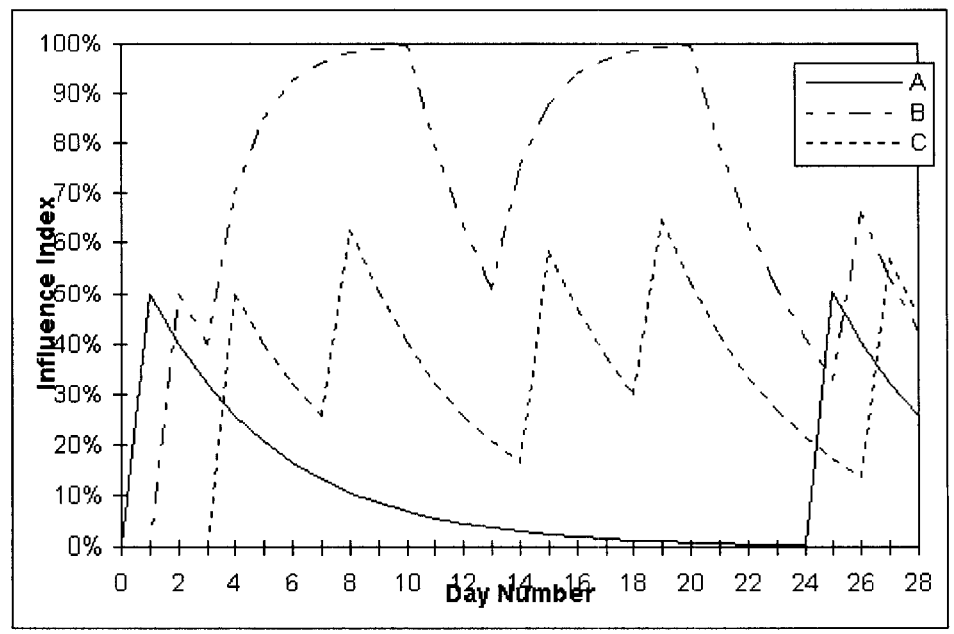
FIG. 33 is a graphical representation of the average influence index values for three groups of audience members.

Referring now to FIG. 33, three groups of audience members are each represented by an average influence index. The three groups may constitute only a small percentage of the total audience, they may be of different sizes, and they may not follow clear demographic, or geographic boundaries, but the exposure decisions within each group are moderately consistent. During the four-week period shown, group A is exposed only twice; once at the beginning of the period, and again at the end of the period. For most of the period, the influence score for this group is relatively low. Group B is exposed repeatedly during the entire period, and, as indicated by concave curve in two places, has reached saturation. The exposure for Group C is more ideal in that the overall exposure is relatively consistent, and the resulting influence values are about 40%.

The strategy used to optimize the plan or schedule for these three groups of people is to adjust the general advertising plan or schedule to improve on individual timing irregularities. If the plan or schedule can be rearranged so that one or more of the excess exposures for group B can be shifted to group A, then the total influence index value for the audience as a whole increases. So, in an attempt to optimize this plan or schedule based on exposure timing alone (ignoring audience valuation, cost, response, etc.) one of the advertising spots could be changed using the following steps:

1) Go through the entire advertising plan or schedule and find the one spot which contributes the least to the total influence index value for all audience members combined. Remove this spot from the advertising plan or schedule.

2) Assemble a list of alternative spots that would be acceptable additions to the plan or schedule. This list could conceivably include all available spots during the four week period, but could also be confined to a relatively few alternatives in competing vehicles.

3) Go through the list of spots and find the one which contributes the most to the total influence index value for all audience members combined. Add this spot to the plan or schedule.

4) Repeatedly go through steps (1) through (3) until no further improvements can be made to the plan or schedule.

In the above procedure, the three viewing groups are not explicitly identified. The purpose of the previous discussion was to simply highlight the potential for improving an advertising plan or schedule based on the exposure habits of the three groups. It should be noted, however, that any change in the schedule which results in shifting of exposures from group B to group A without disturbing the exposures for group C will result in an improvement in the total influence index. All possible changes should be examined to identify those which will result in an improved index.

Scoring

In step (3) above, the total influence index value for all audience members combined is computed. Based on time weighted effective frequency, the value of an advertising campaign is the total influence that the advertisements have on individual audience members. The influence that the campaign has on an individual is the sum of the influence for each day during the campaign. This is explained in more detail below.

FIG. 32 duplicates the curves in showing the influence on individuals for two different advertising exposure sequences. Both have a frequency level of four, but the exposures for person A all occur during the first four days of the period, while the exposures for person B occur evenly throughout the four week period. The vertical axis for this figure has been labeled "influence index" and is scaled from 0% to 100%.

Figure 34:
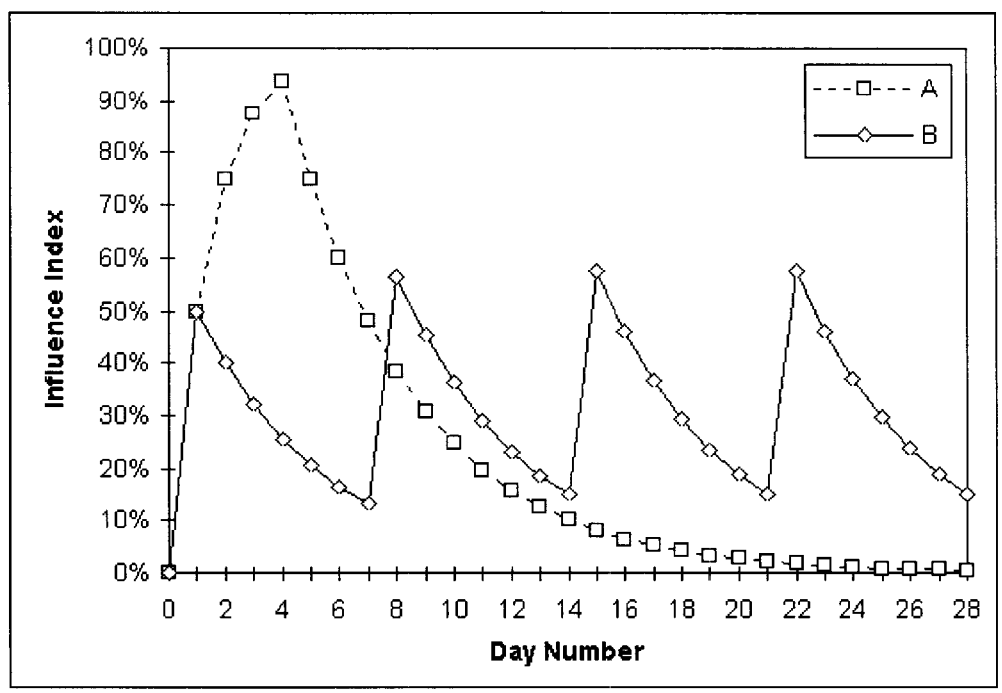
FIG. 34 is a graphical representation an influence index using two different exposure frequencies.

Looking at FIG. 34, an effective way to measure the influence of advertising on an individual over a period of time would be to measure the average index over the period (or, equivalently, to measure the area under the curve.) The average index for person A is 679/28=24%, while for person B it is 875/28=31%.

With individual exposure data, the only other information which is required to compute time weighted effective frequency is a specification of the shape of the learning and decay curve using two parameters: $\alpha$ and $\beta$. The methods of the present invention for optimizing an advertising plan or schedule using time weighted effective frequency do not necessarily require that the level of influence of advertisements be described logarithrnatically. However, this is a simply a mathematically convenient technique for characterizing learning and recall. If, for instance, it was determined that the audience response for a particular advertising campaign more closely followed some other function, such as a step function, then the time weighted effective frequency technique of the present invention could accommodate that belief. The methods used would remain the same.

Example

FIG. 35 illustrates how scores are computed for time weighted effective frequency using actual exposure data. Shown is a base plan or schedule spanning one week beginning on day 1 and ending on day 7. The plan or schedule for each of the seven days, with the exception of day 4, has a single advertisement. To expand the plan or schedule and add one more spot to the on day 4, various alternatives may be considered. For purposes of illustration, consider one of three alternatives: 8:00 PM, 9:00 PM, or 10:00 PM. The audience is composed of a total of 20 people. The exposure columns indicate whether or not each of the people in the audience was exposed to the advertisement on each of the indicated days, including the three alternative time spots on day 4.

In examining the exposures, there are no obvious patterns in the viewing. Some audience members view more television than others, some are not exposed at all during the week, and others have only one or two exposures. The three alternative spots are approximately the same in the sense that all three have a total of five audience members who would be exposed.

The influence index values for each of the 20 people are computed for each of the three alternatives. The values chosen for this example for $\alpha$ and $\beta$ for all three alternatives are 0.4 and 0.1 respectively. If, by a particular day, the person has not yet been exposed, then the index is zero and is not listed. If a person is exposed on any of the days, then the index for that day increases. If a person is not exposed, the index decreases. Person #14, for example, is exposed to the advertisements on day 4 for both alternative A and alternative B, but not for alternative C. The influence index values for alternatives A and B are the same and both increase on that day. After day 3 the alternative C scores are less than either alternatives A and B because person #14 was not exposed to an advertisement at 10:00 PM on day 4. These scores for person #14 are plotted in FIG. 36.

Returning to FIG. 35, if a person is not exposed to any of the three alternative spots, such as person #20, then that person's computed scores are identical for each of the three alternatives. For all members of the audience, the scores for the first three days for each of the three alternatives are identical.

The influence index values are totaled by person, and then for each of the three alternatives, a grand total is computed which is the sum of all influence index values for all audience members over the 7 day period. If the only consideration is exposure influence (without demographics, cost, etc.) then alternative B appears to be the superior alternative. At 3729, alternative B is about 1.5% better than alternative A and 1.2% better than alternative C.

A difference of 1.5% may not seem significant, but may be very significant given the number of constraints in this example which limits the amount of optimization that can be done, including: considered only scheduling in the optimization (i.e., ignoring demographics, cost, response, etc.); only seven advertising spots; spanning only 7 days; only one change; only three alternatives spots; approximately equal exposure to spots; and only 20 members in the audience sample.

Even more significant improvements in advertising efficiency can be found as it becomes necessary to address more realistic problems where there is additional flexibility in iterating many times through the optimization procedure with more possible changes in the plan or schedule and more alternatives for each of the changes.

Even with this simple example, computing the total score for each of the three options is a significant task. Computing the scores for several dozen alternatives for a base plan or schedule of one or two hundred spots and an audience of many thousands of people obviously requires a computer system, such as the one described herein. It is a computationally intense method, but the only parameters that need to be specified are $\alpha$ and $\beta$. An attractive feature of the methods of the present invention is in the simplicity in arriving at worthwhile results.

Why Plans or Schedules are Often Not Optimal

Even if advertisements are evenly distributed over time, it is possible that the resulting plans or schedule may still be less than optimal. It is possible that individual advertising exposure is not evenly distributed, even with an evenly distributed plan or schedule. This phenomenon is described in more detail below, using the information presented in the optimized plan or schedule sample above.

Referring again to FIG. 35, in the audience of 20 people, there were three people, #1, #9, and #17, who were not exposed on either day 2 or day 3, but who were available for exposure on day 4 at 9:00 PM. Two of these three people were exposed on day 1, but the other was not. By day 4, all three of them had relatively low index values. Their influence index totals would contribute substantially to the grand total if they all could be exposed on day 4. In relative terms, this group of three people was a significant collection in the audience sample. They had similar viewing habits, and they all needed another exposure to maintain awareness and to increase the value of the advertising message to the advertiser.

These three people were not necessarily the most lightly exposed in the audience. Most others in the sample were not exposed at all, or were exposed only once before day 4. The difference was that this small group shared similar viewing habits. Although unrelated, these disparate individuals made decisions about viewing that were similar, and this similarity could be used to improve total influence for the audience.

Therefore, even though the spots in an advertising plan or schedule may be evenly distributed, the audience is not. The focus, then, of the methods of the present invention is not on the overall timing of advertising spots, but on fine tuning the plan or schedule so that individual exposures are also optimally distributed over time. It is possible to have an evenly distributed advertising plan or schedule, and still have uneven individual exposure to that plan or schedule simply by virtue of the fact that certain groups of audiences members typically make similar media selection decisions. This fact lends credence to the value of optimization to increase not only the reach of an advertisement but to more evenly distribute the audience exposure according to these media selection patterns.

Given that some form of audience grouping is required for optimizing plans or schedule, then identifying these groups and the patterns associated withing the groups within a larger audience sample is important for advertising optimization at a national level. Not only do identifiable groups of viewing patterns exist in most audiences, but these group movements can dominate audience exposure. In reviewing the viewing habits of the Nielsen Television Index sample, for example, it is easy to find systematic decision making patterns everywhere. The existence of these patterns stems from several conditions.

First of all, certain types of programs appeal to specific groups. These groupings may stem from a variety of complex, interacting factors including gender, age, culture, geography, weather, income, race, etc. Next, most people have strong program loyalties. Although these program loyalty patterns can vary from one program to another, and from one demographic group to another, all programs command some degree of loyalty from their audiences. In addition, lead-in and lead-out programming is a strong determinant in program selection. Further, competing programs with their audiences of loyal viewers and the surrounding programming associated with these programs can influence viewing patterns significantly. Finally, there are a host of less quantifiable factors which can influence viewing patterns.

A combination of these factors often results in groups of unrelated people consistently making similar media selection choices over time. This condition can be used to the advantage of an advertiser in one of two ways, depending on the media objectives of the advertiser. For example, if the objective of the advertiser is to simply maximize total reach, then an advertising plan or schedule should be designed that will effectively expose each identified group one time each, focusing the available resources on broad coverage. However, if the objective of the advertiser is to optimize frequency, possibly at the expense of reach, then large groups should be exposed the specified number of times, according to the model of optimal effective frequency as determined by the media planner.

The process of optimizing an advertising plan or schedule naturally takes advantage of decision groupings. If a certain group requires additional exposure during some period of time, then the optimization process identifies advertising spots which the target group is frequently exposed to. If a group is over-exposed, then the process also identifies spots which the group is collectively exposed to and eliminates them from the schedule during the optimization process.

The validity of using historical viewing records to measure the potential for future advertising campaigns should be examined at this point. It is the consistent patterns in individual and group exposure that not only makes optimization possible, but also justifies its use. Individuals and groups consistently follow patterns of viewing. If a given viewing or other media-related audience sample, such as the Nielsen sample, follows these types of patterns, then the larger population also does. There are indications, for example, that program loyalty patterns are very stable. Once an individual has become loyal to a particular program, this loyalty will often remain in place for months or even years. If these patterns are in place, then the patterns can and should be used to improve on advertising plans or schedule.

Previous Studies

Many researchers have attempted to use a variety of techniques to identify patterns in television program selection. These efforts have met with only mixed success. The difference between previous attempts and the present invention lies not only in the methods and techniques, but also in the objectives. Most previous efforts were attempting to identify program types and audience groupings so that new programming could be identified which would appeal to these audience groups, so that rating and share forecasts could be made, and so that programming niches could be found for new television stations or cable channels.

In all of the studies, many audience groups were identified. There were, however, several problems with the results of the studies. For example, some studies have shown that there are too many people in the television audience who do not fit neatly into any group, thus making accurate forecasts difficult to compute. Further, too many groups seem to be driven by schedule-dependent factors, such as lead-in and lead-out, which lend little insight into programming decisions. In addition, many of the groupings are illogical. Program type preferences, for example, do not dominate decision patterns. This may be explained by suggesting that people actively seek out variety in programming. Alternatively, it is simply possible that many decisions are based on the least objectionable alternative available.

The intent of the methods and techniques of the present invention is only to find ways to improve advertising plans or schedule. The viewing habits of any group of people in the audience can be used to make individual exposure spacing improvements. There is no requirement for widespread, consistent grouping to successfully implement the optimization techniques disclosed herein.

Using the methods herein, groups do not need to be explicitly identified. The techniques do not require modeling (i.e., factor analysis, linear programming, or regression analysis) of either the audience or the media as other methods have employed. The techniques simply take advantage of audience decision groupings to optimize an advertising plan or schedule by improving the overall influence index score. The reason that improvements can be made to advertising plans or schedules using time weighted effective frequency techniques is because audience groups exist. But the techniques do not require the isolation and identification of these groups. Instead, the present invention uses a specific methodology to search through a set of modifications exhaustively at each step to find the optimal combination which most closely match the desired criteria.

Ideal vs. Optimal Plan or Schedule

Returning to FIG. 35, the selection of alternative B is not ideal, but it is the optimum alternative given the set of three alternatives. Person number 14, for example, didn't require another reinforcement of the advertisement as much as some of the other people in the audience. The index for this person only increased from 78 to 87; a total of 9 index points. This is well below average for the people who saw the advertisement on day 4 at 9:00 PM. Alternative B provided the opportunity to expose person #9 who had never seen the advertisement before, but missed person 19 who also had never seen it.

Some audience members will continue to be exposed irregularly, in part because of irregular viewing habits. Others will be over- or under-exposed because of above or below average viewing. While it is impossible to achieve an ideal distribution of exposures for all viewers in all circumstances, the intent is to optimize the distribution of exposures so that the exposure distribution, on average for the entire population, is improved.

Audience Valuation

As defined herein, the value of an individual to an advertiser depends entirely on demographic characteristics. The value of an individual does not depend on media habits, the number or timing of advertising exposures, or the cost of advertising. The value is based purely on the belief that specific demographic characteristics are good indicators of how people will respond to specific advertising. As mentioned previously, some demographic groups generally buy some types of products. Some groups rarely purchase consumer products, but when they do, their purchases tend to be large.

Some demographic groups may rarely select a particular type of entertainment. For example, studies have shown that rich middle-aged men are difficult to reach with network television, but their underlying value to advertisers is independent of this fact. The question in valuing an audience member is, if it is possible to reach a given person with advertising, how valuable would the person be to an advertiser? The index values for each specific demographic parameter or characteristic can be assigned based on the importance of the parameters for a given advertiser. Alternatively, previously identified values can be implemented in the present system and used directly.

The value of an individual audience member to a particular advertiser is defined in equation (1) above as $$\prod_{d=1}^{D} V_a^d = V_A^1 \times V_A^2 \times \ldots \times V_A^D$$

where, for example, $V_A^1$ might be the age/gender index value, $V_A^2$ could be the household size index value, etc. Each of these index values are multiplied together to calculate the index value for an individual audience member.

Various statistical techniques may be used to draw clear demographic boundaries between product purchasers and non-purchasers. However, most known valuation techniques ignore the fact that all members of an audience may have some value, but that the valuation function must be a continuous rather than a discrete one. While exposing a targeted audience to an advertisement, other audience members who are not part of this targeted audience are still exposed, and these exposures have some value.

Figures 36, 37:
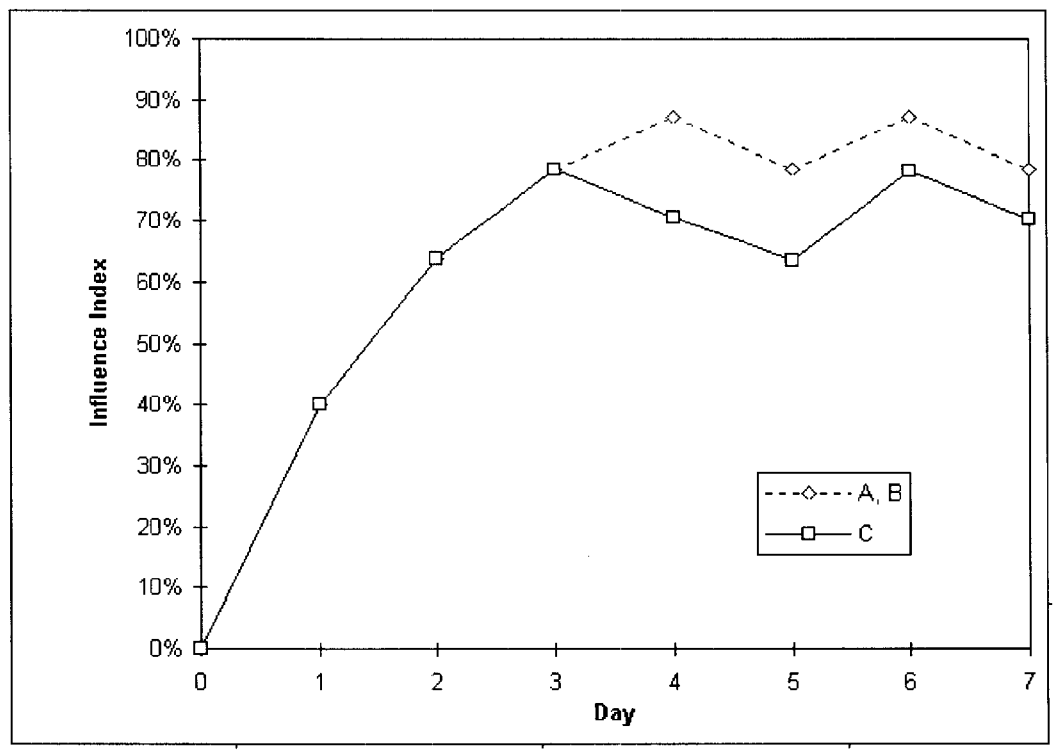
FIG. 36 is a graphical representation of an influence index for a given audience member.
FIG. 37 is a tabular representation of index values based on audience age and gender information.

The formatting used for the demographic data is similar to the formatting used in valuating frequency levels. There can be any number of partitions for each of the demographic characteristics depending on needs and the information available to the advertiser. The tables shown in FIGS. 37, 38, and 39 illustrate how various sample values might be formatted for indexing purposes. As with other illustrations, these tables are merely possible approaches and the present invention is not limited to these specific examples.

Using these assignments, a 24 year old women, living in a home with $35K annual income, in a B size county would be valued at:

$$V_A^1 \times V_A^2 \times V_A^3 = 0.6 \times 0.7 \times 0.8 = 0.336$$

Although not essential for the optimization method to function properly, in this case the maximum index value for each of the three demographic characteristics is 1.0. Therefore, a woman of age 28–40 with a household income of 40+K living in an A county would score:

$$V_A^1 \times V_A^2 \times V_A^3 = 1.0 \times 1.0 \times 1.0 = 1.0$$

Therefore, the 24 year old woman has 33.6% of the value of the most valuable person to this advertiser. To further the example, assume that there are 10 people in a small audience sample, and that five of these people saw the advertisement. Assume that all five people are demographically identical to the 24 year old woman described above. To compute the total value of this audience to an advertiser, the scores of each of the 5 individuals who saw the advertisement are summed:

$$\sum_{i=1}^{N_a} \left[ V_I^p(i) \times \prod_{d=1}^{D} V_A^d(i) \right]$$

where N is the total number of impressions for this advertisement, which in this case, is five. Audience members who do not see an advertisement do not contribute to the overall total score. So the sum of all five audience members is:

$$\sum_{i=1}^{5} .336 = 1.68$$

The range of demographic factors which can be used to define audience member values can extend as broadly as there is data available. Network television advertising contracts specify only age and gender, but the analysis that precedes that contract agreement can include any number of demographic factors, and could even include value assignments to age and gender categories that are not a part of the contract provisions. For example, an advertising plan or schedule for a product with a narrowly defined target group such as women 15–25, could be optimized based on that group. Then, the advertising agreement could specify a more conventional demographic group such as women 18–34.

As indicated in FIG. 37, the methods of the present invention allow the assignment of values to combinations of demographic characteristics. Women 28–40 are valued at 1.0, but men in the same age range are worth only half that much to the advertiser. Of course, as the number of demographic characteristics increases, the number of possible combinations of demographic characteristics increases exponentially.

There are a number of places that advertisers could look to for this type of information. These include current customer characteristics, competitor customer characteristics, market research, and product strategy studies.

Exposure Recency Valuation

Some types of routine decisions follow a regular daily or weekly pattern. The decisions are made over and over again. For example, people often decide how and where they are going to eat dinner right around dinner time. Many individuals frequently make entertainment decisions just before the weekend. People decide what to buy on Friday night as they browse through the store, and they decide who to have repair the car on Saturday morning.

Some decisions are not periodic but they are still made at a fixed time. Promoted television programs are aired at fixed times, and most of the people who watch television programs make the viewing decision just before the program is aired. Many people appear to make their decision about whether or not to watch movies about the time they first open in theaters. Public holidays are fixed in time, and many purchasing decisions associated with these occasions are made within a relatively narrow time window.

Under these types of market conditions, an advertising exposure just before or at the point of decision is ideal. According to most studies on learning theory, the more time that elapses between an advertising exposure and the time of decision, the less influence the advertising exposure will have at the time of the decision. The value of an advertising exposure depends on the amount of time that has elapsed between the time of exposure and the time of decision. A measure of the value of an exposure based solely on this time difference is termed exposure recency value.

If, under certain market and product conditions, the rate of influence decay is fast (see FIG. 30), then the value of a given exposure is lost quickly. If the rate of decline is relatively slow, then the exposure recency value will decline more slowly, and exposure recency will not be as significant factor in determining the value of a plan or schedule change.

Exposure recency values can be assigned using a table similar to the one shown in FIG. 40. The table entries could depend on a variety of factors related to the type of product being advertised. The assignments shown in the table of FIG. 40 for example, indicate that an advertisement aired on the same day as the associated point of decision has full index value (i.e., 1). Advertisements aired one day before are worth 60% of the value of same-day advertisements, etc. These values may be determined empirically, or may be based on other factors as determined by the media planner. As before with other index values, more entries can be added to increase the level of granularity.

All individual exposures for a given advertising spot have the same exposure recency value. The value does not vary from one audience member to another as it does for exposure or audience valuation. Referring to the general scoring equation, if an advertising spot is anytime on Wednesday, for example, and the ideal advertising spot day is specified as Thursday, then the exposure recency value for the spot is $V_T(\alpha)=0.6$ for all members of the audience who are exposed to the advertisement on that day.

If exposure recency is determined by measuring the number of hours, rather than days, between the exposure and the time of decision, as might be the case with snack food, which is often consumed at mid-afternoon or during television prime-time, then a table similar to with "Hours to Decision" would be used to assign exposure recency index values on an hourly basis. Similarly, weeks or other time periods might be specified.

Response Index

There are a number of factors associated with advertising spots which could influence the level of response that audience members will give advertising messages. These factors are unrelated to the issues associated with the other index values already discussed, such as exposure value, demographics, recency, or advertisement quality. These factors are more closely related to the host media and include a wide variety of information.

For example, the viewers of some television programs may, on average, buy particular products more frequently than viewers of other programs. In addition, some television programs may be more effective in capturing and holding the attention of audience members. Once captured, the audience may be less inclined to be distracted during advertisements. This effect is known as program inertia. Another factor may be the thematic nature of the media message. As explained in the background section above, the theme or subject material for some television programs or magazines may be considered to be more consistent with some particular advertised products. As another example, a certain program may be considered to be unusually effective in setting the tone for a product, or an advertiser may believe that audience members during certain times of the day may be more (or less) attentive to advertisements.

The response index is defined as a composite of the various types of factors listed above. In general, each of these factors can be assigned to one of two categories, either host media characteristics (such as the television program), or the type of product being advertised (such as tooth paste). The response index is not dependent on factors which are accounted for in other indices such as demographic characteristics (this is included in audience valuation), program loyalty levels for series programs (this is included in multiple exposure valuation), audience skew toward demographic group or another (this is included in person-by-person analysis).

Fortunately, a number of sources of data are available which can be used to derive a response index for product/media combinations. Services such as MRI and Simmons assemble data that relate media usage to product and service usage. These types of data are widely available to advertisers and broadcasters, and provide an excellent starting point from which response indices can be estimated. It is anticipated that as additional product/service usage information becomes available, the techniques for measuring the relationship between the target audience and the product/services will only improve.

In the broadest sense, the response index values required to optimize an advertising plan or schedule are simply index numbers associated with each of the spots in the plan. If, for example, a simple advertising plan has only five spots, then the index values might be assigned as follows:

| Program | Response Index |
|---------|----------------|
| Program A | 0.85 |
| Program B | 1.00 |
| Program C | 0.78 |
| Program D | 1.15 |
| Program E | 1.65 |

As illustrated above, Program B, with a response index of 1.00, is arbitrarily selected as a base against which the response index of other programs will be indexed. Program A, then is considered to be 85% as effective as program B in persuading audience members to purchase a particular advertised product. Programs D and E, by contrast, have been determined to be superior to Program B in influencing purchasing decisions. The average index does not necessarily need to equal 1.0. The values just need to be relatively consistent.

It should be noted that, using the methods of the present invention, inferred relative response index values for spots in an advertising plan can be computed. This is accomplished by supplying the other index values for audience valuation, cost, recency, etc. for the plan, and then computing the response index for each of the spots in the plan which would be required to make all spots in the plan of equal value. A comparison of these computed index values could be used to identify inconsistencies in value for the spots in the plan.

In assembling an advertising plan or schedule, a situation may arise such as the following. The CPM for a particular program, program A, is significantly higher than for other similar programs, such as program B. Program A is very popular, and probably has greater reach than program B, but the audience demographics may be broader than required for the product to be advertised. Although Program A seems to have a very loyal audience, this may push the frequency levels higher than we require given the plan or schedule that has already been developed. Finally, and possibly most important, the programming for program A is more consistent with the product than is the programming for program B. If the product is advertised on program A rather than program B, it is necessary to calculate how much of the added cost is going to the greater reach and loyal audience in the context of our advertising plan or schedule, and how much can be attributed to the program content. In other words, how high is the response index of program A compared to program B?

This question can be easily answered using the methods of the present invention. Assume that accurate values for the response index for both programs are included in equation (1) and that the resulting scores are equal, meaning that if all things were considered, there is no clear decision as to which program to select. Thus:

$$S_b(A) = S_b(B)$$

or $$\sum_{i=1}^{N_A} \left[ V_I^n(i) \times \prod_{d=1}^{D} V_A^d(i) \right] \times V_T(A) \times V_R(A) \div V_C(A) =$$

$$\sum_{i=1}^{N_B} \left[ V_I^n(i) \times \prod_{d=1}^{D} V_A^d(i) \right] \times V_T(B) \times V_R(B) \div V_C(B)$$

Rearranging the terms and arbitrarily assuming that the response index for program B is 1.0, then the equation becomes:

$$V_R(A) = \frac{\sum_{i=1}^{N_B} \left[ V_I^n(i) \times \prod_{d=1}^{D} V_A^d(i) \right] \times V_T(B) \div V_C(B)}{\sum_{i=1}^{N_A} \left[ V_I^n(i) \times \prod_{d=1}^{D} V_A^d(i) \right] \times V_T(A) \div V_C(A)}$$

Thus, the ratio of the scores without a response index term in either score equals the assumed response index of program A. If, for example, the score $S_b(a)$ is computed for both programs using the same base plan or schedule, and the score for program A is 1000 and for program B is 2000 (in large part because of a large difference in values for $V_C(a)$, the advertising cost for the two programs), then it must be assumed that, all other things being equal, people watching program A are at least twice as responsive to advertising as they would be watching program B. If this is true, then the obvious choice is to select program A. Otherwise program B is selected.

One possible strategy to deal with uncertainty in response indices is to optimize an advertising plan or schedule in multiple phases. Each phase would focus on modifying the plan or schedule for programs which are judged to have similar response indices.

Cost

The cost index $V_C(a)$ in equation (1) is the total advertising cost, not cost per thousand (CPM). Most media planners for network television do not always have convenient access to absolute costs. They normally deal with costs in terms of CPMs. This does not present a significant problem, however. A preferred embodiment of a system which implements the methods of the present invention will have access to person-by-person data. With this data available, conversion to an index for absolute costs from CPM values would not be difficult.

Comprehensive Example

It is now possible to bring all the pieces of equation (1) together into one comprehensive example. The starting point is the base plan or schedule and exposure records which was introduced in FIG. 35. The base plan or schedule includes six advertising spots. The decision has been made to add one more spot at one of three alternative times available on day 4.

The first step is to assemble the data shown in the table in FIG. 41. This table includes four sections: the plan or schedule with the exposure indicators for the 20 audience members, exposure valuation indices, audience valuation indices, and subtotals for each individual.

Exposure Valuation

Two valuation techniques are used to computing the exposure values: weighted effective frequency, and time weighted effective frequency. Scores are computed using both techniques so that the differences in the results can be compared. Normally, a media planner would select only one of the techniques for use in optimizing an advertising plan or schedule. However, in certain circumstances, it may be beneficial to use both techniques in combination to optimize an advertising schedule or plan.

The frequency values for weighted effective frequency come from the table shown in FIG. 23. For example, the exposure for alternative B would be the second exposure of the plan or schedule for person #1. According to the table shown in FIG. 23, exposure number 2 has an index value of 0.8. This value is entered in for alternative B, person #1. This person was not exposed to the advertisements for alternative A or C, so no value is in those positions under weighted effective frequency.

The values for time weighted effective frequency are the individual audience member totals for each of the three alternatives from the table shown in FIG. 35.

Audience Valuation

For this optimization example, only four demographic characteristics are considered: age, gender, income, and county size. Listed in the table shown in FIG. 41. are the details for each of these characteristics for each person. Adjacent to each demographic value is the index value for each characteristic. Person #1, for example, is a 23 year old male. According to the table shown in FIG. 37, a male of this age has no value to the advertiser. He lives in a household with $16K annual income. The index value from the table shown in FIG. 38 for this level of income is 0.5. He lives in an A sized county, which, according to the table shown in FIG. 39, has an index value of 1.0 to the advertiser. Similar entries are made for the other members of the audience.

Subtotals

Next, each of the exposure values is multiplied with the demographic index values for each person. These values are listed as individual subtotals. This subtotal for alternative B for person #3 using time weighted effective frequency, for example, is:

$$V_I^n(i) \times \prod_{d=1}^{D} V_A^d(i) = 221 \times 0.7 \times 1.0 \times 0.8 = 124$$

These individual values are then summed at the bottom of the table shown in FIG. 40 according to the equation:

$$\sum_{i=1}^{N} \left[ V_I^n(i) \times \prod_{d=1}^{D} V_A^d(i) \right]$$

Now, assume that the remaining indices necessary for computing the scores are those shown in the table of FIG. 42. The time recency indices are all 1.0 because all three program alternatives are on the same night. The response indices for the three alternatives are set by the advertiser based on information from a variety of sources including market research, trade studies, and/or judgment. The cost indices are derived from media rate cards, and estimates. The base values for each of these indices are arbitrary. Resetting all the time recency indices to 2.0, for example, does not change the final ranking of the alternatives.

Results

The scores for each of the three alternatives for both weighted effective frequency, and time weighted effective frequency are listed in the table shown in FIG. 42. These are the values used to decide which alternative to add to the base advertising plan or schedule. The media objectives, assumptions about audience behavior and learning, the values that placed on the various demographic characteristics, and the actual exposures for the target audience are all reflected in these values.

Weighted effective frequency, which, in this case, emphasizes exposing audience members about three times, favors alternative C, while time weighted effective frequency alternative B. For purposes of comparison, it is interesting to note what the decision may have been using one of the simpler decision rules, previously explained above.

Average Frequency

All three proposed alternatives are identical. Each exposes exactly five people, so the increase in average frequency is the same. Even though the exposure numbers for each audience member is different, the overall frequency for the audience doesn't change.

Reach

All three alternatives are identical. None of the alternatives exposes any audience member for the first time. Since there is no change in the number of audience members exposed to the advertisement, there is no change in the frequency rating.

Effective Frequency

If the presumed level of effectiveness is three exposures, then all three alternatives exposes two people for the third time. Again, all three choices are the same and no decision can be made on this factor alone.

As illustrated by this example, based on the commonly-used decision rules, then, it would be concluded that the three alternatives are equally effective, when in fact, from a variety of perspectives, they are not.

The viewing patterns for this example of 20 people were specifically selected so that there would be no obvious patterns of viewing, and so that there would be identical reach and frequency. This was done to highlight the effectiveness that this integrated method has in isolating important differences in scheduling alternatives. When actual media-related access data is used, the important differences between various options in advertising plans or schedule are more pronounced, and the benefits to using this method are even more significant.

Local Maximum

It is possible that the optimization process could converge on a point which is the maximum score for small changes in a base plan or schedule, but which is not the maximum score if all possible plans or schedule for a time period were checked. If, for example, an advertising plan or schedule was created by starting with a base plan or schedule with no spots, and one spot after another were added, it is still possible to arrive at a plan or schedule which is less than optimal.

Figures 43, 44:
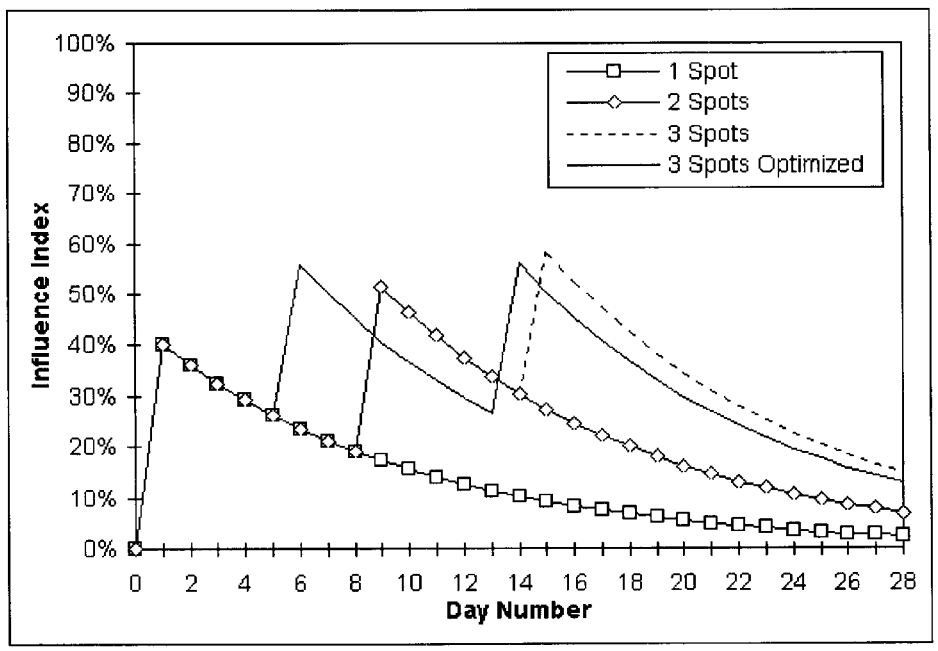
FIG. 43 is a tabular representation of values for a series of advertising spots for optimization purposes.
FIG. 44 is a graphical representation of the optimization information presented in FIG. 43.

Suppose there is one person who is available to be exposed to advertisements on any of 28 consecutive days. The goal is to create an advertising plan or schedule which consists of a single advertisement for this person which is optimal in the sense that it maximizes average influence. As indicated in the table shown in FIG. 43, the optimal position for a single advertisement would be on the first day of the four week period. This single advertisement would result in an average influence index of 13.5%. The "1 spot" plot in FIG. 44 shows the level of influence that this one advertisement would have over the four week period. If, assuming another advertising spot was added to the first using the optimization techniques of the present invention without changing the timing of the first advertising spot, then this second advertising spot should be on day 9. This would result in an average influence of 24.3% for the four week period. If, to continue the example, a third advertising spot was added to the plan or schedule, assuming the first spot remains on day 1 and the second on day 9, then the optimal position for the third spot would be on day 15. This would result in an average influence of 32.8%.

Now, suppose the media planner is allowed to adjust the position of spots numbers 2 and 3 in an effort to increase the average influence. It is discovered that by moving spot 2 from day 9 to day 6, and spot 3 from day 15 to day 14, then the average influence increases to 33.1%.

Plan or schedule number 3 is locally optimal in the sense it solves the specific problem of maximizing influence with the constraint that we cannot move the other spots. But plan or schedule number 4 is globally optimal because there are no other plans or schedule consisting of three spots which would produce a higher average influence. However, finding the globally optimal schedule required the adjustment of the timing of both spot 2 and spot 3.

If a media planner is willing to change multiple spots at a time, then the potential for finding a more optimal solution improves. In order to be assured of finding the globally optimum plan or schedule, it is necessary to test all possible alternatives and combinations. If the goal is to optimize a plan or schedule of r spots over a period of m days which had n available spots, then the number of possible alternatives which would need to be tested would be:

$$C_r^n = \frac{n!}{r!(n-r)!}$$

If, for example, a media planner wanted to search all possible options for an n=10 spot plan or schedule from among r=150 available spots, it would be necessary to compute the score for about $10^{15}$ alternatives. If each computation required 1 second, the total computation would require about 37 million years, which is impractical. The method described above, which allows the movement of only one spot at a time, is probably adequate for most purposes. It is important to note that various statistical and computing techniques exist which overcome some of the problems associated with identifying locally optimal solutions rather than globally optimal ones. The methods of the present invention can be easily adapted to incorporate those techniques.

User Interface

One feature of this integrated optimization method which makes it particularly appealing is the simplicity of the user interface. Despite the complexity of the internal processing, the user interface is surprisingly simple. A media planner would generally have most of the information required to use the system. All that would be required to start the optimization process would be a base advertising plan or listing, a listing of possible alternative spots to add or remove, media objective values (such as those shown in the tables of FIGS. 37 and 40) and, if using weighted effective frequency, the weighting values, or, if using time weighted effective frequency, appropriate values for $\alpha$ and $\beta$.

To optimize a plan or schedule, a planner would initialize the system by entering the objective and weighting values. Then, the base plan or schedule and the list of alternative slots would be entered. The user would start the system processing on the two lists. When complete, the system would return a listing of the alternative spots ranked according to score. The user would select from among the alternatives, add the spot to the list, and, if desired, create another list of possible modifications and continue the iterative process until the desired optimal schedule is achieved.

Media Analysis Ratios

Another important consideration for media planning in today's market is the ability to analyze and compare the viability of various media vehicles for accomplishing the goals of the media planner. The use of ratios for purposes of analysis can be applied in many situations, including measuring the effectiveness of competing media-related vehicles. Ratio analysis has been previously used in accounting and management functions where ratios such as "quick ratio," "short-term debt ratio," and "price/earnings ratio" are used as comparative analysis tools to compare/contrast competing businesses.

A similar type of ratio analysis can be accomplished by using DME database 126 and DME 127. By extracting pertinent media-related access information from DME database 126, a media planner has some mechanism to compare and contrast the results achieved by various competing alternative media vehicle. Subsets of the data contained in DME database 126 can be selected to represent certain programs, groups of programs, certain time slots, groups of time slots, etc.

With this kind of flexible access to person-by-person media-related access data, complete classes or families of analysis can be defined which describes the exposure patterns to the media for selected demographic groups. These classes may be composed of collections of related exposure ratios which are composed of various media-related exposure values. These collections of ratios, then, can be used to analyze media offerings (such as related television programs or time periods) in much the same way that ratio analysis is used to measure the relative health of similar businesses.

For example, given A and B, each of which can be either: a television program; a time slot; a collection of television programs; or a collection of time slots; various informative media-related exposure values can be determined. This includes determining the number of individuals in the sample audience who were exposed to: some of A and some of B; all of A and all of B; some of B and none of A; all of A and none of B; neither A nor B; A and any during B including B; B and any during A; any during A and any during B; A and any during B except B; etc.

After calculating the various exposure values identified above, a ratio can be formed by using one of the exposure values as the numerator and one of the exposure values as the denominator. These various ratios can then be compared to ratios for a similar selection of programs (or time slots) D and E.

Referring now to FIGS. 45 and 46, various examples of the types and constitution of possible ratios are illustrated. As shown in the table depicted in FIG. 45, depending on the type of analysis to be performed, certain time segments are selected to represent the audience viewing patterns at the desired point in time. Similarly, the table in FIG. 46 describes several possible combinations of media-related exposure values which will yield information regarding audience viewing patterns. It should be noted that the examples shown are for illustration purposes only. The examples presented herein are representative, not exhaustive, and those skilled in the art will readily recognize that many variations are possible, depending on the type of information desired.

Summary

Television programming is a zero-sum game. If one broadcasters gains a viewer, it typically means than another broadcaster has lost one. Advertising plan or schedule optimization is not zero-sum. An audience member could be far more valuable to one advertiser than to another even though both advertisers are pursuing identical demographic groups. This is because exposure frequency and exposure timing are dependent on individual viewing history for each advertisement, and the frequency curves for scoring plans or schedule could be different for every advertiser and every product. It is conceivable that there exists a globally optimal advertising plan or schedule which spans all advertisers and which uses all available advertising spots of all broadcasters at peak efficiency. There would still be audience members who are under or over exposed to particular advertising messages, but under globally optimal conditions, there would be no way to rearrange advertisements in such a way that the total score for all advertisers increases.

There is, of course, no compelling reason on the part of broadcasters or advertisers to seek a global optimum. The point, however, is that if one advertiser optimizes a plan or schedule, it does not necessarily reduce the flexibility that other advertisers have in optimizing their plans or schedule. In fact, it may actually improve the available mix of spots that would be available to other advertisers. This would be desirable for both broadcasters and advertisers.

The task of optimizing an advertising plan or schedule where the vehicle options number less than a dozen, as is the case with network television, is significant. The task of optimizing a plan or schedule where the vehicle options number in the thousands is insurmountable without the systematic techniques and methods as described in this specification. The ability to gather media-related exposure data improves as electronic media becomes more popular. In the future, it is likely that data for larger sample sizes will be available, the data will be cheaper to accumulate, and more data will be available. This would further suggest the need for better mechanisms for analyzing the data as described herein. By using the methods of the present invention, a media planner can effectively distribute advertisements over time or space based on previous or anticipated individual or collective advertising exposures.

While the invention has been particularly shown and described with reference to preferred embodiments thereof, it will be understood by those skilled in the art that various changes in form and details may be made therein without departing from the spirit and scope of the invention.

What is claimed is:

1. A computer system comprising:

a CPU;

a memory coupled to the CPU;

a database residing in the memory, the database comprising a plurality of person-by-person media-related records which describe a series of choices and decisions made by an identified sample audience in relation to a media vehicle;

a database mining engine residing in the memory and being executed by the CPU; and a scoring mechanism residing in the memory, the scoring mechanism evaluating the series of choices and decisions made by individual persons in the identified sample audience as described in the person-by-person media-related records and generating a score for a proposed advertising schedule based on the person-by-person media-related records in the database, the score of the proposed advertising schedule quantifying the effectiveness of the proposed advertising schedule based upon the series of choices and decisions made by the individual persons in the identified sample audience.

2. The computer system of claim 1 wherein the scoring mechanism scores the proposed advertising schedule by computing a overall exposure value for each individual member of the sample audience and summing the computed overall exposure values.

3. The computer system of claim 2 wherein the scoring mechanism computes the overall exposure value for each individual member of the sample audience by including a audience valuation value for each individual member based on corresponding demographic characteristics for each individual member.

4. The computer system of claim 2 wherein the scoring mechanism computes the overall exposure value for each individual member of the sample audience by including a exposure valuation value for each individual member based on their individual exposures to the proposed advertising schedule.

5. The computer system of claim 4 wherein the exposure valuation value for each individual member of the sample audience is generated using time weighted effective frequency techniques such that the exposure valuation value for each individual member is determined by the number of exposures of the individual member and the spacing between exposures of the individual member.

6. The computer system of claim 2 wherein data base includes an array of person objects, with each person object corresponding to an individual member of the sample audience, and wherein each of the person objects includes fields representing the age of the corresponding person, and wherein each field representing the age of the corresponding person includes a sequence of bits, with each bit assigned to correspond to one of a plurality of age ranges and wherein the bit corresponding to the age range of the corresponding person is set, such that the data mining engine can quickly retrieve viewing data from persons of one or more selected age ranges by utilizing a boolean operation with a boolean filter having a corresponding sequence of bits with each bit corresponding to a selected age range.

7. An apparatus comprising:
a CPU;
a memory coupled to the CPU;
an advertising optimization mechanism residing in the memory and being executed by the CPU, the advertising optimization mechanism iteratively modifying and scoring a base advertising schedule in order to achieve an optimal advertising schedule.

8. The pparats of claim 7 further comprising a graphical user interface with a plurality of icons which provide a plurality of choices for advertising optimization.

9. A computer system for analyzing data and optimizing an advertising schedule, the system comprising:
a CPU;
a memory coupled to the CPU;
a database residing in the memory, the database comprising a plurality of person-by-person records which describe a series of television choices and decisions made by an identified sample audience in relation to a media vehicle, and wherein the database comprises a plurality of portions, with each of the plurality of portions including person-by-person records corresponding to a different time period and wherein the each of the plurality of portions includes a viewing index that indexes the person-by-person records for the corresponding time period;
a database mining engine residing in the memory, the database mining engine comprising utilizing the plurality of viewing indices to selectively access data from the database; and
a scoring mechanism residing in the memory and being executed by the CPU, wherein the scoring mechanism accesses the person-by-person records in the database via the database mining engine and provides a score for a proposed incremental change in an advertising schedule based on the person-by-person media-related records in the database by computing a overall exposure value for each individual member of the sample audience due to the proposed incremental change and summing the computed overall exposure values, the score thus quantifying the effectiveness proposed incremental change based upon the series of choices and decisions made by each individual member of the sample audience.

10. The computer system of claim 9 wherein the scoring mechanism determines the overall value for each individual member of the sample audience by utilizing a weighted effective frequency method to determine an exposure valuation value for each individual member, and wherein the weighted effective frequency method is determined by the number of exposures of each individual member.

11. The computer system of claim 9 wherein the scoring mechanism determines the overall value for each individual member of the sample audience by utilizing a time weighted effective frequency method to determine an exposure valuation value for each individual member, and wherein the weighted effective frequency method is determined by the number of exposures of each individual member and the time spacing between exposures of the individual member.

12. The computer system of claim 9 wherein the scoring mechanism determines the overall value for each individual member of the sample audience by including a audience valuation for each individual based on corresponding demographic characteristics for each individual member.

13. The computer system of claim 9 wherein the database comprises data adapted from a plurality of television viewing records received from A. C. Nielsen.

14. The system of claim 7 further comprising at least one index residing in the memory and cooperating with the the advertising optimization mechanism to iteratively modify and score the base advertising schedule.

15. The computer system of claim 14 wherein the selected data fields include person ages, and wherin each of the sequence of bits represents a range of ages.

16. The system of claim 7 further comprising a plurality of indices residing in the memory and cooperating with the the advertising optimization mechanism to iteratively modify and score the base advertising schedule.

17. The apparatus of claim 14 wherein the at least one index comprises at least one of an exposure valuation index, an audience valuation index, an exposure recency index, a response index and a cost index.

18. The apparatus of claim 7 further comprising a database mining engine residing in the memory.

19. The apparatus of claim 18 wherein the database mining engine further comprises a plurality of Boolean filters used to screen the plurality of person-by-person records contained in the database.

20. The apparatus of claim 7 further comprising a data conversion mechanism residing in the memory.

21. The apparatus of claim 20 wherein the data conversion mechanism comprises a mechanism to convert data from a first data format to a second data format.

22. A computer system with a graphical user interface comprising:
a CPU;
a memory coupled to the CPU;
a database residing in the memory, the database comprising a plurality of person-by-person media-related records which describe a series of choices and decisions made by an identified sample audience in relation to a media vehicle;
a database mining engine residing in the memory and being executed by the CPU;
a scoring mechanism for evaluating a plurality of alternative advertising options based on the plurality of person-by-person media-related records.

23. The computer system of claim 22 wherein the scoring mechanism for evaluating a plurality of alternative advertising options comprises a mechanism for evaluating advertisement value over time and space based on actual or anticipated individual or collective advertising exposure.

24. The computer system of claim 22 wherein the scoring mechanism for evaluating a plurality of alternative advertising options comprises a mechanism for assigning advertising response values to a plurality of media alternatives.

25. The computer system of claim 22 wherein the scoring mechanism for evaluating a plurality of alternative advertising options comprises a mechanism for assigning costs to the plurality of alternative advertising options based on time or space boundaries for the purpose of scoring the plurality of alternative advertising options.

26. The computer system of claim 22 wherein the scoring mechanism for evaluating a plurality of alternative advertising options comprises a mechanism for assigning individual exposure values to the plurality of alternative advertising options according to the value of at least one of a plurality of individual demographic measurements.

27. The computer system of claim 26 wherein the scoring mechanism for assigning individual exposure values com prises a mechanism for displaying the individual exposure values of the at least one of a plurality of individual demographic measurements.

28. The computer system of claim 22 wherein the scoring mechanism for evaluating a plurality of alternative advertising options comprises a mechanism for displaying the estimated influence of advertising messages based on the declining influence of advertising over time.

29. The computer system of claim 22 wherein the scoring mechanism for evaluating a plurality of alternative advertising options comprises a mechanism for displaying the estimated influence of advertising messages based accumulated advertising messages over time.

30. The computer system of claim 22 wherein the scoring mechanism for evaluating a plurality of alternative advertising options comprises a mechanism for assigning advertising value to multiple levels of advertising exposure based on frequency of exposure.

31. The computer system of claim 30 wherein the scoring mechanism for assigning advertising value to multiple levels of advertising exposure based on frequency of exposure further comprises a mechanism for displaying the assigned advertising values.

32. The computer system of claim 30 wherein the scoring mechanism for assigning advertising value to multiple levels of advertising exposure based on frequency of exposure comprises a mechanism for assigning advertising value to multiple levels of advertising exposure based on actual or anticipated exposure to an advertisement.

* * * * *